(12) United States Patent
Liao et al.

(10) Patent No.: US 10,944,094 B2
(45) Date of Patent: Mar. 9, 2021

(54) PASSIVATING AGENTS FOR ELECTROCHEMICAL CELLS

(71) Applicant: Sion Power Corporation, Tucson, AZ (US)

(72) Inventors: Zhaohui Liao, Tucson, AZ (US); Chariclea Scordilis-Kelley, Tucson, AZ (US); Tracy Earl Kelley, Tucson, AZ (US); Yuriy V. Mikhaylik, Tucson, AZ (US); Holger Schneider, Ludwigshafen (DE)

(73) Assignee: Sion Power Corporation, Tucson, AZ (US)

( * ) Notice: Subject to any disclaimer, the term of this patent is extended or adjusted under 35 U.S.C. 154(b) by 90 days.

(21) Appl. No.: 15/983,363

(22) Filed: May 18, 2018

(65) Prior Publication Data

US 2018/0351158 A1 Dec. 6, 2018

Related U.S. Application Data

(60) Provisional application No. 62/508,496, filed on May 19, 2017.

(51) Int. Cl.
*H01M 10/0567* (2010.01)
*H01M 10/0569* (2010.01)
(Continued)

(52) U.S. Cl.
CPC ....... *H01M 4/0407* (2013.01); *C25B 11/0489* (2013.01); *H01M 4/0466* (2013.01);
(Continued)

(58) Field of Classification Search
CPC ............. H01M 4/0407; H01M 4/0466; H01M 4/5835; H01M 4/382; H01M 4/405;
(Continued)

(56) References Cited

U.S. PATENT DOCUMENTS

| | | | |
|---|---|---|---|
| 1,956,243 | A | 4/1934 | McEachron et al. |
| 4,384,029 | A | 5/1983 | Kordesch et al. |

(Continued)

FOREIGN PATENT DOCUMENTS

| | | | |
|---|---|---|---|
| CA | 2332452 | A1 | 11/1999 |
| CA | 2532270 | A1 | 11/1999 |

(Continued)

OTHER PUBLICATIONS

English translation of JP-2004055471-A (Year: 2004).*

(Continued)

*Primary Examiner* — Christopher P Domone
*Assistant Examiner* — Kimberly Wyluda
(74) *Attorney, Agent, or Firm* — Wolf, Greenfield & Sacks, P.C.

(57) ABSTRACT

Articles and methods involving electrochemical cells and/or electrochemical cell preproducts comprising passivating agents are generally provided. In certain embodiments, an electrochemical cell includes first and second passivating agents. In some embodiments, an electrochemical cell may include a first electrode comprising a first surface, a second electrode (e.g., a counter electrode with respect to the first electrode) comprising a second surface, a first passivating agent configured and arranged to passivate the first surface, and a second passivating agent configured and arranged to passivate the second surface.

23 Claims, 21 Drawing Sheets

(51) Int. Cl.
*H01M 10/052* (2010.01)
*H01M 4/04* (2006.01)
*C25B 11/04* (2021.01)
*H01M 10/0525* (2010.01)
*H01M 4/583* (2010.01)
*H01M 4/58* (2010.01)
*H01M 4/02* (2006.01)
*H01M 4/40* (2006.01)
*H01M 4/525* (2010.01)
*H01M 4/38* (2006.01)

(52) U.S. Cl.
CPC ....... *H01M 4/5835* (2013.01); *H01M 10/052* (2013.01); *H01M 10/0525* (2013.01); *H01M 10/0567* (2013.01); *H01M 10/0569* (2013.01); *H01M 4/382* (2013.01); *H01M 4/405* (2013.01); *H01M 4/525* (2013.01); *H01M 4/5825* (2013.01); *H01M 2004/021* (2013.01); *H01M 2004/028* (2013.01); *H01M 2300/0034* (2013.01)

(58) Field of Classification Search
CPC .. H01M 4/525; H01M 4/5825; H01M 10/052; H01M 10/0525; H01M 10/0567; H01M 10/0569; H01M 2004/021; H01M 2004/028; H01M 2300/0034; C25B 11/0489
See application file for complete search history.

(56) References Cited

U.S. PATENT DOCUMENTS

| | | | |
|---|---|---|---|
| 4,683,178 A | 7/1987 | Stadnick et al. |
| 5,154,990 A | 10/1992 | Plichta et al. |
| 5,648,187 A | 7/1997 | Skotheim |
| 5,695,887 A | 12/1997 | Amatucci et al. |
| 5,756,232 A | 5/1998 | Kelly et al. |
| 5,800,939 A | 9/1998 | Mishina et al. |
| 5,919,587 A | 7/1999 | Mukherjee et al. |
| 5,961,672 A | 10/1999 | Skotheim et al. |
| 6,024,773 A | 2/2000 | Inuzuka et al. |
| 6,053,953 A | 4/2000 | Tomiyama et al. |
| 6,114,068 A | 9/2000 | Yamada et al. |
| 6,117,583 A | 9/2000 | Nilsson et al. |
| 6,120,930 A | 9/2000 | Rouillard et al. |
| 6,143,216 A | 11/2000 | Loch et al. |
| 6,159,640 A | 12/2000 | Appel et al. |
| 6,165,645 A | 12/2000 | Nishimura et al. |
| 6,183,901 B1 | 2/2001 | Ying et al. |
| 6,203,947 B1 | 3/2001 | Peled et al. |
| 6,238,819 B1 | 5/2001 | Cahill et al. |
| 6,238,821 B1 | 5/2001 | Mukherjee et al. |
| 6,365,032 B1 | 4/2002 | Shiepe et al. |
| 6,391,069 B1 | 5/2002 | Gozdz et al. |
| 6,413,667 B1 | 7/2002 | Gozdz |
| 6,468,692 B1 | 10/2002 | Nemoto et al. |
| 6,558,438 B1 | 5/2003 | Satoh et al. |
| 6,585,869 B2 | 7/2003 | Shiepe et al. |
| 6,682,853 B2 | 1/2004 | Kimijima et al. |
| 6,689,177 B2 | 2/2004 | Sugiyama et al. |
| 6,733,924 B1 | 5/2004 | Skotheim et al. |
| 6,797,428 B1 | 9/2004 | Skotheim et al. |
| 6,806,001 B1 | 10/2004 | Benczur-Uermoessy et al. |
| 6,819,082 B2 | 11/2004 | Yang |
| 6,844,110 B2 | 1/2005 | Enomoto et al. |
| 6,929,788 B2 | 8/2005 | Park et al. |
| 6,936,381 B2 | 8/2005 | Skotheim et al. |
| 6,951,699 B2 | 10/2005 | Yata et al. |
| 7,087,344 B2 | 8/2006 | Kaneta |
| 7,223,500 B2 | 5/2007 | Noh et al. |
| 7,244,530 B2 | 7/2007 | Hambitzer et al. |
| 7,247,408 B2 | 7/2007 | Skotheim et al. |
| 7,252,689 B2 | 8/2007 | Fujino et al. |
| 7,354,675 B2 | 4/2008 | Molter |
| 7,416,813 B2 | 8/2008 | Fujihara et al. |
| 7,544,244 B2 | 6/2009 | Sakashita et al. |
| 7,547,491 B2 | 6/2009 | Ham et al. |
| 7,553,590 B2 | 6/2009 | Mikhaylik |
| 7,592,102 B1 | 9/2009 | Kim et al. |
| 7,642,001 B2 | 1/2010 | Yata et al. |
| 7,688,075 B2 | 3/2010 | Kelley et al. |
| 7,691,530 B2 | 4/2010 | Kim et al. |
| 7,736,800 B2 | 6/2010 | Lee |
| 7,736,807 B2 | 6/2010 | Hasegawa et al. |
| 7,749,655 B2 | 7/2010 | Doh et al. |
| 7,771,870 B2 | 8/2010 | Affinito et al. |
| 7,785,730 B2 | 8/2010 | Affinito et al. |
| 7,829,219 B2 | 11/2010 | Yun et al. |
| 7,842,418 B2 | 11/2010 | Miyahisa et al. |
| 7,879,499 B2 | 2/2011 | Kim et al. |
| 7,939,198 B2 | 5/2011 | Mukherjee et al. |
| 8,066,913 B2 | 11/2011 | Kikuya et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,158,278 B2 | 4/2012 | Tsutsumi et al. |
| 8,158,285 B2 | 4/2012 | Im et al. |
| 8,163,409 B2 | 4/2012 | Fujikawa et al. |
| 8,129,048 B2 | 6/2012 | Kristoffersen et al. |
| 8,197,971 B2 | 6/2012 | Skotheim et al. |
| 8,264,205 B2 | 9/2012 | Kopera |
| 8,288,039 B2 | 10/2012 | Im et al. |
| 8,337,948 B2 | 12/2012 | Kawaoka |
| 8,338,034 B2 | 12/2012 | Affinito et al. |
| 8,367,254 B2 | 2/2013 | Im et al. |
| 8,372,549 B2 | 2/2013 | Im et al. |
| 8,415,054 B2 | 4/2013 | Skotheim et al. |
| 8,415,071 B2 | 4/2013 | Tanaka et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,715,864 B2 | 5/2014 | Kubota et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,916,284 B2 | 12/2014 | Jang et al. |
| 8,936,870 B2 | 1/2015 | Affinito et al. |
| 8,968,928 B2 | 3/2015 | Wang et al. |
| 9,005,311 B2 | 4/2015 | Safont et al. |
| 9,005,809 B2 | 4/2015 | Wilkening et al. |
| 9,012,049 B2 | 4/2015 | Fetzer et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,118,085 B2 | 8/2015 | Ikeda |
| 9,177,689 B2 | 11/2015 | Paulsen et al. |
| 9,196,903 B2 | 11/2015 | Tokuda |
| 9,209,428 B2 | 12/2015 | Jung et al. |
| 9,214,678 B2 | 12/2015 | Mikhaylik |
| 9,219,268 B2 | 12/2015 | Guen et al. |
| 9,287,540 B2 | 3/2016 | Huang |
| 9,287,551 B2 | 3/2016 | Kang et al. |
| 9,306,197 B2 | 4/2016 | Byun et al. |
| 9,306,252 B2 | 4/2016 | Kristofek et al. |
| 9,337,483 B2 | 5/2016 | Geng |
| 9,391,344 B2 | 7/2016 | Kwon et al. |
| 9,397,342 B2 | 7/2016 | Skotheim et al. |
| 9,399,404 B2 | 7/2016 | Ose et al. |
| 9,419,274 B2 | 8/2016 | Wilkening et al. |
| 9,472,808 B2 | 10/2016 | Engel et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,627,716 B2 | 4/2017 | Yang et al. |
| 9,653,735 B2 | 5/2017 | Skotheim et al. |

(56) References Cited

U.S. PATENT DOCUMENTS

| | | |
|---|---|---|
| 9,653,750 B2 | 5/2017 | Laramie et al. |
| 9,673,474 B2 | 6/2017 | Nakaishi |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,748,605 B2 | 8/2017 | Schmidt et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,831,527 B2 | 11/2017 | Cho et al. |
| 9,853,271 B2 | 12/2017 | Iwase et al. |
| 9,853,287 B2 | 12/2017 | Mikhaylik et al. |
| 9,947,963 B2 | 4/2018 | Du et al. |
| 9,994,959 B2 | 6/2018 | Laramie et al. |
| 9,994,960 B2 | 6/2018 | Laramie et al. |
| 10,020,479 B2 | 7/2018 | Mikhaylik et al. |
| 10,020,512 B2 | 7/2018 | Gronwald et al. |
| 10,050,308 B2 | 8/2018 | Liao et al. |
| 10,069,135 B2 | 9/2018 | Fleischmann et al. |
| 10,069,146 B2 | 9/2018 | Skotheim et al. |
| 10,320,031 B2 | 6/2019 | Mikhaylik et al. |
| 10,541,448 B2 | 1/2020 | Mikhaylik et al. |
| 2001/0013469 A1 | 8/2001 | Shiepe et al. |
| 2003/0017393 A1 | 1/2003 | Nemoto et al. |
| 2003/0113624 A1 | 6/2003 | Kim et al. |
| 2003/0124416 A1 | 7/2003 | Kaneta |
| 2003/0190530 A1 | 10/2003 | Yang et al. |
| 2004/0076887 A1* | 4/2004 | Panitz ............... H01M 10/0525 429/330 |
| 2004/0081887 A1 | 4/2004 | Sugiyama et al. |
| 2005/0019670 A1 | 1/2005 | Amine et al. |
| 2005/0031963 A1* | 2/2005 | Im ................... H01M 10/0569 429/332 |
| 2005/0130041 A1 | 6/2005 | Fensore |
| 2005/0196672 A1 | 9/2005 | Mukherjee et al. |
| 2006/0024579 A1 | 2/2006 | Kolosnitsyn et al. |
| 2006/0115579 A1 | 6/2006 | Mukherjee et al. |
| 2006/0222943 A1 | 10/2006 | Fujikawa et al. |
| 2006/0234117 A1 | 10/2006 | Fujikawa et al. |
| 2006/0257724 A1 | 11/2006 | Kwon et al. |
| 2007/0141449 A1 | 6/2007 | Kim |
| 2007/0221265 A1 | 9/2007 | Affinito et al. |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2009/0077794 A1 | 3/2009 | Hirakawa et al. |
| 2009/0286157 A1 | 11/2009 | Chen et al. |
| 2010/0035128 A1 | 2/2010 | Scordilis-Kelley et al. |
| 2010/0143823 A1 | 6/2010 | Tanaka et al. |
| 2010/0239914 A1 | 9/2010 | Mikhaylik et al. |
| 2011/0006738 A1 | 1/2011 | Mikhaylik et al. |
| 2011/0014524 A1 | 1/2011 | Skotheim et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0177398 A1 | 7/2011 | Affinito et al. |
| 2011/0206992 A1 | 8/2011 | Campbell et al. |
| 2011/0250485 A1 | 10/2011 | Tsukuda |
| 2011/0256450 A1 | 10/2011 | Campbell et al. |
| 2012/0048729 A1 | 3/2012 | Mikhaylik et al. |
| 2012/0052339 A1 | 3/2012 | Mikhaylik et al. |
| 2012/0052397 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2012/0171578 A1 | 7/2012 | Zhang et al. |
| 2013/0017441 A1 | 1/2013 | Affinito et al. |
| 2013/0095380 A1 | 4/2013 | Affinito et al. |
| 2013/0164635 A1 | 6/2013 | Schmidt et al. |
| 2013/0196206 A1 | 8/2013 | Park et al. |
| 2013/0216915 A1 | 8/2013 | Affinito et al. |
| 2013/0316072 A1 | 11/2013 | Scordilis-Kelley et al. |
| 2014/0002942 A1 | 1/2014 | Song et al. |
| 2014/0062411 A1 | 3/2014 | Mikhaylik et al. |
| 2014/0079994 A1 | 3/2014 | Affinito et al. |
| 2014/0127419 A1 | 5/2014 | Fleischmann et al. |
| 2014/0127577 A1 | 5/2014 | Fleischmann et al. |
| 2014/0199591 A1 | 7/2014 | Geng |
| 2014/0272565 A1 | 9/2014 | Gronwald et al. |
| 2014/0272594 A1 | 9/2014 | Safont et al. |
| 2014/0272595 A1 | 9/2014 | Cristadoro et al. |
| 2014/0272597 A1 | 9/2014 | Mikhaylik et al. |
| 2014/0377668 A1 | 12/2014 | Abe et al. |
| 2015/0010804 A1 | 1/2015 | Laramie et al. |
| 2015/0044517 A1 | 2/2015 | Mikhaylik et al. |
| 2015/0079466 A1* | 3/2015 | Yoon ................ H01M 10/0567 429/200 |
| 2015/0086837 A1 | 3/2015 | Laramie et al. |
| 2015/0129332 A1 | 5/2015 | Seto et al. |
| 2015/0162586 A1 | 6/2015 | Fleischmann et al. |
| 2015/0171469 A1 | 6/2015 | Kourtakis et al. |
| 2015/0180037 A1 | 6/2015 | Gronwald et al. |
| 2015/0180084 A1 | 6/2015 | Scordilis-Kelley et al. |
| 2015/0188194 A1 | 7/2015 | Mikhaylik et al. |
| 2015/0200422 A1 | 7/2015 | Lee et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0287998 A1 | 10/2015 | Scordilis-Kelley et al. |
| 2015/0288033 A1 | 10/2015 | Lee et al. |
| 2015/0290834 A1 | 10/2015 | Klotz et al. |
| 2015/0318539 A1 | 11/2015 | Kelley et al. |
| 2015/0340736 A1 | 11/2015 | Kim et al. |
| 2015/0349310 A1 | 12/2015 | Viner et al. |
| 2015/0372349 A1 | 12/2015 | Shikita |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0126541 A1 | 5/2016 | Goto et al. |
| 2016/0218398 A1 | 7/2016 | Yonehara et al. |
| 2016/0248121 A1 | 8/2016 | Uematsu et al. |
| 2016/0301080 A1 | 10/2016 | Skotheim et al. |
| 2016/0344067 A1 | 11/2016 | Laramie et al. |
| 2016/0372789 A1 | 12/2016 | Cheng et al. |
| 2017/0018815 A1 | 1/2017 | Laramie et al. |
| 2017/0047590 A1 | 2/2017 | Mikhaylik et al. |
| 2017/0141385 A1 | 5/2017 | Scordilis-Kelley et al. |
| 2017/0141402 A1 | 5/2017 | Affinito et al. |
| 2017/0141442 A1 | 5/2017 | Mikhaylik et al. |
| 2017/0149086 A1 | 5/2017 | Du et al. |
| 2017/0200975 A1 | 7/2017 | Liao et al. |
| 2017/0250390 A1 | 8/2017 | Laramie et al. |
| 2017/0288208 A1 | 10/2017 | Kelley et al. |
| 2017/0338475 A1 | 11/2017 | Laramie et al. |
| 2017/0352863 A1 | 12/2017 | Mikhaylik et al. |
| 2017/0373321 A1 | 12/2017 | Skotheim et al. |
| 2018/0006303 A1 | 1/2018 | Mikhaylik et al. |
| 2018/0034100 A1 | 2/2018 | Du et al. |
| 2018/0048018 A1 | 2/2018 | Scordilis-Kelley et al. |
| 2018/0138542 A1 | 5/2018 | Bunte et al. |
| 2018/0198162 A1 | 7/2018 | Du et al. |
| 2018/0230610 A1 | 8/2018 | Laramie et al. |
| 2018/0254516 A1 | 9/2018 | Han et al. |
| 2018/0261820 A1 | 9/2018 | Liao et al. |
| 2018/0269520 A1 | 9/2018 | Scordilis-Kelley et al. |
| 2018/0277850 A1 | 9/2018 | Quero-Mieres et al. |
| 2018/0287122 A1 | 10/2018 | Mikhaylik et al. |
| 2018/0337406 A1 | 11/2018 | Mudalige et al. |
| 2019/0267669 A1 | 8/2019 | Mikhaylik et al. |

FOREIGN PATENT DOCUMENTS

| | | |
|---|---|---|
| CA | 2310697 A1 | 12/2000 |
| CA | 2404507 A1 | 10/2001 |
| CN | 103427068 A | 12/2013 |
| EP | 0 539 256 A1 | 4/1993 |
| EP | 0 700 109 A1 | 3/1996 |
| EP | 2 144 321 A1 | 1/2010 |
| EP | 1 137 091 B1 | 5/2011 |
| EP | 1 137 093 B1 | 12/2011 |

(56) References Cited

FOREIGN PATENT DOCUMENTS

| | | |
|---|---|---|
| EP | 1 083 618 B1 | 4/2013 |
| EP | 2 104 163 B1 | 6/2014 |
| EP | 3 002 814 A1 | 4/2016 |
| EP | 3 051 621 A1 | 8/2016 |
| EP | 2 713 432 B1 | 8/2017 |
| EP | 2 144 312 B1 | 9/2017 |
| JP | S52-023623 A | 2/1977 |
| JP | H10-55823 A | 2/1998 |
| JP | H11-121045 A | 4/1999 |
| JP | H11-219731 A | 8/1999 |
| JP | 2000-268873 A | 9/2000 |
| JP | 2001-093577 A | 4/2001 |
| JP | 2001-143757 A | 5/2001 |
| JP | 2001-253904 A | 9/2001 |
| JP | 2003-297431 A | 10/2003 |
| JP | 2004055471 A * | 2/2004 |
| JP | 2005-310482 A | 11/2005 |
| JP | 2005-353452 A | 12/2005 |
| JP | 2006-310033 A | 11/2006 |
| JP | 2007-128723 A | 5/2007 |
| JP | 2007-257850 A | 10/2007 |
| JP | 2009-076260 A | 4/2009 |
| WO | WO 95/26055 A1 | 9/1995 |
| WO | WO 99/05743 A1 | 2/1999 |
| WO | WO 02/101119 A1 | 12/2002 |
| WO | WO 2007/097172 A1 | 8/2007 |

OTHER PUBLICATIONS

Extended European Search Report for EP App. No. 18173292.6 dated Sep. 11, 2018.
Barai et al., Impact of External Pressure and Electrolyte Tranpsort Properties no Lithium Dendrite Growth. Journl of the Electrochemical Society. 2018;165(11):A2654-66. Epub Aug. 22, 2018.
Barany et al., A general strategy for elaboration of the dithiocarbonyl functionality,—(C:O)SS—: application to the synthesis of bis(chlorocarbonyl)disulfane and related derivatives of thiocarbonic acids. J. Org. Chem. Dec. 1983;48:4750-61.
Chen et al., Recent advances in lithium-sulfur batteries. J Power Sources. Dec. 1, 2014;267:770-83.
Doeff, Battery Cathodes. Batteries for Sustainability: Selected Entries from the Encyclopedia of Sustainability Science and Technology—Chapter 2. R.J. Brodd (ed.). Springer. New York. 2013:5-49.
Elazari et al., Rechargeable lithiated silicon-sulfur (SLS) battery prototypes. Electrochem. Comm. 2012;14(1):21-4.
Etacheri et al., Challenges in the development of advanced Li-ion batteries: a review. Energy & Environmental Science. Aug. 2011:20 pages.
Gireaud et al., Lithium metal stripping/plating mechanism studies: A metallurgical approach. Electrochemistry Communications. 2006;8:1639-49.
Hirai et al., Influence of electrolyte on lithium cycling efficiency with pressurized electrode stack. J. Electrochem. Soc. 1994;141:611-14.
Liu et al., Electrode Kinetics of Organodisulfide Cathodes for Storage Batteries. Mar. 1990;137(3):750-9.
Pieczonka et al., Impact of Lithium Bix(oxalate)borate Electrolyte Additive on the Performance of High-Voltage Spinel/Graphite Li-Ion Batteries. The Journal of Physical Chemistry. 2013;117:22603-12. Epub Oct. 7, 2013.
Taubert et al., LiBOB as Electrolyte Salt or Additive for Lithium-Ion Batteries Based on LiNi0.8Co0.15A10.05O2 / Graphite. Journal of the Electrochemical Society. 2010;157(6):A721-8. Epub Apr. 27, 2010.
Vigdergauz et al., The wettability of electrodes made of natural metal sulfides. Journal of Solid State Electrochemistry. Jan. 1998;2(1):50-7.
Visco et al., Ambient Temperature High-Rate Lithium/Organosulfur Batteries. J. Electrochem. Soc. Apr. 1990;137(4):1191-2.
Whittingham, Lithium Batteries and Cathode Materials. Chemical Reviews. 2004;104(10):4271-302. Epub Sep. 14, 2004.
Wohfahrt-Mehrens et al., Aging mechanisms of lithium cathode materials. Journal of Power Sources. Mar. 10, 2004;127(1-2):58-64.
Xiong et al., Effect of LiBOB as additive on electrochemical properties of lithium-sulfur batteries. Ionics. Mar. 2012;18(3):249-54. Epub Sep. 27, 2011.
Xu et al., Development of novel lithium borate additives for designed surface modification of high voltage LiNi(0.5)Mn(1.5)O(4) cathodes. Energy & Environmental Science. 2016:12 pages.
Xu et al., Generation of Cathode Passivation Films via Oxidation of Lithium Bis(oxalato) Borate on High Voltage Spinel (LiNi(0.5)Mn(1.5)O(4)). The Journal of Physical Chemistry. 2014;118:7363-8. Epub Mar. 18, 2014.
Zhang et al., High-energy cathode materials for Li-ion batteries: A review of recent developments. Science China Technological Sciences. Nov. 2015;58(11):1809-28.
Zhang et al., LiBOB-based gel electrolyte Li-ion battery for high temperature operation. Journal of Power Sources. 2006;154:276-80. Epub May 31, 2005.
Zhu et al., Positive Electrode Passivation by LiDFOB Electrolyte Additive in High-Capacity Lithium-Ion Cells. Journal of the Electrochemical Society. 2012;159(12):A2109-17. Epub Oct. 20, 2012.
International Search Report and Written Opinion for PCT/US2018/033314 dated Mar. 11, 2019.
Hu et al., Effect of lithium difluoro(oxalate)borate (LiDFOB) additive on the performance of high-voltage lithium-ion batteries. J. Appl. Electrochem. 2012;42:291-6. Epub Mar. 23, 2012.
Liu et al., Functional lithium borate salts and their potential application in high performance lithium batteries. Coordination Chemistry Reviews. 2015;292:56-73. Epub Feb. 19, 2015.

* cited by examiner

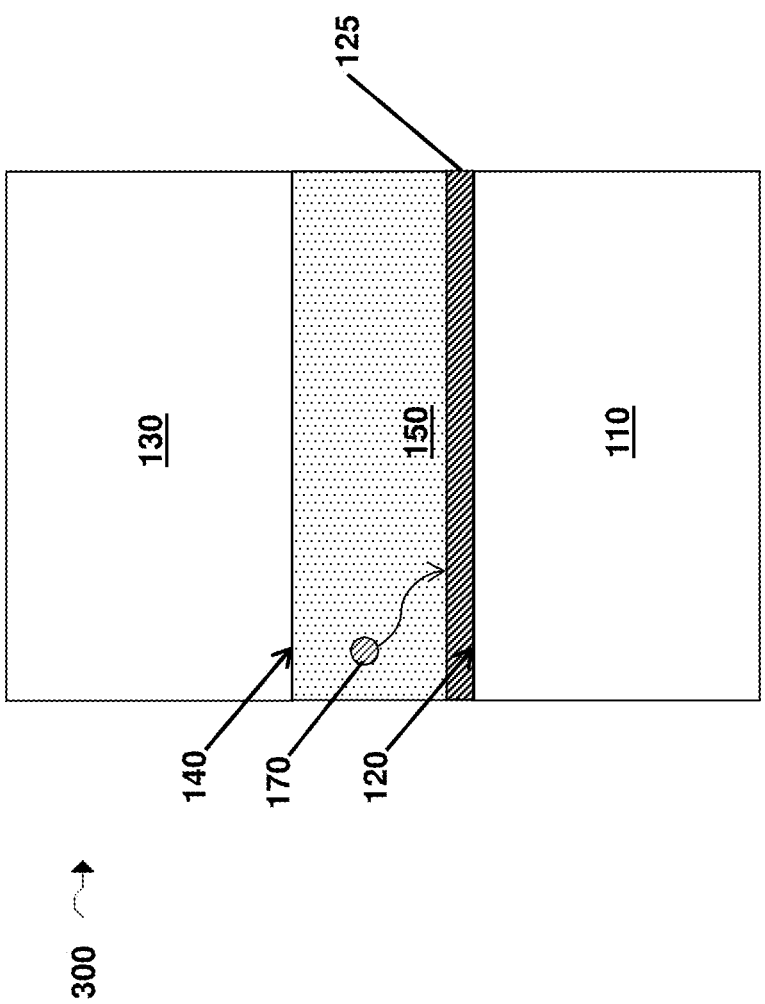

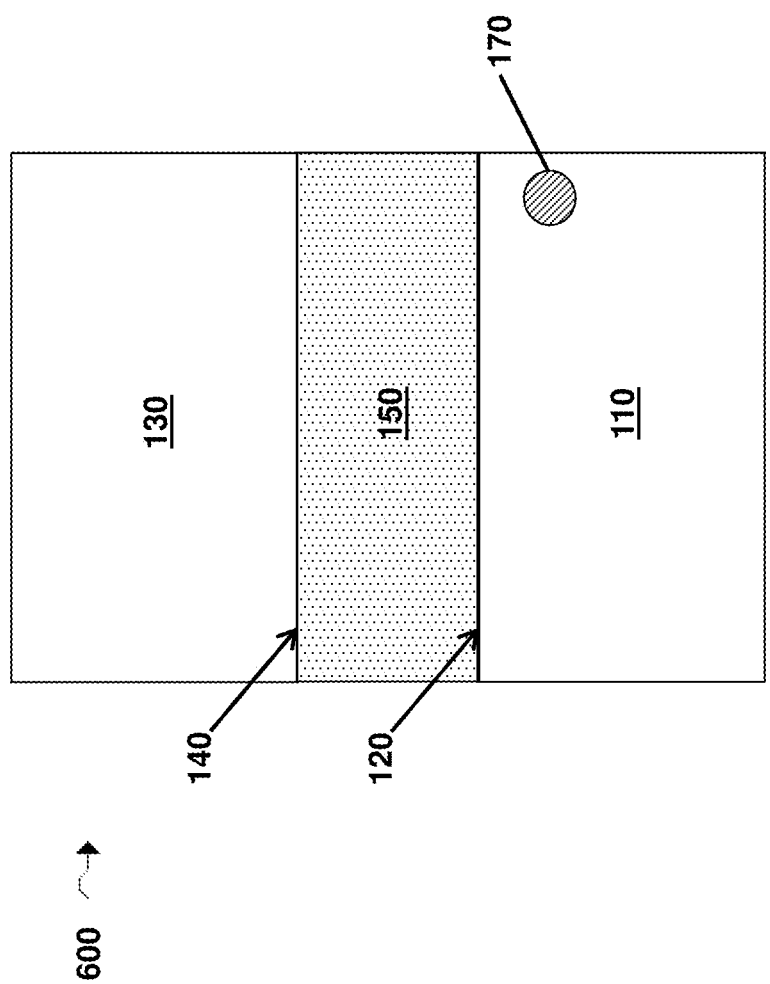

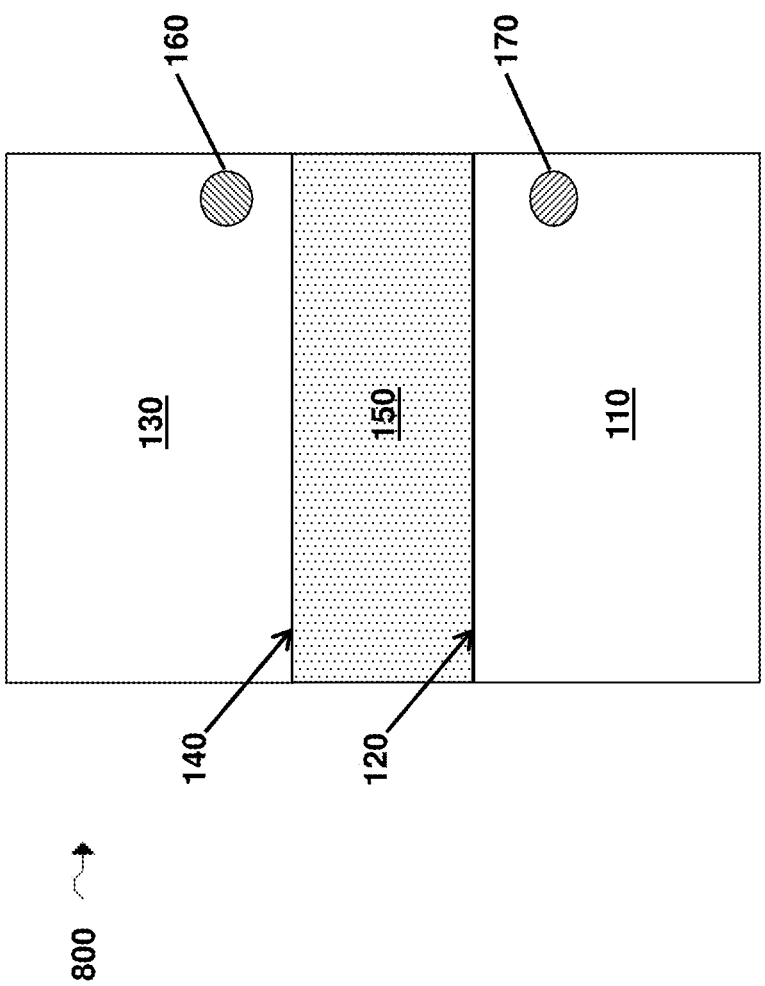

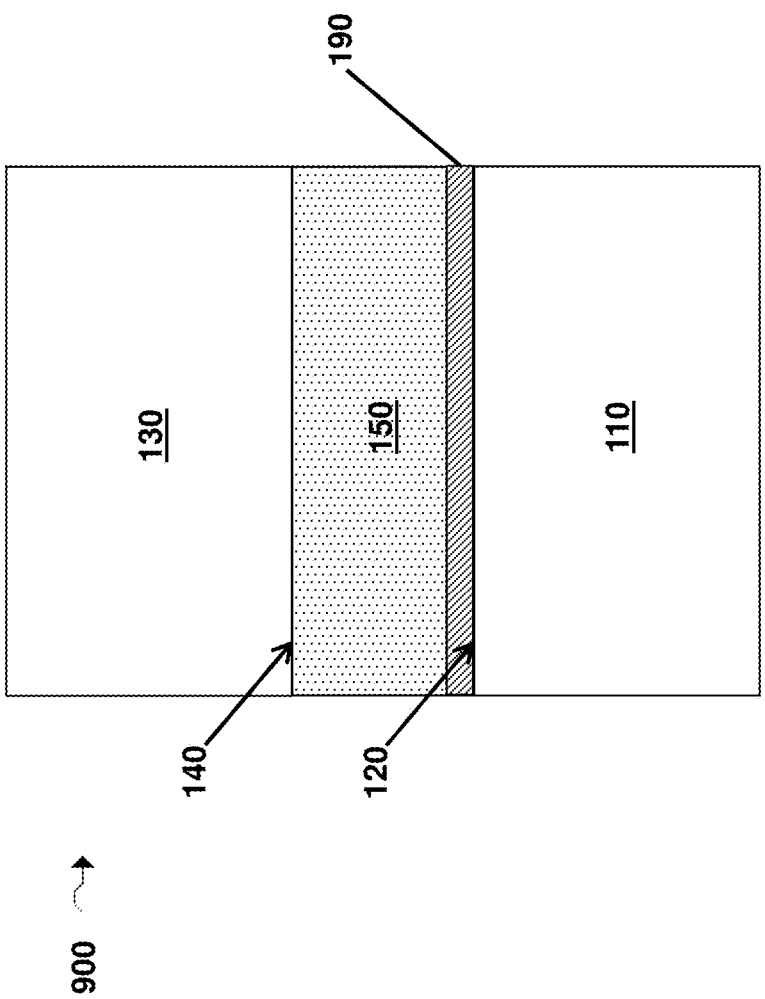

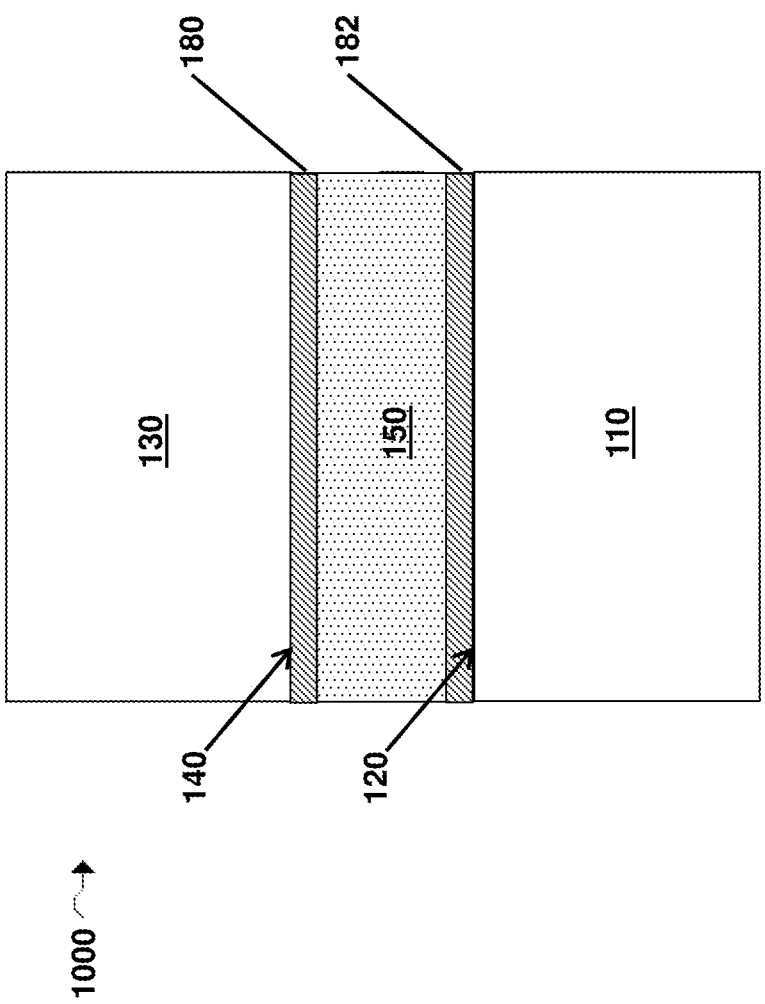

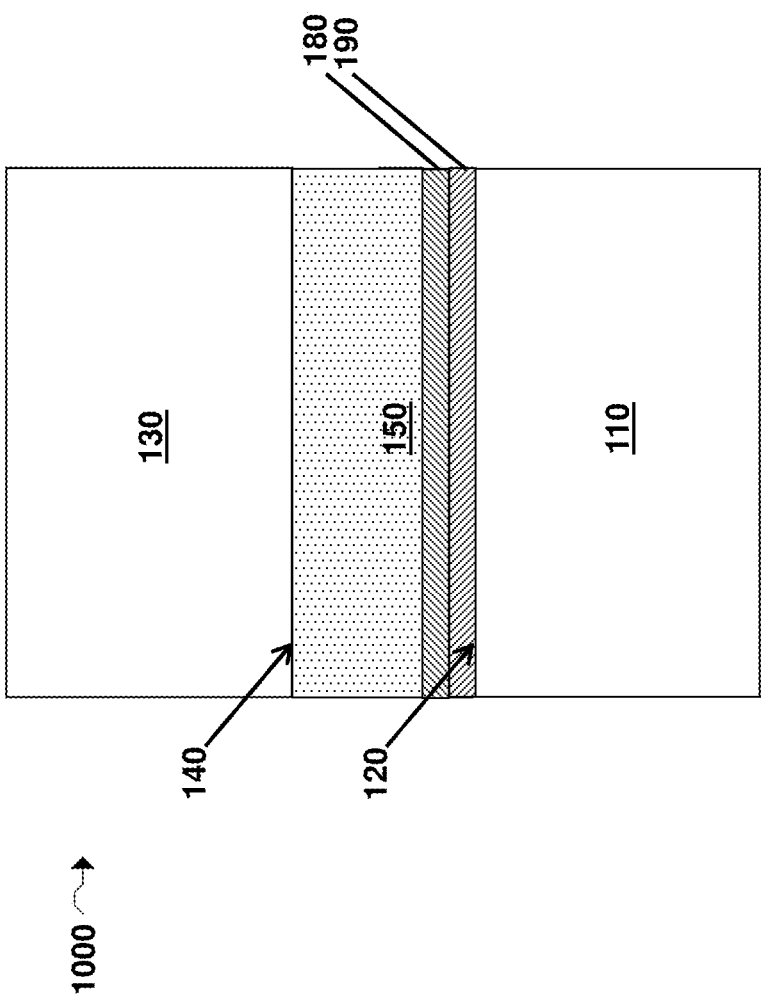

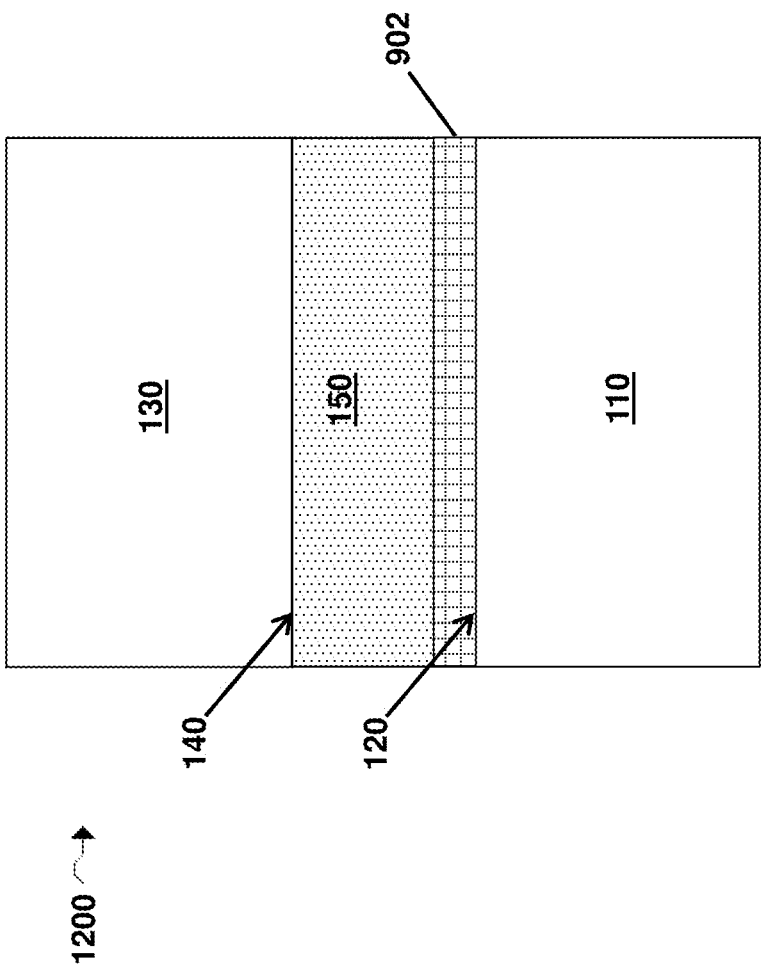

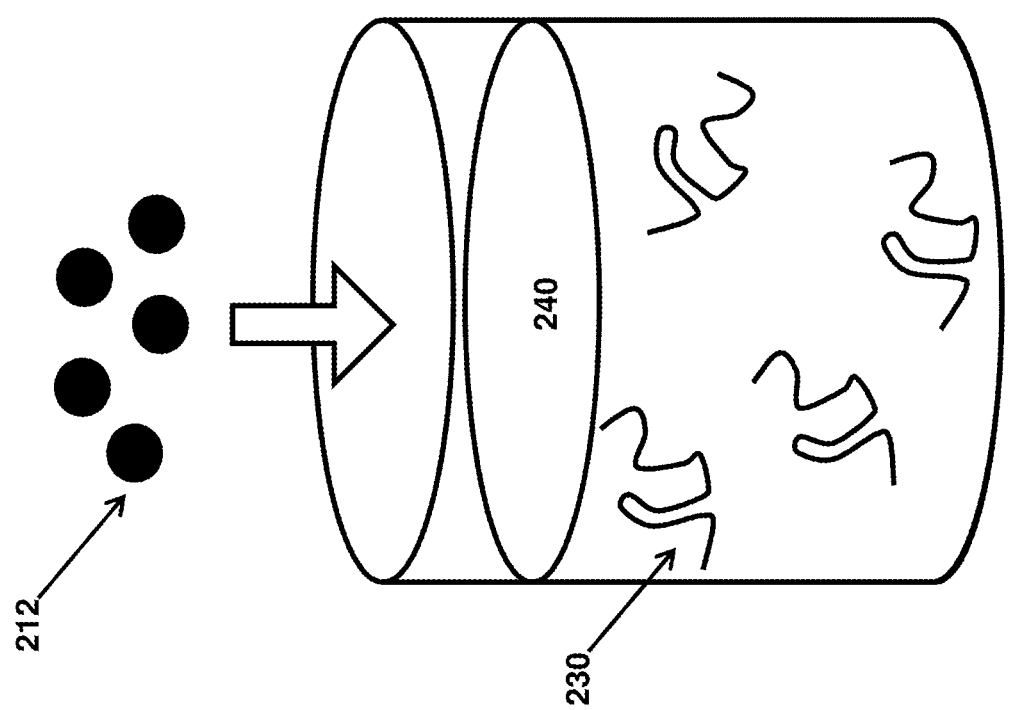

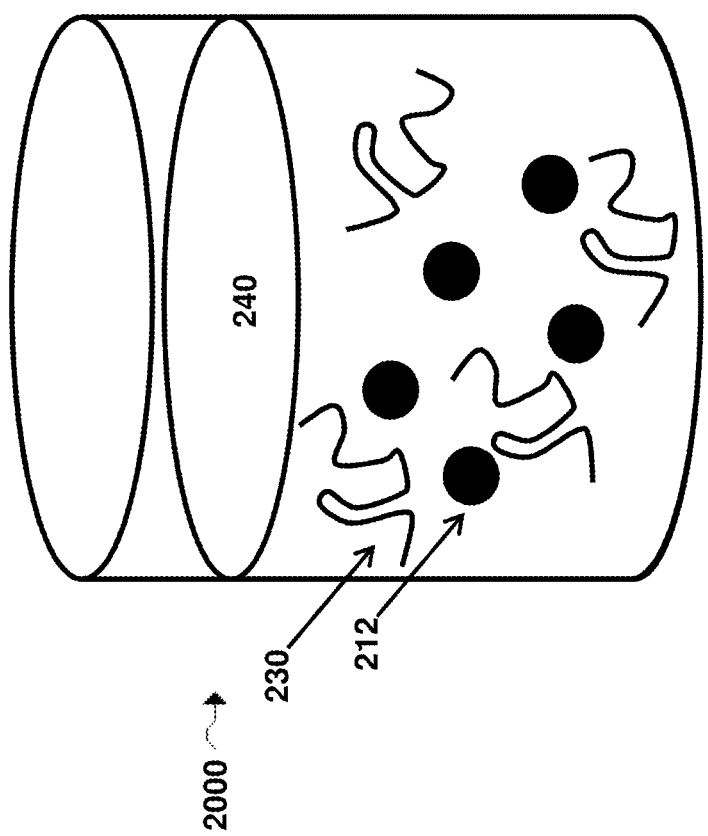

US 10,944,094 B2

PASSIVATING AGENTS FOR ELECTROCHEMICAL CELLS

RELATED APPLICATIONS

This application claims priority under 35 U.S.C. § 119(e) to U.S. Provisional Application No. 62/508,496, filed May 19, 2017, and entitled "Passivating Agents for Electrochemical Cells", which is incorporated herein by reference in its entirety for all purposes.

FIELD

Articles and methods involving electrochemical cells comprising passivating agents are generally provided.

BACKGROUND

There has been considerable interest in recent years in developing high energy density batteries with lithium-containing anodes. In such cells, cathode active material reduction and oxidation electrochemical processes generally involve lithium ions. In particular, cathode active materials may electrochemically intercalate lithium ions and/or produce soluble and insoluble lithium compounds during the charge-discharge process. Rechargeable batteries with such cathode active materials generally exhibit limited cycle lifetimes. Accordingly, articles and methods for increasing the cycle lifetime and/or other improvements would be beneficial.

SUMMARY

Articles and methods involving electrochemical cells comprising passivating agents are generally provided. The subject matter disclosed herein involves, in some cases, interrelated products, alternative solutions to a particular problem, and/or a plurality of different uses of one or more systems and/or articles.

In one set of embodiments, electrochemical cells comprising a first passivating agent and a second passivating agent are provided. The electrochemical cell may comprise a first electrode comprising lithium and a first surface, a second electrode comprising a second surface, an electrolyte, a first passivating agent, and a second passivating agent. In some embodiments, the first passivating agent comprises an N—O compound and the second passivating agent comprises one or more of lithium difluoro(oxalato) borate and difluoroethylene carbonate.

In some embodiments, an electrochemical cell comprises a first electrode comprising lithium and a first surface, a second electrode comprising a second surface, an electrolyte, a first passivating agent comprising an N—O compound, and a second passivating agent. In some embodiments, the second passivating agent comprises one or more of lithium difluoro(oxalato)borate and a species absent a vinyl group but is capable of developing a vinyl group upon electrochemical cell cycling.

In some embodiments, an electrochemical cell comprises a first electrode comprising lithium and a first surface, a second electrode comprising a second surface, an electrolyte, a first passivating agent comprising an N—O compound, and a second passivating agent comprising a species that is capable of undergoing polymerization to form a layer on the cathode during cell cycling. In some embodiments, the second electrode has a voltage with respect to lithium of greater than or equal to 2.8 V and less than or equal to 4.5 V.

In some embodiments, an electrochemical cell comprises a first electrode comprising lithium and a first surface, a second electrode comprising a second surface, an electrolyte, a first passivating agent comprising a xanthate group, and a second passivating agent. The second passivating agent may comprise one or more of lithium difluoro(oxalato)borate, a species that is capable of undergoing polymerization to form a layer on the cathode during cell cycling, and a species absent a vinyl group but is capable of developing a vinyl group upon electrochemical cell cycling.

In some embodiments, an electrochemical cell comprises a first electrode comprising lithium and a first surface, a second electrode comprising a second surface, an electrolyte, a first passivating agent comprising a xanthate group, and a second passivating agent comprising an (oxalato) borate group. The second passivating agent is present in the electrolyte at greater than or equal to 0.2 wt %.

In some embodiments, an electrochemical cell comprises a first electrode comprising lithium and a first surface, a second electrode comprising a second surface, an electrolyte, a first passivating agent comprising lithium nitrate, and a second passivating agent comprising a species that is capable of undergoing polymerization to form a layer on the cathode during cell cycling.

In some embodiments, an electrochemical cell comprises a first electrode comprising lithium and a first surface, a second electrode comprising a second surface, an electrolyte, a first passivating agent comprising tert-butyl xanthate, and a second passivating agent. The second passivating agent may comprise one or more of an (oxalato)borate group, a second passivating agent comprises a species that is capable of undergoing polymerization to form a layer on the cathode during cell cycling, a species which comprises a vinyl group, and a species absent a vinyl group but is capable of developing a vinyl group upon electrochemical cell cycling.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 1C is a cross-sectional schematic illustration of an electrochemical cell comprising a first electrode comprising a first surface passivated by a first passivating agent, a second electrode comprising a second surface, and an electrolyte comprising a first passivating agent and a second passivating agent depicting the formation of a first passivating layer in accordance with some embodiments of the invention;

FIG. 2A is, in accordance with some embodiments, a cross-sectional schematic illustration of an electrochemical cell comprising a first electrode comprising a first surface, a reservoir comprising a first passivating agent, a second electrode comprising a second surface, and an electrolyte comprising a second passivating agent;

FIG. 2C is a cross-sectional schematic illustration of an electrochemical cell comprising a first electrode comprising a first surface, a second electrode comprising a second surface, a reservoir comprising a first passivating agent, a reservoir comprising a second passivating agent, and an electrolyte comprising a first passivating agent, according to some embodiments;

FIG. 3A is a cross-sectional schematic illustration of an electrochemical cell comprising a first electrode comprising a first surface, a second electrode comprising a second surface, a first passivating agent layer disposed adjacent the first surface, and an electrolyte comprising a second passivating agent, in accordance with certain embodiments;

FIG. 3C is a cross-sectional schematic illustration of an electrochemical cell comprising a first electrode comprising a first surface, a second electrode comprising a second surface, a second passivating agent layer disposed adjacent the first surface, a second passivating agent layer disposed adjacent the second surface, and an electrolyte, in accordance with some embodiments;

FIG. 3D is a cross-sectional schematic illustration of an electrochemical cell comprising a first electrode comprising a first surface, a second electrode comprising a second surface, a first passivating agent layer disposed adjacent the first surface, a second passivating agent layer disposed adjacent the first passivating layer, a second passivating agent layer disposed adjacent the second surface, and an electrolyte, in accordance with some embodiments;

FIG. 4B is a cross-sectional schematic illustration of an electrochemical cell comprising a first electrode comprising a first surface, a second electrode comprising a second surface, a protective layer comprising a protective layer surface, and an electrolyte comprising a passivating agent, according to certain embodiments of the invention;

FIG. 5B is a schematic illustration of a method of adding a particulate electroactive material to a slurry;

FIG. 5C is a schematic illustration of a slurry comprising a particulate electroactive material, a solvent, and a binder;

DETAILED DESCRIPTION

Figure 1A:
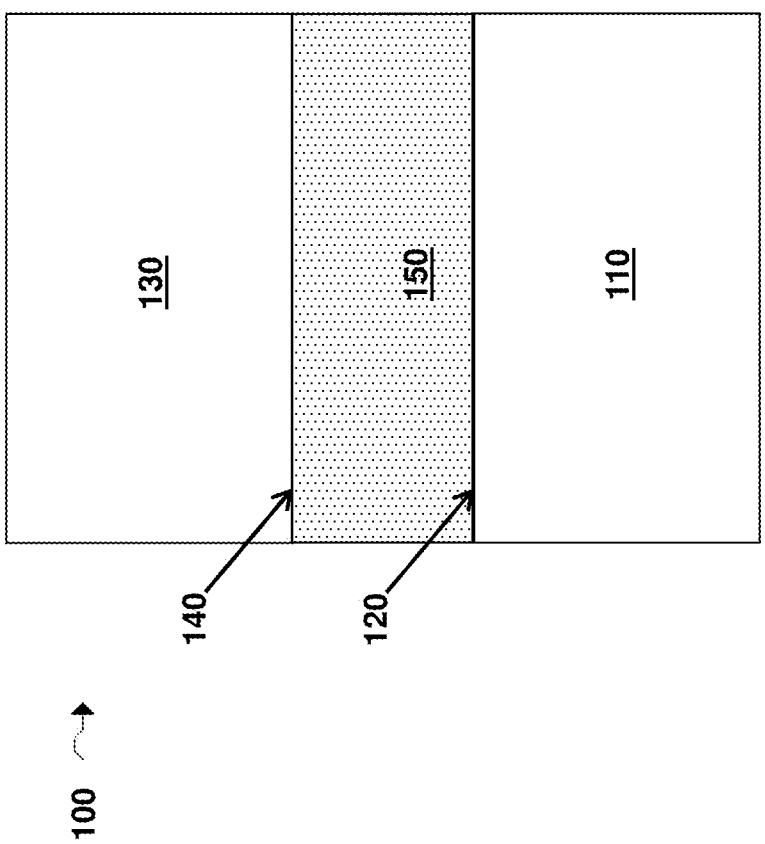
FIG. 1A is a cross-sectional schematic illustration of an electrochemical cell comprising a first electrode comprising a first surface, a second electrode comprising a second surface, and an electrolyte comprising a first passivating agent and a second passivating agent in accordance with various embodiments of the invention.

Articles and methods involving electrochemical cells comprising passivating agents and/or electrochemical cell preproducts comprising passivating agents are generally provided. In certain embodiments, an electrochemical cell includes first and second passivating agents. In some embodiments, an electrochemical cell may include a first electrode comprising a first surface, a second electrode (e.g., a counter electrode with respect to the first electrode) comprising a second surface, a first passivating agent configured and arranged to passivate the first surface, and a second passivating agent configured and arranged to passivate the second surface. For instance, in some cases the first passivating agent may comprise a N—O containing compound, a carbamate compound, a polycarbamate compound, a xanthate compound, and/or a polyxanthate compound. In certain instances, the first passivating agent is capable of forming a passivating layer on a first electrode (e.g., a lithium metal electrode). The second passivating agent may comprise a material capable of passivating a second electrode (e.g., a cathode such as a lithium-intercalation electrode).

In some embodiments, the first passivating agent may, in the absence of the second passivating agent, reduce the cycle life of an electrochemical cell, compared to a control electrochemical cell that does not include the first or the second passivating agents, all other factors being equal. However, the presence of the first and second passivating agents may increase cycle life of an electrochemical cell compared to the control electrochemical cell, all other factors being equal.

In some embodiments, the first passivating agent may, in the absence of the second passivating agent, increase the cycle life of an electrochemical cell, compared to a control electrochemical cell that does not include the first or the second passivating agents, all other factors being equal. However, the presence of the first and second passivating agents may increase cycle life of an electrochemical cell compared to the control electrochemical cell and compared to the electrochemical cell including the first passivating agent but lacking the second passivating agent, all other factors being equal.

In accordance with some embodiments, the second passivating agent may be configured and arranged to reduce or prevent decomposition of the first passivating agent during cycling of the electrochemical cell and/or to reduce or prevent decomposition of an electrolyte component promoted by the first passivating agent during cycling of the electrochemical cell, compared to decomposition in a similar electrochemical cell that does not include the second passivating agent, all other factors being equal. For example, the second passivating agent may reduce oxidation of the first passivating agent and/or reduce oxidation of an electrolyte component. Other configurations of first and second passivating agents are also possible.

In some embodiments, an electrochemical cell may comprise two or more passivating agents referred to herein as first passivating agents without comprising any passivating agents referred to herein as second passivating agents. The two first passivating agents may interact synergistically to enhance one or more properties of the electrochemical cell to an extent beyond what would be expected from the effects on the electrochemical cell of either first passivating agent individually. In some embodiments, an electrochemical cell may comprise two or more passivating agents referred to herein as first passivating agents and comprise one or more passivating agents referred to herein as second passivating agents.

In some embodiments, an electrochemical cell may comprise two or more passivating agents referred to herein as second passivating agents without comprising any passivating agents referred to herein as first passivating agents. The two second passivating agents may interact synergistically to enhance one or more properties of the electrochemical cell to an extent beyond what would be expected from the effects on the electrochemical cell of either second passivating agent individually. In some embodiments, an electrochemical cell may comprise two or more passivating agents referred to herein as second passivating agents and comprise one or more passivating agents referred to herein as first passivating agents.

In embodiments in which electrochemical cell preproducts are provided (e.g., embodiments in which components of an electrochemical cell, such as an electrode, are provided), the pre-products may be transformed into electrochemical cells, or transformed into a component for an electrochemical cell, by a conditioning process. The conditioning process may take any suitable form, such as a chemical, physical, spatial, and/or morphological transformation of one or more components of the electrochemical cell preproduct. It should also be noted that while much of the discussion herein focuses on electrochemical cells and configurations of electrochemical cells, this is by no means limiting and any references to electrochemical cells should be understood to also encompass electrochemical cell pre-products.

FIG. 1A depicts an electrochemical cell 100 according to certain embodiments of the invention. Cell 100 comprises a first electrode 110, a first electrode surface 120, a second electrode 130, a second electrode surface 140, and an electrolyte 150. In some embodiments, the electrochemical cell further comprises both a first passivating agent configured to passivate (and/or capable of passivating) the first surface and a second passivating agent configured to passivate (and/or capable of passivating) the second surface. As described in more detail below, the first and/or second passivating agent may be a part of any suitable component of the electrochemical cell. For instance, in some embodiments the first and/or second passivating agents are present in the electrolyte (e.g., electrolyte 150), in the form of particles in a component of the cell, and/or in the form of a layer in the cell. Other configurations are also possible.

In some embodiments, the first passivating agent is a species configured to passivate (and/or capable of passivating) the first surface. According to certain embodiments, passivating the first surface may comprise reducing or preventing the first surface from reacting with other species to which it is exposed and/or may comprise reducing or preventing the first surface from catalyzing or otherwise promoting one or more reactions for a species to which it is exposed. In some embodiments, suitable species for passivating the first surface may have the ability to react with the first surface and/or at the first surface. According to some embodiments, the reaction of a passivating agent at the first surface may be enabled by the presence of specific functional groups within the passivating agent. Passivating a surface may comprise forming a layer directly adjacent to the surface that prevents other species from accessing the surface and/or may comprise reacting with the surface such that the surface loses its catalytic ability. In accordance with some embodiments, the first passivating agent may form a first passivating layer, which is a layer comprising the first passivating agent and/or comprising a product of a reaction involving the first passivating agent. The first passivating agent may be configured and arranged to reduce or prevent decomposition of the second passivating agent and/or to reduce or prevent decomposition of an electrolyte component promoted by the second passivating agent during cycling of the electrochemical cell.

A layer referred to as being "disposed on," "disposed between," "on," or "adjacent" another layer(s) means that it can be directly disposed on, disposed between, on, or adjacent the layer(s), or an intervening layer may also be present. For example, an additive layer described herein that is adjacent a first electrode or a second electrode may be directly adjacent (e.g., may be in direct physical contact with) the first electrode or second electrode, or an intervening layer (e.g., another protective layer) may be positioned between the first electrode and the additive layer. A layer that is "directly adjacent," "directly on," or "in contact with," another layer means that no intervening layer is present. It should also be understood that when a layer is referred to as being "disposed on," "disposed between," "on," or "adjacent" another layer(s), it may be covered by, on or adjacent the entire layer(s) or a part of the layer(s).

Figure 1B:
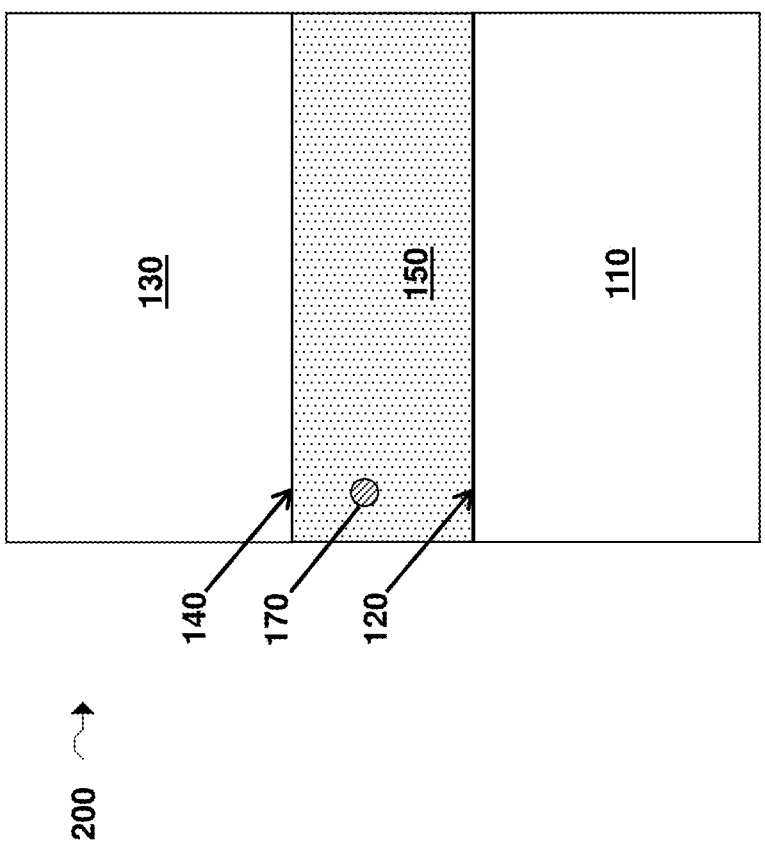
FIG. 1B is a cross-sectional schematic illustration of an electrochemical cell comprising a first electrode comprising a first surface passivated by a first passivating agent, a second electrode comprising a second surface, and an electrolyte comprising a first passivating agent and a second passivating agent, according to some embodiments of the invention.

As described in more detail below, in some embodiments the first passivating agent may comprise a species configured to passivate (and/or capable of passivating) a first surface such as a first electrode surface (e.g., an anode surface) or a lithium surface by preventing reaction between the lithium surface and electrolyte components. Exemplary first passivating agents include salts comprising N—O groups (such lithium nitrate), xanthate groups, polyxanthate groups, carbamate groups, and/or polycarbamate groups. FIG. 1B depicts an electrochemical cell 200 in which the first surface 120 has been passivated by a first passivating agent 170. Although first passivating agent 170 is shown as having a relatively large size in FIG. 1B, it should be appreciated that this is for illustrative purposes only, and that the passivating agent may have any suitable form as described herein, such as in the form of a solvated salt.

In some embodiments, the first passivating agent may passivate the first surface by forming a passivating layer. FIG. 1C depicts an electrochemical cell 300 including a passivating layer according to certain embodiments of the invention. Cell 300 comprises a first electrode 110, a first electrode surface 120, a passivating layer 125 (e.g., a first passivating layer) adjacent the first electrode surface, a second electrode 130, a second electrode surface 140, and an electrolyte 150. As shown illustratively in this figure, the first passivating layer may be formed when a component of the first passivating agent reacts to form a first passivating layer directly adjacent the first electrode. The first passivating layer may prevent reaction of second electrode and/or electrolyte species with the first electrode (e.g., with an electroactive material of the first electrode), which may increase cycle lifetimes, provide improved lithium morphologies, and/or increase the compaction of lithium during charge and discharge of an electrochemical cell (e.g., compared to a similar electrochemical cell but not including a first passivating layer, all other factors being equal).

Figure 1D:
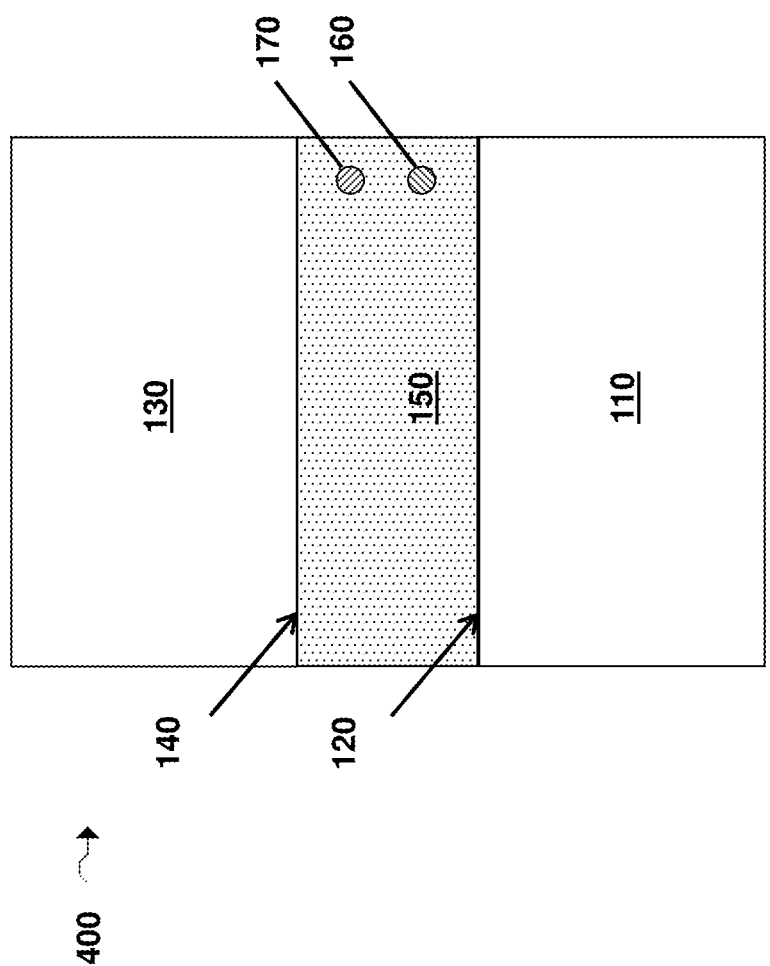
FIG. 1D is, according to certain embodiments, a cross-sectional schematic illustration of an electrochemical cell comprising a first electrode comprising a first surface passivated by a first passivating agent, a second electrode comprising a second surface passivated by a second passivating agent, and an electrolyte comprising a first passivating agent and a second passivating agent, according to some embodiments of the invention.

According to certain embodiments, the second passivating agent may comprise a species configured to passivate (and/or capable of passivating) a second surface such as a second electrode surface (e.g., a cathode surface), e.g., by preventing reaction or decomposition of the first passivating agent and/or electrolyte components at the second electrode surface. Exemplary second passivating agents include salts comprising boron-containing groups, such as lithium bis(oxalato)borate, maleimide groups, and/or silane groups. FIG. 1D depicts an electrochemical cell 400 in which the first surface 120 has been passivated by a first passivating agent 170 and the second surface 140 has been passivated by a second passivating agent 160. In some, but not necessarily all, embodiments, the first passivating agent may passivate the first surface by forming a first passivating layer adjacent to the first surface while the second passivating layer may passivate the second surface without forming a second passivating layer adjacent to the second surface.

Figure 1E:
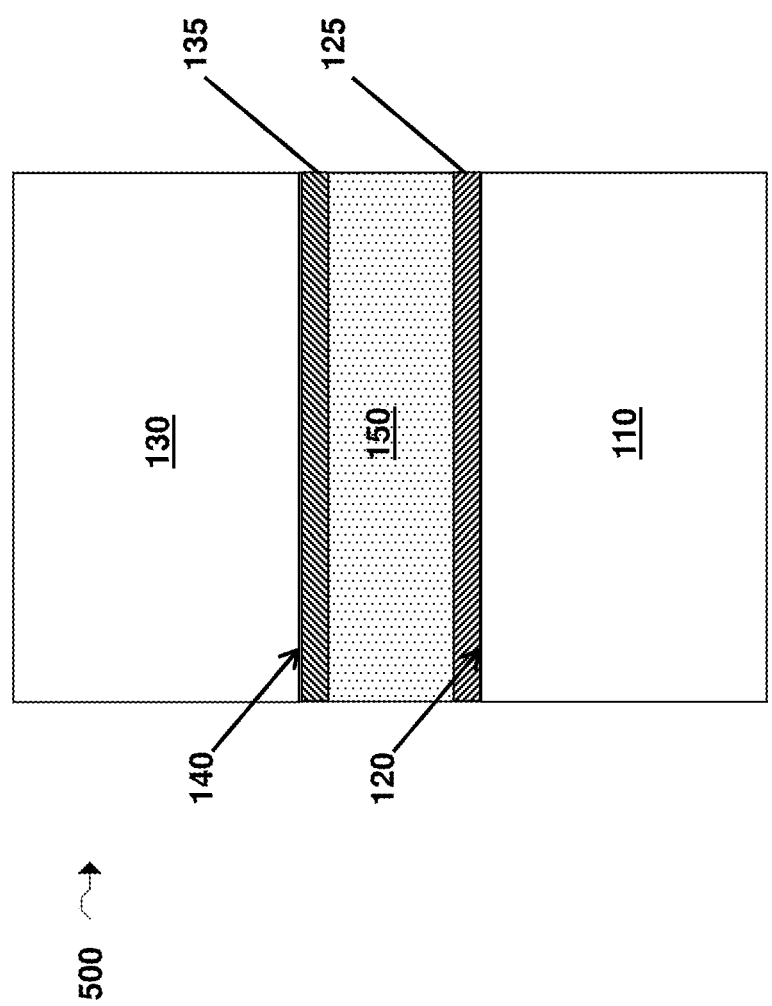
FIG. 1E is a cross-sectional schematic illustration of an electrochemical cell comprising a first electrode comprising a first surface passivated by a first passivating agent, a first passivating layer adjacent the first surface, a second electrode comprising a second surface passivated by a second passivating agent, and an electrolyte comprising a first passivating agent and a second passivating agent, in accordance with certain embodiments of the invention.

FIG. 1E depicts an electrochemical cell 500 according to certain embodiments of the invention. Cell 500 comprises a first electrode 110, a first electrode surface 120, a passivating layer 125 adjacent the first electrode surface 120, a second electrode 130, a second passivating layer 135 passivated by a second passivating agent and adjacent a second electrode surface 140, and an electrolyte 150. As shown illustratively in this figure, the second passivating layer may be formed when a second passivating agent reacts to form a second passivating layer directly adjacent the second electrode (e.g., cathode).

The second passivating agent may passivate the second electrode by, for example, reducing or preventing the electrode surface from reacting with other species to which it is exposed and/or reducing or preventing the electrode surface from catalyzing or otherwise promoting one or more reactions for a species to which it is exposed. In some embodiments, suitable species for passivating the second surface may have the ability to react with the second surface and/or at the second surface. According to some embodiments, the reaction of a passivating agent at a surface may be enabled by the presence of specific functional groups within the passivating agent. These effects may result in the electrochemical cell having an improved (e.g., longer) cycle life. Furthermore, the second passivating agent (in combination with the first passivating agent) may allow for the use of the first passivating agent in high capacity electrochemical cells which would otherwise cause decomposition of the first passivating agent upon operation. In some embodiments, the second passivating agent prevents or reduces the formation of gases produced by decomposition of the first passivating agent and/or the electrolyte at the surface of the second electrode. For example, the second passivating agent may allow for the use of the first passivating agent in combination with second electrodes (e.g., cathodes) which operate at voltages which would otherwise cause decomposition of the first passivating agent. Thus, use of the second passivating agent may enable the realization of the benefits of the first passivating agent in a larger variety of electrochemical cell types.

In some embodiments, the first passivating agent may be added to the electrolyte prior to or during formation of the electrochemical cell. The first passivating agent may be added at a concentration such that it fully dissolves in the electrolyte, or at a concentration at which it is only partially soluble in the electrolyte. Accordingly, the electrolyte may be unsaturated, saturated, or supersaturated in the first passivating agent after the addition step. In some embodiments, the first passivating agent may be at least partially dissolved within the electrolyte which is then added to the other components of the cell. In certain embodiments, the first passivating agent is added to the electrolyte after formation of the electrochemical cell (e.g., during cycling). For example, the first passivating agent may initially be a part of a different component of the electrochemical cell (e.g., part of the first electrode, second electrode, anode, cathode, and/or separator), such as upon formation of the electrochemical cell. In some cases, minimal or no amount of the first passivating agent may be present in the electrolyte at this time. After a certain amount of time and/or upon of the electrochemical cell use (e.g., first use or first discharge, subsequent use), all or portions of the first passivating agent may migrate into the electrolyte. In other embodiments, the first passivating agent is present in the electrolyte prior to cycling of the cell. Likewise, in some embodiments the second passivating agent may be added to the electrolyte prior to or during formation of the electrochemical cell. The second passivating agent may be added at a concentration such that it fully dissolves in the electrolyte, or at a concentration at which it is only partially soluble in the electrolyte. Accordingly, the electrolyte may be unsaturated, saturated, or supersaturated in the second passivating agent after the addition step. In certain embodiments, the second passivating agent may be added to the electrolyte at a concentration that is in excess of its solubility limit in the electrolyte, and may be present in the electrolyte such that it is partially dissolved in the electrolyte and partially undissolved in the electrolyte. In some embodiments, the second passivating agent may be at least partially dissolved within the electrolyte which is then added to the other components of the cell. In certain embodiments, the second passivating agent is added to the electrolyte after formation of the electrochemical cell (e.g., during cycling). For instance, the second passivating agent may initially be a part of a different component of the electrochemical cell (e.g., as part of the first electrode, second electrode, anode, cathode, and/or separator), such as upon formation of the electrochemical cell. In some cases, minimal or no amount of the second passivating agent may be present in the electrolyte at this time. After a certain amount of time and/or upon use (e.g., first use or first discharge, subsequent use) of the electrochemical cell, all or portions of the second passivating agent may migrate into the electrolyte. In other embodiments, the second passivating agent is present in the electrolyte prior to cycling of the cell.

In certain embodiments in which the first passivating agent and/or second passivating agent may be present in the electrolyte (e.g., in a range of weight percentages described herein), the first passivating agent and/or second passivating agent may be present in the electrolyte in solution for greater than or equal to 2 cycles of charge and discharge, for greater than or equal to 5 cycles of charge and discharge, for greater than or equal to 10 cycles of charge and discharge, or for greater than or equal to 25 cycles of charge and discharge. In some embodiments, the first and/or second passivating agent may be present in the electrolyte in suspension (e.g., in a range of weight percentages described herein) for greater than or equal to 2 cycles of charge and discharge, for greater than or equal to 5 cycles of charge and discharge, for greater than or equal to 10 cycles of charge and discharge, or for greater than or equal to 25 cycles of charge and discharge.

In certain embodiments in which the first passivating agent and/or second passivating agent may be present in the electrolyte (e.g., in a range of weight percentages described herein), the first passivating agent and/or second passivating agent may be present in the electrolyte in solution in an electrochemical cell that has been cycled fewer than 2 times, fewer than 5 times, fewer than 10 times, or fewer than 25 times. In some embodiments, the first and/or second passivating agent may be present in the electrolyte in suspension (e.g., in a range of weight percentages described herein) in an electrochemical cell that has been cycled fewer than 2 times, fewer than 5 times, fewer than 10 times, or fewer than 25 times.

Figure 2B:
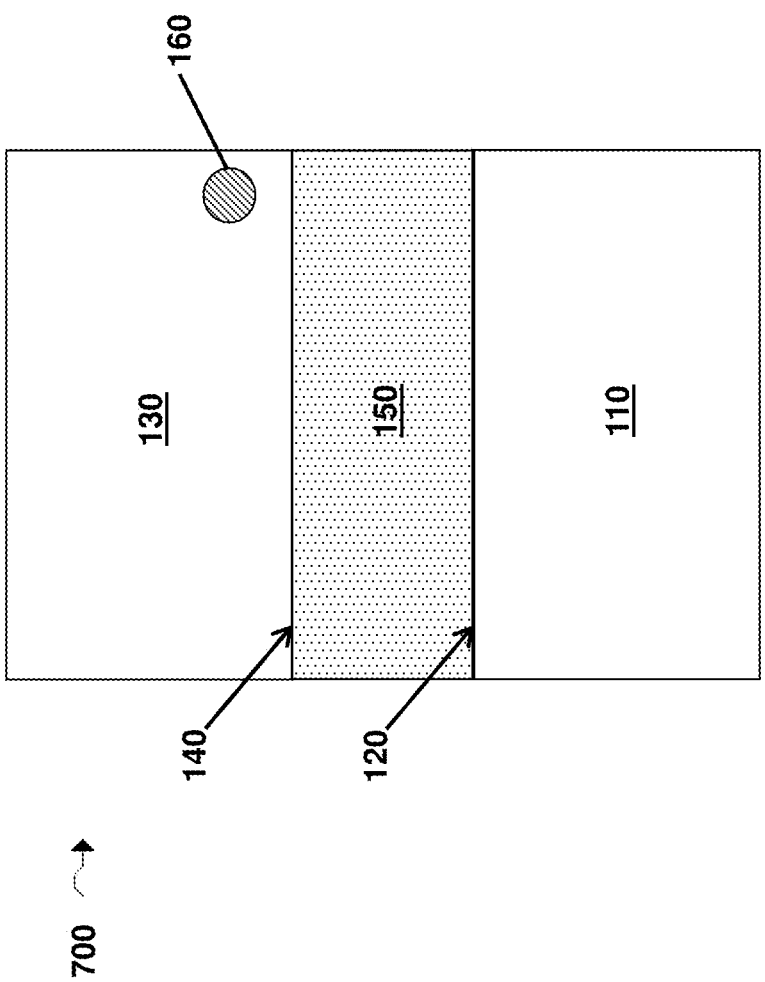
FIG. 2B is, according to certain embodiments, a cross-sectional schematic illustration of an electrochemical cell comprising a first electrode comprising a first surface, a second electrode comprising a second surface, a reservoir comprising a second passivating agent, and an electrolyte.

In certain embodiments, at least a portion of (or all of) the first passivating agent may be in solid form (e.g., as one or more particles or as one or more solid structures) in the electrochemical cell for at least one point in time in the life of the electrochemical cell (e.g., prior to first use or first discharge of the electrochemical cell). In some such embodiments, the solid comprising the first passivating agent may advantageously act as a reservoir of the first passivating agent such that the first passivating agent dissolves over time in the electrolyte (e.g., during charge/discharge of the electrochemical cell). For example, as shown illustratively in FIG. 2A, an electrochemical cell 600 includes a first electrode 110, a first electrode surface 120, a second electrode 130, a second electrode surface 140, an electrolyte 150, and a reservoir 170 comprising the first passivating agent. In some cases, the first passivating agent is in the form of a solid particle. For example, in some embodiments, the electrochemical cell comprises a plurality of solid particles comprising the first passivating agent (e.g., in the electrolyte, in an electrode, in a layer, and/or in a separator).

In certain embodiments, at least a portion of (or all of) the second passivating agent may be in solid form (e.g., as one or more particles or as one or more solid structures) in the electrochemical cell for at least one point in time in the life of the electrochemical cell (e.g., prior to first use or first discharge of the electrochemical cell). In some such embodiments, the solid comprising the second passivating agent may advantageously act as a reservoir of the second passivating agent such that the second passivating agent dissolves over time in the electrolyte (e.g., during charge/discharge of the electrochemical cell). For example, as shown illustratively in FIG. 2B, an electrochemical cell 700 includes a first electrode 110, a first electrode surface 120, a second electrode 130, a second electrode surface 140, an electrolyte 150, and a reservoir 160 comprising the second passivating agent. In some cases, the second passivating agent is in the form of a solid particle. For example, in some embodiments, the electrochemical cell comprises a plurality of solid particles comprising the second passivating agent (e.g., in the electrolyte, in an electrode, in a layer, and/or in a separator).

In certain embodiments, at least a portion of (or all of) both the second passivating agent and the first passivating agent may be in solid form (e.g., as one or more particles or as one or more solid structures) in the electrochemical cell for at least one point in time in the life of the electrochemical cell (e.g., prior to first use or first discharge of the electrochemical cell). For example, as shown illustratively in FIG. 2C, an electrochemical cell 800 includes a first electrode 110, a first electrode surface 120, a second electrode 130, a second electrode surface 140, an electrolyte 150, a reservoir 160 comprising the second passivating agent, and a reservoir 170 (e.g., particles) comprising the first passivating agent. In some cases, the second passivating agent and/or the first passivating agent is in the form of a solid particle. For example, in some embodiments, the electrochemical cell comprises a plurality of solid particles comprising first passivating agent and a plurality of solid particles comprising the second passivating agent (e.g., in the electrolyte, in an electrode, in a layer, and/or in a separator).

If particles of the first passivating agent are present, the particles may have any suitable size. In some embodiments, an average largest cross-sectional dimension of a plurality of solid particles comprising the first passivating agent may be, for example, less than or equal to about 150 microns, less than or equal to about 100 microns, less than or equal to about 50 microns, less than or equal to about 25 microns, less than or equal to about 10 microns, less than or equal to about 5 microns, less or equal to about 2 microns, less than or equal to about 1 micron, less than or equal to about 800 nm, less than or equal to about 500 nm, or less than or equal to about 200 nm. In some embodiments, the average largest cross-sectional dimension of the plurality of particles comprising the first passivating agent may be greater than or equal to about 100 nm, greater than or equal to about 200 nm, greater than or equal to about 500 nm, greater than or equal to about 800 nm, greater than or equal to about 1 micron, greater than or equal to about 2 microns, greater than or equal to about 5 microns, greater than or equal to about 10 microns, greater than or equal to about 25 microns, or greater than or equal to about 50 microns. Combinations of the above-referenced ranges are also possible (e.g., a largest cross-sectional dimension of less than or equal to about 100 microns and greater than or equal to about 100 nm).

If particles of the second passivating agent are present, the particles may have any suitable size. In some embodiments, an average largest cross-sectional dimension of a plurality of solid particles comprising the second passivating agent may be, for example, less than or equal to about 150 microns, less than or equal to about 100 microns, less than or equal to about 50 microns, less than or equal to about 25 microns, less than or equal to about 10 microns, less than or equal to about 5 microns, less or equal to about 2 microns, less than or equal to about 1 micron, less than or equal to about 800 nm, less than or equal to about 500 nm, or less than or equal to about 200 nm. In some embodiments, the average largest cross-sectional dimension of the plurality of particles comprising the second passivating agent may be greater than or equal to about 100 nm, greater than or equal to about 200 nm, greater than or equal to about 500 nm, greater than or equal to about 800 nm, greater than or equal to about 1 micron, greater than or equal to about 2 microns, greater than or equal to about 5 microns, greater than or equal to about 10 microns, greater than or equal to about 25 microns, or greater than or equal to about 50 microns. Combinations of the above-referenced ranges are also possible (e.g., a largest cross-sectional dimension of less than or equal to about 100 microns and greater than or equal to about 100 nm).

The average largest cross-sectional dimension of a plurality of particles may be determined, for example, by imaging the particles with a scanning electron microscope (SEM). An image may be acquired at a magnification between about 10× to about 100,000×, depending on the overall dimensions of the plurality of particles. Those skilled in the art would be capable of selecting an appropriate magnification for imaging the sample. The average largest cross-sectional dimension of the plurality of particles can be determined by taking the longest cross-sectional dimension of each particle in the image and averaging the longest cross-sectional dimensions (e.g., averaging the longest cross-sectional dimensions for 50 particles).

In some embodiments, the first passivating agent is in solid form and deposited as a layer on or adjacent one or more layers in the electrochemical cell. In some embodiments, the first passivating agent may dissolve within the electrolyte (e.g., during formation of the cell or during cycling of the cell). Referring to FIG. 3A, in some embodiments, an electrochemical cell 900 includes a first electrode 110, a first electrode surface 120, a second electrode 130, a second electrode surface 140, an electrolyte 150, and a first passivating agent layer 190 disposed on or adjacent to at least a portion of the first electrode surface 120 (e.g., an anode). As shown illustratively in the figure, the first passivating agent layer may be in direct contact with the electrolyte, or one or more intervening layer(s) may be present (not shown). In some embodiments, the first passivating agent layer may be adjacent a first electrode, although the first passivating agent layer may be adjacent a second electrode in other embodiments. The first passivating agent layer can include, for example, the first passivating agent and any suitable optional components (e.g., a filler, a polymer, a metal, a ceramic, porous silica sol-gel). In some embodiments, a component included in a first passivating agent layer comprises a polymeric binder. Non-limiting examples of suitable polymeric binders include polyethylene oxide, polyethylene, and polyvinylidene fluoride. In certain embodiments, the component (e.g., a component comprising a polymeric binder) may be soluble in and/or may substantially dissolve in an electrolyte. In some cases, the optional component may swell in the presence of an electrolyte.

In embodiments in which the first passivating agent may be initially present in the form of a layer on the first electrode, the first passivating agent may be present in the layer on the first electrode for greater than or equal to 2 cycles of charge and discharge, for greater than or equal to 5 cycles of charge and discharge, for greater than or equal to 10 cycles of charge and discharge, or for greater than or equal to 25 cycles of charge and discharge.

In embodiments in which the first passivating agent may be present in the form of a layer on the first electrode, the first passivating agent may be present in the layer on the first electrode in an electrochemical cell that has been cycled fewer than 2 times, fewer than 5 times, fewer than 10 times, or fewer than 25 times.

Figure 3B:
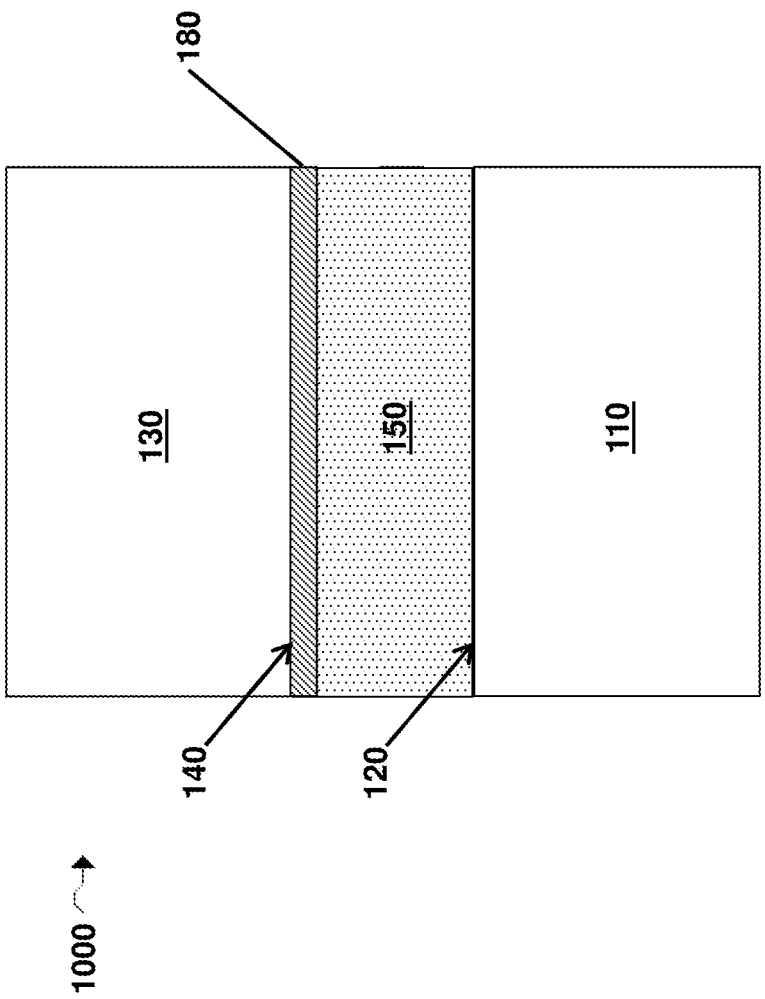
FIG. 3B is a cross-sectional schematic illustration of an electrochemical cell comprising a first electrode comprising a first surface, a second electrode comprising a second surface, a second passivating agent layer disposed adjacent the second surface, and an electrolyte comprising a first passivating agent, in accordance with some embodiments.

In some embodiments, the second passivating agent is in solid form and deposited as a layer on or adjacent one or more layers in the electrochemical cell. In some embodiments, the second passivating agent may dissolve within the electrolyte (e.g., during formation of the cell or during cycling of the cell). Referring to FIG. 3B, in some embodiments, an electrochemical cell 1000 includes a first electrode 110, a first electrode surface 120, a second electrode 130, a second electrode surface 140, an electrolyte 150, and a second passivating agent layer 180 disposed on or adjacent to at least a portion of the second electrode surface 140 (e.g., a cathode). As shown illustratively in the figure, the second passivating agent layer may be in direct contact with the electrolyte, or one or more intervening layer(s) may be present (not shown). In some embodiments, the second passivating agent layer may be adjacent a second electrode (e.g., a cathode), although the second passivating agent layer may be adjacent a first electrode (e.g., an anode in other embodiments). The second passivating agent layer can include, for example, the second passivating agent and any suitable optional components (e.g., a filler, a polymer, a metal, a ceramic, porous silica sol-gel). In some embodiments, a component included in a second passivating agent layer comprises a polymeric binder. Non-limiting examples of suitable polymeric binders include polyethylene oxide, polyethylene, and polyvinylidene fluoride. In certain embodiments, the component (e.g., a component comprising a polymeric binder) may be soluble in and/or may substantially dissolve in an electrolyte. In some cases, the optional component may swell in the presence of an electrolyte. The electrochemical cell may also include a first passivating agent as described herein (not shown).

In certain embodiments, the second passivating agent may be in solid form and deposited such that it forms layers at two or more locations within the electrochemical cell. Referring to FIG. 3C, in some embodiments, an electrochemical cell 1000 includes a first electrode 110, a first electrode surface 120, a second electrode 130, a second electrode surface 140, an electrolyte 150, a second passivating agent layer 180 disposed on or adjacent to at least a portion of the second electrode surface 140 (e.g., a cathode), and a second passivating agent layer 182 disposed on or adjacent to at least a portion of the first electrode surface 120 (e.g., an anode). As shown illustratively in the figure, any second passivating agent layer may be in direct contact with the electrolyte, or one or more intervening layer(s) may be present (not shown). The second passivating agent layers each can include, for example, the second passivating agent and any suitable optional components (e.g., a filler, a polymer, a metal, a ceramic, porous silica sol-gel).

In some embodiments, a component included in a second passivating agent layer comprises a polymeric binder. Non-limiting examples of suitable polymeric binders include polyethylene oxide, polyethylene, and polyvinylidene fluoride. In certain embodiments, the component (e.g., a component comprising a polymeric binder) may be soluble in and/or may substantially dissolve in an electrolyte. In some cases, the optional component may swell in the presence of an electrolyte. The electrochemical cell may also include a first passivating agent as described herein (not shown).

In some embodiments, the second passivating agent may be in a solid form and deposited as a layer adjacent to a first passivating agent layer. Referring to FIG. 3D, in some embodiments, an electrochemical cell 1000 includes a first electrode 110, a first electrode surface 120, a second electrode 130, a second electrode surface 140, an electrolyte 150, a first passivating agent layer 190, and a second passivating agent layer 180 disposed on or adjacent to at least a portion of the first passivating agent layer 190. In some such embodiments, the second passivating agent may be deposited both as a layer adjacent to the first passivating agent layer (shown in FIG. 3D) and as a layer adjacent to the second electrode (not shown). As shown illustratively in the figure, the second passivating agent layer or layers may be in direct contact with the electrolyte, or one or more intervening layer(s) may be present (not shown). The second passivating agent layer or layers each can include, for example, the second passivating agent and any suitable optional components (e.g., a filler, a polymer, a metal, a ceramic, porous silica sol-gel). In some embodiments, a component included in a second passivating agent layer comprises a polymeric binder. Non-limiting examples of suitable polymeric binders include polyethylene oxide, polyethylene, and polyvinylidene fluoride. In certain embodiments, the component (e.g., a component comprising a polymeric binder) may be soluble in and/or may substantially dissolve in an electrolyte. In some cases, the optional component may swell in the presence of an electrolyte.

In embodiments in which the second passivating agent may be initially present in the form of a layer on the second electrode, the second passivating agent may be present in the layer on the second electrode for greater than or equal to 2 cycles of charge and discharge, for greater than or equal to 5 cycles of charge and discharge, for greater than or equal to 10 cycles of charge and discharge, or for greater than or equal to 25 cycles of charge and discharge.

In embodiments in which the second passivating agent may be present in the form of a layer on the second electrode, the second passivating agent may be present in the layer on the second electrode in an electrochemical cell that has been cycled fewer than 2 times, fewer than 5 times, fewer than 10 times, or fewer than 25 times.

Figure 4A:
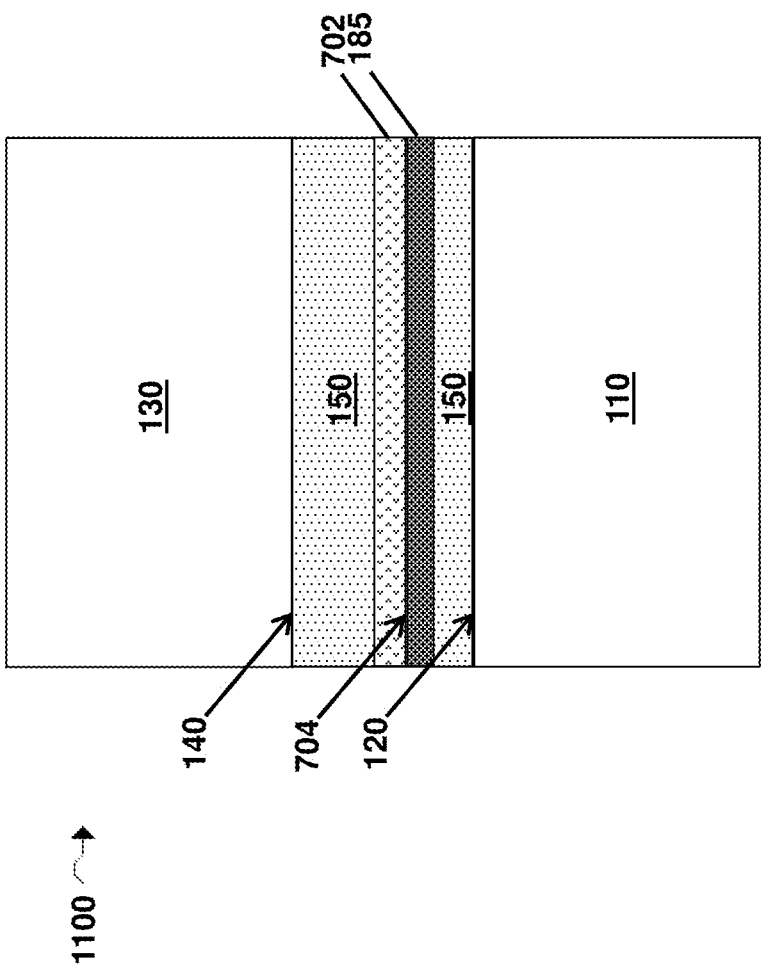
FIG. 4A is a cross-sectional schematic illustration of an electrochemical cell comprising a first electrode comprising a first surface, a second electrode comprising a second surface, a separator comprising a separator surface, a passivating agent layer disposed adjacent the separator surface, and an electrolyte comprising a passivating agent, according to certain embodiments of the invention.

In certain embodiments, the electrochemical cell comprises a separator and a first and/or second passivating agent layer may be deposited on at least a portion of a surface of the separator, or within the separator. For example, as shown illustratively in FIG. 4A, an electrochemical cell 1100 includes a first electrode 110, a first electrode surface 120, a second electrode 130, a second electrode surface 140, an electrolyte 150, and a separator 702. In some embodiments, the electrochemical cell comprises a passivating agent layer 185 (e.g., a first passivating agent layer and/or a second passivating agent layer) disposed on at least a portion of the separator at separator surface 704. In some embodiments, the first and/or second passivating agent layer may simultaneously be present on one or more surfaces of the separator. The first and/or second passivating agent layer may advantageously serve as a reservoir such that the first and/or second passivating agent(s) dissolves over time in the electrolyte (e.g., during charge/discharge of the electrochemical cell). It should be appreciated that while passivating agent layer 185 is shown on a side of the separator closer to the first electrode, in other embodiments the passivating agent layer may present on a side of the separator closer to the second electrode. In some embodiments, at least a portion of the passivating agent layer may be present in the pores of the separator.

In certain embodiments, the electrochemical cell comprises a separator, a first passivating agent layer, and a second passivating agent layer. The first passivating agent layer may be disposed adjacent any suitable layer within the cell and the second passivating agent layer may be disposed adjacent any suitable layer within the cell. For instance, the first passivating agent layer may be adjacent the first electrode (e.g., an anode) and the second passivating agent layer may be adjacent the second electrode (e.g., a cathode). In other embodiments, the first passivating agent layer may be adjacent the first electrode and the second passivating agent layer may be adjacent the separator. According to some embodiments, the first passivating agent layer may be adjacent the separator and the second passivating agent layer may be adjacent the first electrode. In certain embodiments, the first passivating agent layer may be adjacent the separator and the second passivating agent layer may be adjacent the second electrode. The first passivating agent layer may be adjacent the second electrode and the second passivating agent layer may be adjacent the separator in certain embodiments. In some embodiments, both passivating agent layers may be adjacent the separator.

In certain embodiments, the electrochemical cell comprises a protective layer adjacent an electrode. For example, as shown illustratively in FIG. 4B, an electrochemical cell 1200 includes a first electrode 110, a first electrode surface 120, a second electrode 130, a second electrode surface 140, an electrolyte 150, and a protective layer 902 disposed on the first electrode. In some embodiments, additionally or alternatively, an electrochemical cell may include a protective layer disposed on the second electrode (not shown). Electrochemical cells comprising one or more protective layer(s) may further comprise a first passivating agent and/or a second passivating agent in any form described herein (e.g., in the form of a passivating agent layer, dissolved in the electrolyte, suspended in the electrolyte, etc.). It should also be understood that electrochemical cells may comprise one or more protective layers and may comprise a separator.

Figure 4C:
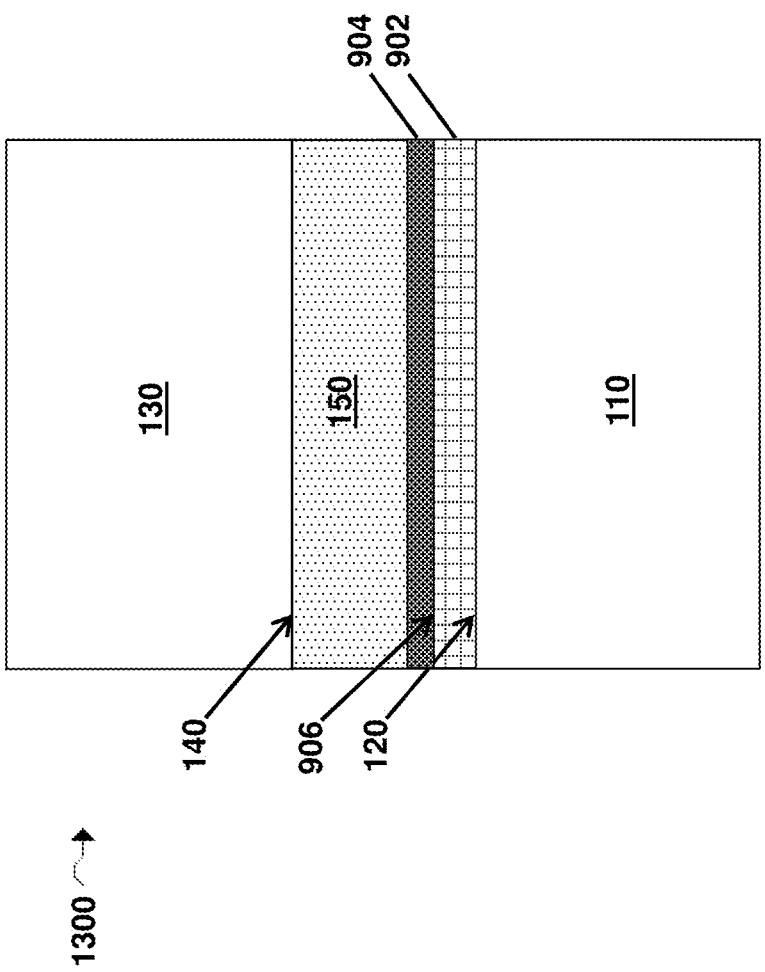
FIG. 4C is a cross-sectional schematic illustration of an electrochemical cell comprising a first electrode comprising a first surface, a second electrode comprising a second surface, a protective layer comprising a protective layer surface, a passivating agent layer disposed adjacent the protective layer surface, and an electrolyte comprising a passivating agent, according to certain embodiments of the invention.

In some embodiments, an electrochemical cell comprises both a protective layer and a passivating agent layer. A first and/or second passivating agent layer may be deposited on at least a portion of a surface of the protective layer, or within the protective layer. For instance, as shown in FIG. 4C, the electrochemical cell may comprise a passivating agent layer 904 (e.g., a first passivating agent layer and/or a second passivating agent layer) disposed on at least a portion of the protective layer at protective layer surface 906. In some embodiments, the first and/or second passivating agent layer may simultaneously be present on one or more surfaces of the protective layer. The first and/or second passivating agent layer may advantageously serve as a reservoir such that the first and/or second passivating agent(s) dissolves over time in the electrolyte (e.g., during charge/discharge of the electrochemical cell). It should be appreciated that while passivating agent layer 904 is shown illustratively on a side of the protective layer closer to the electrolyte in FIG. 4C, in other embodiments the passivating agent layer may present on a side of the protective layer closer to the electrode on which it is disposed (e.g., the first electrode 110 in FIG. 4C). In some embodiments, at least a portion of the passivating agent layer may be present in one or more pores in a protective layer.

In certain embodiments, the electrochemical cell comprises a protective layer, a first passivating agent layer, and a second passivating agent layer. The first passivating agent layer may be disposed adjacent any suitable layer within the cell and the second passivating agent layer may be disposed adjacent any suitable layer within the cell. For instance, the first passivating agent layer may be adjacent the first electrode (e.g., an anode) and the second passivating agent layer may be adjacent the second electrode (e.g., a cathode). In other embodiments, the first passivating agent layer may be adjacent the first electrode and the second passivating agent layer may be adjacent the protective layer. According to some embodiments, the first passivating agent layer may be adjacent the protective layer and the second passivating agent layer may be adjacent the first electrode. In certain embodiments, the first passivating agent layer may be adjacent the protective layer and the second passivating agent layer may be adjacent the second electrode. The first passivating agent layer may be adjacent the second electrode and the second passivating agent layer may be adjacent the protective layer in certain embodiments. In some embodiments, the first passivating agent layer is adjacent the protective layer and the second passivating agent layer is adjacent the separator. In some embodiments, the first passivating agent layer is adjacent the separator and the second passivating agent layer is adjacent the protective layer. In some embodiments, both passivating agent layers may be adjacent the protective layer.

According to some embodiments, one of the passivating agents may be in the form of a layer and the other passivating agent may be in the form of solid particles. For example, in some embodiments, the first passivating agent may be in the form of solid particles and the second passivating agent may be in the form of a layer disposed adjacent the first surface. In certain embodiments, the first passivating agent may be in the form of solid particles and the second passivating agent may be in the form of a layer disposed adjacent the second surface. According to some embodiments, the first passivating agent may be in the form of solid particles and the second passivating agent may be in the form of a layer disposed adjacent the separator. In some embodiments, the first passivating agent may be in the form of solid particles and the second passivating agent may be in the form of a layer disposed adjacent the protective layer.

In certain other embodiments, the first passivating agent may be in the form of a layer and the second passivating agent may be in the form of solid particles. In some embodiments, the first passivating agent may be in the form of a layer disposed adjacent the first surface and the second passivating agent may be in the form of solid particles. In certain embodiments, the first passivating agent may be in the form of a layer disposed adjacent the second surface and the second passivating agent may be in the form of solid particles. According to some embodiments, the first passivating agent may be in the form of a layer disposed adjacent the separator and the second passivating agent may be in the form of solid particles. In some embodiments, the first passivating agent may be in the form of a layer disposed adjacent the protective layer and the second passivating agent may be in the form of solid particles.

In some embodiments, the first and/or second passivating agent may be incorporated into the first or second electrode. In some such embodiments, the electrode may comprise electroactive particles dispersed within a porous matrix, and the first and/or second passivating agent may coat either or both of the electrode surface and the electroactive particle surfaces. For example, the first and/or second passivating agent may be incorporated into the electrode by being added (e.g., in solid form) to a slurry comprising an electroactive material prior to the formation of the electrode. In some such embodiments, the first and/or second passivating agent may encapsulate particles of the electroactive material, e.g., throughout the thickness of the electrode. In certain embodiments, a second electrode (e.g., a cathode) comprises particles of electroactive material that are coated with a second passivating agent in this manner. In certain embodiments, a slurry comprising a first passivating agent and/or a second passivating agent may also comprise a polymer, optionally in the form of a polymer gel. According to some embodiments, the polymer may comprise one or more of polyvinylidene fluoride (PVDF), polyurethane, polyethyleneoxide, polyacrylonitrile, polymethylacrylate, polyacrylamide, polyvinylacetate, polyvinylpyrrolidone, polytetraethylene glycol diacrylate, copolymers thereof, and/or combinations thereof. Such a slurry may contact the surface of the first or second electrode and/or permeate pores within the first or second electrode in some embodiments.

In other embodiments, the first and/or second passivating agent may be added to a fully formed electrode by, for example, being impregnated into a porous electrode in the form of a solution or slurry. In some embodiments, the first and/or second passivating agent may be incorporated throughout the electrode in addition to at the electrode surface (e.g., the second passivating agent may be present throughout a porous cathode).

Accordingly, in some embodiments, the electrode may serve as a reservoir such that the passivating agent(s) dissolves in an electrolyte in contact with the electrode and/or upon use/cycling of the electrochemical cell. In some embodiments, the first and/or second passivating agent may be present as a solid additive layer on the electrode, as described herein.

In accordance with certain embodiments, the second passivating agent may be present on the surface of the second electrode. For example, the second passivating agent may be disposed on the surface of the second electrode in the form of a layer. In some such embodiments, the second passivating agent may be present in the form of a monolayer on the surface of the second electrode. The monolayer may cover at least a portion of the surface of the electrode. In some embodiments, the monolayer is substantially continuous across the surface of the electrode. In some embodiments, the monolayer is substantially discontinuous across the surface of the electrode; for example, islands of the monolayer may be formed on the surface where some islands are disconnected with other islands.

In certain other embodiments, the second passivating agent may be present in the form of a multilayer on the surface of the second electrode. The multilayer may cover at least a portion of the surface of the electrode. In some embodiments, the multilayer is substantially continuous across the surface of the electrode. In some embodiments, the multilayer is substantially discontinuous; for example, islands of the multilayer may be formed on the surface where some islands are disconnected with other islands.

When the second passivating agent takes the form of a layer on the second electrode, it may be bonded to the second electrode by any suitable means. For example, in some embodiments the second passivating agent is covalently bonded to the surface of the second electrode. In other embodiments, other types of bonding may be present (e.g., van der Waals interactions). As will be described in more detail below, the second passivating agent may comprise a silane which is chemically bonded to the surface of the second electrode. In some embodiments, the second passivating agent may comprise a silane that is covalently bonded to the surface of the second electrode. In certain embodiments, the second passivating agent may comprise a silane which is both covalently bonded and bonded through van der Waals interactions to the surface of the second electrode. In other embodiments, the second passivating agent may comprise a silane that is bonded through van der Waals interactions to the surface of the second electrode.

In accordance with certain embodiments, the second passivating agent may be present on at least a portion of the active particle surfaces of the second electrode. For example, the second passivating agent may be disposed on at least a portion of the active particle surfaces of the second electrode in the form of a layer. In some such embodiments, the second passivating agent may be present in the form of a monolayer on at least a portion of the active particle surfaces of the second electrode. The monolayer may cover at least a portion of the active particle surfaces of the second electrode. In some embodiments, the monolayer is substantially continuous across the active particle surfaces of the second electrode. In some embodiments, the monolayer is substantially discontinuous across the active particle surfaces of the second electrode; for example, islands of the monolayer may be formed on the active particle surfaces where some islands are disconnected with other islands.

In certain other embodiments, the second passivating agent may be present in the form of a multilayer on at least a portion of the active particle surfaces of the second electrode. The multilayer may cover at least a portion of the active particle surfaces of the second electrode. In some embodiments, the multilayer is substantially continuous across the active particle surfaces of the second electrode. In some embodiments, the multilayer is substantially discontinuous; for example, islands of the multilayer may be formed on the surface where some islands are disconnected with other islands. When the second passivating agent takes the form of a layer on at least a portion of the active particle surfaces of the second electrode, it may be bonded to the active particle surfaces by any suitable means. For example, in some embodiments the second passivating agent is covalently bonded to the active particle surfaces of the second electrode. In other embodiments, other types of bonding may be present (e.g., van der Waals interactions). As is described in more detail herein, the second passivating agent may comprise a silane which is covalently bonded to the active particle surfaces of the second electrode. In certain embodiments, the second passivating agent may comprise a silane which is both covalently bonded and bonded through van der Waals interactions to the active particle surfaces of the second electrode.

In accordance with certain embodiments, the second passivating agent may be present on the surface of the first electrode. For example, the second passivating agent may be disposed on the surface of the first electrode in the form of a layer. In some such embodiments, the second passivating agent may be present in the form of a monolayer on the surface of the first electrode. The monolayer may cover at least a portion of the surface. In some embodiments, the monolayer is substantially continuous. In some embodiments, the monolayer is substantially discontinuous. In certain other embodiments, the second passivating agent may be present in the form of a multilayer on the surface of the first electrode. The multilayer may cover at least a portion of the surface. In some embodiments, the multilayer is substantially continuous. In some embodiments, the multilayer is substantially discontinuous. When the second passivating agent takes the form of a layer on the first electrode, it may be bonded to the first electrode by any suitable means. For example, in some embodiments the second passivating agent is covalently bonded to the surface of the first electrode. In other embodiments, other types of bonding may be present (e.g., van der Waals interactions). As will be described in more detail below, the first passivating agent may comprise a silane which is covalently bonded to the surface of the first electrode. In certain embodiments, the second passivating agent may comprise a passivating agent which is both covalently bonded and bonded through van der Waals interactions to the surface of the first electrode. In some embodiments, the second passivating agent may comprise both at least one silane molecule which is bonded to the surface of the first electrode and at least one silane molecule which is bonded to either or both of the surface of the second electrode and the active particle surfaces of the second electrode.

In accordance with certain embodiments, the second passivating agent may be present on the surface of the first passivating layer. For example, the second passivating agent may be disposed on the surface of the first passivating layer in the form of a layer. In some such embodiments, the second passivating agent may be present in the form of a monolayer on the surface of the first passivating layer. The monolayer may cover at least a portion of the surface. In some embodiments, the monolayer is substantially continuous. In some embodiments, the monolayer is substantially discontinuous as described herein. In certain other embodiments, the second passivating agent may be present in the form of a multilayer on the surface of the first passivating layer. The multilayer may cover at least a portion of the surface. In some embodiments, the multilayer is substantially continuous. In some embodiments, the multilayer is substantially discontinuous as described herein. When the second passivating agent takes the form of a layer on the first passivating layer, it may be bonded to the first passivating layer by any suitable means. For example, in some embodiments the second passivating agent is covalently bonded to the surface of the first passivating layer. In other embodiments, other types of bonding may be present (e.g., van der Waals interactions). As is described in more detail herein, the second passivating agent may comprise a silane which is covalently bonded to the first passivating layer. In certain embodiments, the second passivating agent may comprise a passivating agent which is both covalently bonded and bonded through van der Waals interactions to the surface of the first passivating layer. In some embodiments, the second passivating agent may comprise both a silane which is bonded to the surface of the first passivating layer and a silane which is bonded to either or both of the surface of the second electrode and the active particle surfaces of the second electrode.

In some embodiments, the second passivating agent may be disposed on the surface of the second electrode (and/or disposed on at least a portion of the active particle surfaces of the second electrode) prior to cell cycling and may remain on the surface of the second electrode (and/or on the active particle surfaces of the second electrode) after the cell has undergone a certain number of cycles. For instance, in certain embodiments the second passivating agent may remain on the surface of the second electrode (and/or on the active particle surfaces of the second electrode) after at least 2 cycles of charge and discharge, at least 5 cycles of charge and discharge, at least 10 cycles of charge and discharge, or at least 25 cycles of charge and discharge.

In certain embodiments the second passivating agent may be present on the surface of the second electrode (and/or on the active particle surfaces of the second electrode) in an electrochemical cell that has been cycled fewer than 2 times, fewer than 5 times, fewer than 10 times, or fewer than 25 times.

According to certain embodiments, the first and/or second passivating agent may initially be present in the first and/or second electrode but one or both of the first and/or second passivating agent(s) may be released from the first and/or second electrode after electrochemical cell assembly (e.g., during cycling). For example, in some cases the first passivating agent may be present in the first electrode and the second passivating agent may be present in the second electrode. In other embodiments, both the first and second passivating agent may be present in the first electrode. In yet other embodiments, both the first and second passivating agents may be present in the second electrode. Combinations of passivating agents in an electrode and with another component of the cell (e.g., the electrolyte, the separator) are also possible.

In embodiments in which the passivating agent may be initially present in the first electrode and/or second electrode, the first passivating agent may be present in the first and/or second electrode for greater than or equal to 2 cycles of charge and discharge, for greater than or equal to 5 cycles of charge and discharge, for greater than or equal to 10 cycles of charge and discharge, or for greater than or equal to 25 cycles of charge and discharge. After release from the first and/or second electrode, the first passivating agent may react to form a first passivating layer adjacent the surface of the first electrode.

In embodiments in which the passivating agent is present in the first electrode and/or second electrode, the first passivating agent may be present in the first and/or second electrode in an electrochemical cell that has been cycled fewer than 2 times, fewer than 5 times, fewer than 10 times, or fewer than 25 times. After release from the first and/or second electrode, the first passivating agent may react to form a first passivating layer adjacent the surface of the first electrode.

According to certain embodiments, the second passivating agent may initially be present in the first electrode and/or second electrode but may be released from the first and/or second electrode after electrochemical cell assembly. In some embodiments, the second passivating agent may be present in the first and/or second electrode for greater than or equal to 2 cycles of charge and discharge, for greater than or equal to 5 cycles of charge and discharge, for greater than or equal to 10 cycles of charge and discharge, or for greater than or equal to 25 cycles of charge and discharge. After release from the first and/or second electrode, the second passivating agent may passivate the second electrode (e.g., by a mechanism described herein). In certain embodiments, a second passivating layer adjacent the surface of the second electrode may be formed. In other embodiments, no such second passivating layer is formed on the second electrode.

In some embodiments, the second passivating agent may be present in the first and/or second electrode in an electrochemical cell that has been cycled fewer than 2 times, fewer than 5 times, fewer than 10 times, or fewer than 25 times. After release from the first and/or second electrode, the second passivating agent may passivate the second electrode (e.g., by a mechanism described herein).

In embodiments in which the first passivating agent may be initially present in the electrochemical cell, the first passivating agent may be present in the electrochemical cell for greater than or equal to 2 cycles of charge and discharge, for greater than or equal to 5 cycles of charge and discharge, for greater than or equal to 10 cycles of charge and discharge, for greater than or equal to 25 cycles of charge and discharge, or for greater than or equal to 50 cycles of charge and discharge. In some embodiments, the first passivating agent may be initially present in the electrochemical cell for greater than or equal to a range of cycles of charge and discharge noted above and in an amount specified herein (e.g., greater than or equal to 0.5 wt % and less than or equal to 20 wt % with respect to the total weight of the electrolyte or greater than or equal to 0.5 wt % and less than or equal to 20 wt % with respect to the total weight of the electroactive material within the first electrode, including any ranges therebetween).

In embodiments in which the first passivating agent is present in the electrochemical cell, the first passivating agent may be present in an electrochemical cell that has been cycled fewer than 2 times, that has been cycled fewer than 5 times, that has been cycled fewer than 10 times, that has been cycled fewer than 25 times, or that has been cycled fewer than 50 times. In some embodiments, the first passivating agent may be present in an electrochemical cell that has been cycled greater than or equal to a number of times noted above and in an amount specified herein (e.g., greater than or equal to 0.5 wt % and less than or equal to 20 wt % with respect to the total weight of the electrolyte or greater than or equal to 0.5 wt % and less than or equal to 20 wt % with respect to the total weight of the electroactive material within the first electrode, including any ranges therebetween).

In embodiments in which the second passivating agent may be initially present in the electrochemical cell, the second passivating agent may be present in the electrochemical cell for greater than or equal to 2 cycles of charge and discharge, for greater than or equal to 5 cycles of charge and discharge, for greater than or equal to 10 cycles of charge and discharge, for greater than or equal to 25 cycles of charge and discharge, or for greater than or equal to 50 cycles of charge and discharge. In some embodiments, the second passivating agent may be initially present in the electrochemical cell for greater than or equal to a range of cycles of charge and discharge noted above and in an amount specified herein (e.g., greater than or equal to 0.5 wt % and less than or equal to 20 wt % with respect to the total weight of the electrolyte, greater than or equal to 0.5 wt % and less than or equal to 30 wt % with respect to the total weight of the electrolyte, or greater than or equal to 0.5 wt % and less than or equal to 20 wt % with respect to the total weight of the electroactive material within the second electrode, including any ranges therebetween).

In embodiments in which the second passivating agent is present in the electrochemical cell, the second passivating agent may be present in an electrochemical cell that has been cycled fewer than 2 times, that has been cycled fewer than 5 times, that has been cycled fewer than 10 times, that has been cycled fewer than 25 times, or that has been cycled fewer than 50 times. In some embodiments, the second passivating agent may be present in an electrochemical cell that has been cycled greater than or equal to a number of times noted above and in an amount specified herein (e.g., greater than or equal to 0.5 wt % and less than or equal to 20 wt % with respect to the total weight of the electrolyte, greater than or equal to 0.5 wt % and less than or equal to 30 wt % with respect to the total weight of the electrolyte, or greater than or equal to 0.5 wt % and less than or equal to 20 wt % with respect to the total weight of the electroactive material within the second electrode, including any ranges therebetween).

The species selected for incorporation into an electrochemical cell as passivating agents should have the ability to passivate a surface of an electrode (e.g., a first electrode, a second electrode). As described herein, passivating a surface of an electrode may comprise reducing or preventing the electrode surface from reacting with other species to which it is exposed and/or may comprise reducing or preventing the electrode surface from catalyzing or otherwise promoting one or more reactions for a species to which it is exposed. In some embodiments, suitable species for passivating a surface may have the ability to react with the surface or at the surface. According to some embodiments, the reaction of a passivating agent at a surface may be enabled by the presence of specific functional groups within the passivating agent. For example, the functional groups of a passivating agent may undergo oxidation or reduction at a surface, may polymerize at a surface, may adsorb to a surface, may block catalytic sites at a surface, may react with catalytic sites such that the catalytic sites are deactivated, and/or may form a layer at a surface. For instance, a first passivating agent may have one or more of such functions at a first surface of a first electrode. In some embodiments, the chemical compositions of the first and/or second passivating layers may be analyzed using X-ray photoelectron spectroscopy (XPS). Exemplary passivating agent chemistries are described in further detail below.

In some embodiments, a passivating agent may have a beneficial interaction with one surface or component of an electrochemical cell but may have a deleterious reaction with a different surface or component of the same electrochemical cell. For example, a first passivating agent may be configured to passivate (and/or capable of passivating) a first electrode (e.g., an anode) of an electrochemical cell by reducing electrolyte decomposition at the first electrode, but the first passivating agent may be susceptible to decomposition at the second electrode (e.g., cathode) and/or may enhance the rate of electrolyte or solvent decomposition at the second electrode. Electrochemical cells incorporating such passivating agents may have reduced gas evolution at the first electrode, but may have enhanced gas evolution at the second electrode during cycling. In some embodiments, adding the first passivating agent to an electrochemical cell alone (without a second passivating agent described herein) may reduce overall cell life compared to a cell without the first passivating agent (all other factors being equal), because the harm due to enhanced reactivity of the second electrode may be greater than the benefit due to reduced reactivity of the first electrode. Experimental data regarding the cycle life of cells with and without a first passivating agent are described in more detail below in the Examples section.

In some embodiments, a passivating agent may have a beneficial interaction with one surface or component of an electrochemical cell but may have neutral interactions with other surfaces or component of the same electrochemical cell. For instance, the passivating agent may interact with a surface such that it neither passivates the surface nor decomposes on the surface. In some embodiments, a passivating agent with a neutral interaction with a surface may neither passivate the surface nor catalyze the decomposition of one or more other species on the surface. A first passivating agent may be configured to passivate (and/or capable of passivating) a first electrode (e.g., an anode) of an electrochemical cell by reducing electrolyte decomposition at the first electrode, but the first passivating agent may have neutral interactions with the second electrode (e.g., cathode). Electrochemical cells incorporating such agents may have reduced gas evolution at the first electrode, but may have equivalent gas evolution at the second electrode during cycling, compared to a similar electrochemical cell having all other factors being equal except without the first passivating agent. In some embodiments, adding the first passivating agent to an electrochemical cell alone (without a second passivating agent described herein) may increase overall cell life compared to a cell without the first passivating agent (all other factors being equal) due to reduced reactivity of the first electrode.

As described herein, an electrochemical cell or a component of an electrochemical cell may include a second passivating agent. The second passivating agent may aid in passivating a second electrode (e.g., a cathode). As described herein, passivation of the second electrode may involve reducing or preventing decomposition of a first passivating agent at the second electrode, reducing or preventing decomposition of an electrolyte or solvent at the second electrode, and/or forming a passivating layer at the second electrode. In certain embodiments, an electrochemical cell comprising both a first passivating agent and a second passivating agent may result in enhanced cycle life compared to a cell lacking passivating agents (or a cell including only a first but not a second passivating agent, all other factors being equal). This is because the first passivating agent may be configured to reduce (and/or capable of reducing) the rate of one or more reactions at the first surface, and the second passivating agent may be configured to reduce (and/or capable of reducing) the rate of one or more reactions at the second surface. The second passivating agent may be configured to reduce (and/or capable of reducing) the rate of decomposition of the first passivating agent, a solvent, and/or an electrolyte. According to some embodiments, there may be a synergistic effect wherein the combination of both passivating agents yields a benefit that is greater than the sum of the individual benefits derived from each passivating agent in the absence of the other. A cell comprising both a first passivating agent and a second passivating agent may have reduced gas emission compared to cells lacking either or both passivating agents, and/or may have an increased cycle life compared to cells lacking either or both passivating agents. Experimental data regarding the cycle life of cells with and without a first and second passivating agents are described in more detail below in the Examples section.

In some embodiments, the second passivating agent comprises a non-solvent. A non-solvent may include materials that do not solvate other materials in the electrochemical cell. The non-solvent may comprise an additive in accordance with certain embodiments.

In certain embodiments, the second passivating agent comprises a compound that does not dissolve in the electrolyte, i.e., a compound that is not soluble in the electrolyte or is soluble in the electrolyte at a level of less than 0.5 wt % (that is, the compound can make up less than 0.5 wt % of the resultant solution). In some embodiments, the second passivating agent comprises a compound that is configured to dissolve and/or capable of dissolving at least slightly in the electrolyte. According to some embodiments, the second passivating agent comprises a compound that may be sparingly soluble, or configured to dissolve and/or capable of dissolving in the electrolyte at a level of between 0.5 wt %-4 wt %. In certain embodiments, the second passivating agent comprises a compound that may be soluble in the electrolyte, or configured to dissolve and/or capable of dissolving at a level of at least 4 wt %.

In certain embodiments, the second passivating agent does not dissolve in the electrolyte, i.e., it is not soluble in the electrolyte or is soluble in the electrolyte at a level of less than 0.5 wt % (that is, the second passivating agent can make up less than 0.5 wt % of the resultant solution). In some embodiments, the second passivating agent is configured to dissolve and/or capable of dissolving at least slightly in the electrolyte. According to some embodiments, the second passivating agent may be sparingly soluble, or configured to dissolve and/or capable of dissolving in the electrolyte at a level of between 0.5 wt %-4 wt %. In certain embodiments, the second passivating agent may be soluble in the electrolyte, or configured to dissolve and/or capable of dissolving at a level of at least 4 wt %.

Suitable second passivating agents may include, but are not limited to, boron-containing compounds, such as compounds comprising an (oxalato)borate group. The (oxalato)borate group may comprise, for example, the bis(oxalato)borate anion and/or the difluoro(oxalato)borate anion. According to certain embodiments, the second passivating agent may comprise a salt. In some embodiments, a second passivating agent comprising a salt may comprise a lithium cation. For example, the lithium salt may comprise lithium bis(oxalato)borate (LiBOB) and/or lithium difluoro(oxalato)borate. In some embodiments, the lithium salt may comprise LiBOB.

According to some embodiments, the second passivating agent may comprise a material which is not a salt (a non-salt compound). In some embodiments, the second passivating agent may comprise a maleimide-containing group. Without wishing to be bound by theory, it is believed that the maleimide double bond may be capable of undergoing an oxidation reaction to form a film adjacent an electrode such as a cathode. According to certain embodiments, the maleimide-containing compound comprises a phenyl group, a carboxyl group, and/or an imide group. In certain embodiments, the second passivating agent may comprise a maleimidophenoxy-phenyl compound, such as 2,2-bis[4-(4-maleimidophenoxy) phenyl]propane.

In certain embodiments, the second passivating agent may comprise a silane compound, or a compound which comprises at least one silicon atom. In some embodiments the silane compound (or silicon-containing compound) may be capable of reacting (e.g., configured to react) with residual —OH and/or —COOH groups present at the second electrode surface. For instance, the silane compound (or silicon-containing compound) may have reactive groups that are reactive with residual —OH and/or —COOH groups present at the second electrode surface. Without wishing to be bound by theory, such a reaction may reduce or prevent —OH and —COOH groups at the second electrode surface from reacting with the first passivating agent and/or with components in the electrolyte (e.g., an electrolyte solvent). According to certain embodiments, the silane compound (or silicon-containing compound) may comprise one or more functional groups suitable for reacting with —OH and —COOH groups, such as leaving groups. In some embodiments, the leaving groups may comprise alkoxy groups and/or halogen groups. Non-limiting examples of suitable alkoxy groups include linear alkoxy groups such as methoxy, ethoxy, propoxy, and butoxy groups as well as branched alkoxy groups such as tertbutoxy groups. Non-limiting examples of suitable halogen groups include fluorine, chlorine, bromine, iodine, and astatine groups. In some embodiments, leaving groups may be capable of reacting with other leaving groups in addition to being capable of reacting with —OH and —COOH groups.

The silane compound (or silicon-containing compound) may comprise any suitable number of leaving groups. In some embodiments, the silane compound may have one leaving group. According to certain embodiments, such silane compounds which bond to the second electrode surface may be incapable of undergoing any further bonding to other species present in the electrochemical cell. In some embodiments, silane compounds having a single leaving group may react with the second electrode surface to form a monolayer. The monolayer may cover at least a portion of the surface. In some embodiments, the monolayer is substantially continuous. In some embodiments, the monolayer is substantially discontinuous as described herein. According to certain embodiments, the monolayer, or any other suitable layer including the silane or silicon-containing compound, may be formed (e.g., on a surface of the second electrode) prior to cell assembly.

In certain embodiments, the silane compound (or silicon-containing compound) may have two leaving groups or three leaving groups. In some such embodiments, the silane compound (or silicon-containing compound) may be configured to bond and/or capable of bonding to the second electrode surface by a reaction of a single leaving group; the other one or two leaving groups may then be available for binding to species, such as residual water (e.g., from the electrolyte), first passivating agents, other second passivating agents which do not comprise silanes, and/or other silane molecules. In some such embodiments, silane compounds comprising two or three leaving groups may react with each other (and possibly with the second electrode surface) to form a multilayer at the second electrode. According to certain embodiments, the multilayer may be formed (e.g., on a surface of the second electrode) prior to cell assembly. In some embodiments, each leaving group has the same chemical structure. In certain embodiments, the silane compound may comprise at least two leaving groups which have different chemical structures.

In certain embodiments, the silane compound (or silicon-containing compound) may have at least one surface-reactive group, or a functional group that is not a leaving group but is a group which is capable of reacting with and/or interacting with residual —OH and/or —COOH groups present at the second electrode surface such that the second electrode surface is passivated. According to some embodiments, such a surface-reactive group may form covalent and/or van der Waals bonds with —OH and/or —COOH groups. Non-limiting examples of surface-reactive groups which are not leaving groups include amino groups, linear and branched alkylamino groups, linear and branched arylamino groups such as aminopropyl groups, siloxy groups, mercapto groups, acids, linear and branched aryloxy groups, hydroxyl groups, phosphate groups, and sulfate groups. In some embodiments, monolayers and/or multilayers may be formed by silane compounds comprising at least one surface-reactive group. In certain embodiments, monolayers and/or multilayers may be formed by silane compounds comprising at least one surface-reactive group and containing no leaving groups.

In some embodiments, the silane compound (or silicon-containing compound) may have at least one functional group which is not a leaving group and not a surface-reactive group. Non-limiting examples of such groups include linear and branched alkyl groups and linear and branched aryl groups.

Non-limiting examples of suitable silane compounds include chlorotrimethylsilane, tetraethylorthosilicate, aminopropyltriethoxy silane, trichlorooctadecyl silane, hexamethyldisilazane, (3-mercaptopropyl)trimethoxy silane, and dimethyloctadecyl((3-(trimethoxysilyl)propyl)ammonium chloride.

According to certain embodiments, the second passivating agent may comprise a group capable of undergoing a polymerization reaction, such as a vinyl group. In some embodiments, the second passivating agent may comprise the vinyl group prior to the electrochemical cell undergoing any charge or discharge. In some such embodiments, exposing a second passivating agent comprising a vinyl group to an electrode may result in electropolymerization of the second passivating agent to form a passivating layer on that electrode. For example, exposing a second passivating agent comprising a vinyl group to the first electrode may result in electropolymerization of the second passivating agent to form a passivating layer on the first electrode. Additionally or alternatively, exposing a second passivating agent comprising a vinyl group to the second electrode may result in electropolymerization of the second passivating agent to form a passivating layer on the second electrode. In certain embodiments, the second passivating agent does not comprise a vinyl group prior to the cell undergoing any charge or discharge, but may undergo a reaction such that it forms a vinyl group during either charge or discharge. Non-limiting examples of which include carbonates, such as fluoroethylene carbonate and difluoroethylene carbonate. For these passivating agents, the second passivating agent may undergo electropolymerization to form a passivating layer on the first electrode and/or the second electrode after the vinyl group is formed. In some embodiments, the second passivating agent may further comprise a second functional group (e.g., one which does not react with —OH and/or —COOH groups) but which may interact with other cell components in a beneficial way. For example, in some embodiments the second passivating agent may comprise a basic group which may be configured to and/or capable of neutralizing certain acids that may be generated during cell cycling. In certain embodiments, the basic group may be one or more of an Arrhenius basic group, a Bronsted-Lowry basic group, and a Lewis basic group.

In some embodiments, the second passivating agent may comprise a solvent. The second passivating agent may comprise a dinitrile solvent in some embodiments. Examples of suitable dinitrile solvents include, but are not limited to, compounds with a structure as in Formula (I):

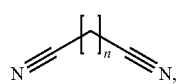

(I)

wherein n can be any value ranging from 3 to 8.

In some embodiments, the second passivating agent may comprise a fluoroalkyl carbonate, such as fluoroethylene carbonate and/or difluoroethylene carbonate.

In certain embodiments, an electrochemical cell may comprise more than one type of second passivating agent. For instance, in some embodiments, the electrochemical cell may comprise an (oxalato)borate-containing compound (e.g., LiBOB and/or lithium difluoro(oxalato)borate) and a compound configured to undergo and/or capable of undergoing a polymerization reaction to form a passivating layer on the second surface, or an (oxalato)borate-containing compound (e.g., LiBOB and/or lithium difluoro(oxalato) borate) and a compound that does not comprise a vinyl group when it is added to the cell but forms a vinyl group during cell cycling. In certain embodiments, the electrochemical cell may comprise both an (oxalato)borate-containing compound (e.g., LiBOB and/or lithium difluoro (oxalato)borate) and fluoroethylene carbonate, or both an (oxalato)borate-containing compound (e.g., LiBOB and/or lithium difluoro(oxalato)borate) and difluoroethylene carbonate. In some embodiments, the electrochemical cell may comprise each of an (oxalato)borate-containing compound (e.g., LiBOB and/or lithium difluoro(oxalato)borate), fluoroethylene carbonate, and difluoroethylene carbonate. Other combinations of second passivating agents are also possible. It should also be understood that any of the second passivating agents described above may be alone or in combination with any of the other second passivating agents described above.

The second passivating agent may be present in an electrochemical cell in any suitable amount. The second passivating agent may be present, in some cases, in the electrochemical cell in an amount less than or equal to about 30 wt % versus the total weight of the electrolyte (including any dissolved or added components such as the first passivating agent and the second passivating agent). For example, in some embodiments, the total weight of the second passivating agent present in the electrochemical cell is less than or equal to about 30 wt %, less than or equal to about 28 wt %, less than or equal to about 25 wt %, less than or equal to about 22 wt %, less than or equal to about 20 wt %, less than or equal to about 18 wt %, less than or equal to about 15 wt %, less than or equal to about 12 wt %, less than or equal to about 10 wt %, less than or equal to about 8 wt %, less than or equal to about 6 wt %, less than or equal to about 5 wt %, less than or equal to about 4 wt %, less than or equal to about 3 wt %, less than or equal to about 2 wt %, or less than or equal to about 1 wt % versus the total weight of the electrolyte. In certain embodiments, the total weight of the second passivating agent present in the electrochemical cell is greater than about 0.2 wt %, greater than about 0.5 wt %, greater than about 1 wt %, greater than about 2 wt %, greater than about 3 wt %, greater than about 4 wt %, greater than about 6 wt %, greater than about 8 wt %, greater than about 10 wt %, greater than about 15 wt %, greater than about 18 wt %, greater than about 20 wt %, greater than about 22 wt %, greater than about 25 wt %, or greater than about 28 wt % versus the total weight of the electrolyte. Combinations of the above-referenced ranges are also possible (e.g., between about 0.2 wt % and about 30 wt %, between about 0.5 wt % and about 30 wt %, between about 0.2 wt % and about 20 wt %, between about 0.5 wt % and about 20 wt %, between about 1 wt % and about 8 wt %, between about 4 wt % and about 10 wt %, between about 6 wt % and about 15 wt %, or between about 8 wt % and about 20 wt %). Other ranges are also possible. It should be understood that in embodiments where more than one second passivating agent is present (e.g., an electrochemical cell comprising at least lithium bis(oxalato)borate and fluoroethylene carbonate), the total weight of the second passivating agent should be understood to refer to the sum of the weights of each second passivating agent present in the electrochemical cell. It should also be understood that the total weight of the electrolyte refers to the sum of the weights of any electrolyte solvents present, any electrolyte polymers present (e.g., in the case of gel electrolytes or solid state electrolytes), any salts dissolved or suspended in the electrolyte (e.g., in the electrolyte solvent), and any first and/or second passivating agents dissolved and/or suspended in the electrolyte (e.g., in the electrolyte solvent).

In some embodiments, the second passivating agent may comprise a species with an oxalato(borate) group (e.g., LiBOB, lithium difluoro(oxalato)borate), and the total weight of the species with an (oxalato)borate group in the electrochemical cell may be less than or equal to about 30 wt %, less than or equal to about 28 wt %, less than or equal to about 25 wt %, less than or equal to about 22 wt %, less than or equal to about 20 wt %, less than or equal to about 18 wt %, less than or equal to about 15 wt %, less than or equal to about 12 wt %, less than or equal to about 10 wt %, less than or equal to about 8 wt %, less than or equal to about 6 wt %, less than or equal to about 5 wt %, less than or equal to about 4 wt %, less than or equal to about 3 wt %, less than or equal to about 2 wt %, or less than or equal to about 1 wt % versus the total weight of the electrolyte. In certain embodiments, the total weight of the species with an (oxalato)borate group in the electrochemical cell is greater than about 0.2 wt %, greater than about 0.5 wt %, greater than about 1 wt %, greater than about 2 wt %, greater than about 3 wt %, greater than about 4 wt %, greater than about 6 wt %, greater than about 8 wt %, greater than about 10 wt %, greater than about 15 wt %, greater about 18 wt %, greater than about 20 wt %, greater than about 22 wt %, greater than about 25 wt %, or greater than about 28 wt % versus the total weight of the electrolyte. Combinations of the above-referenced ranges are also possible (e.g., between about 0.2 wt % and about 30 wt %, between about 0.2 wt % and about 20 wt %, between about 0.5 wt % and about 20 wt %, between about 1 wt % and about 8 wt %, between about 1 wt % and about 6 wt %, between about 4 wt % and about 10 wt %, between about 6 wt % and about 15 wt %, or between about 8 wt % and about 20 wt %). Other ranges are also possible.

In some embodiments, the second passivating agent may comprise fluoroethylene carbonate, and the total weight of the fluoroethylene carbonate in the electrochemical cell may be less than or equal to about 30 wt %, less than or equal to about 28 wt %, less than or equal to about 25 wt %, less than or equal to about 22 wt %, less than or equal to about 20 wt %, less than or equal to about 18 wt %, less than or equal to about 15 wt %, less than or equal to about 12 wt %, less than or equal to about 10 wt %, less than or equal to about 8 wt %, less than or equal to about 6 wt %, less than or equal to about 5 wt %, less than or equal to about 4 wt %, less than or equal to about 3 wt %, less than or equal to about 2 wt %, or less than or equal to about 1 wt % versus the total weight of the electrolyte. In certain embodiments, the total weight of the fluoroethylene carbonate in the electrolyte is greater than about 0.2 wt %, greater than about 0.5 wt %, greater than about 1 wt %, greater than about 2 wt %, greater than about 3 wt %, greater than about 4 wt %, greater than about 6 wt %, greater than about 8 wt %, greater than about 10 wt %, greater than about 15 wt %, greater than about 18 wt %, greater than about 20 wt %, greater than about 22 wt %, greater than about 25 wt %, or greater than about 28 wt % versus the total weight of the electrolyte. Combinations of the above-referenced ranges are also possible (e.g., between about 0.2 wt % and about 30 wt %, between about 15 wt % and about 20 wt %, or between about 20 wt % and about 25 wt %). Other ranges are also possible.

The second passivating agent may be present, in some cases, in the electrochemical cell in an amount less than or equal to about 20 wt % versus the total weight of the electroactive material within the second electrode. For example, in some embodiments, the total weight of the second passivating agent present in the electrochemical cell is less than or equal to about 20 wt %, less than or equal to about 18 wt %, less than or equal to about 15 wt %, less than or equal to about 12 wt %, less than or equal to about 10 wt %, less than or equal to about 8 wt %, less than or equal to about 6 wt %, less than or equal to about 5 wt %, less than or equal to about 4 wt %, less than or equal to about 3 wt %, less than or equal to about 2 wt %, or less than or equal to about 1 wt % versus the total weight of the electroactive material within the second electrode. In certain embodiments, the total weight of the second passivating agent present in the electrochemical cell is greater than about 0.2 wt %, greater than about 0.5 wt %, greater than about 1 wt %, greater than about 2 wt %, greater than about 3 wt %, greater than about 4 wt %, greater than about 6 wt %, greater than about 8 wt %, greater than about 10 wt %, or greater than about 15 wt % versus the total weight of the electroactive material within the second electrode. Combinations of the above-referenced ranges are also possible (e.g., between about 0.2 wt % and about 20 wt %, between about 0.5 wt % and about 20 wt %, between about 1 wt % and about 8 wt %, between about 4 wt % and about 10 wt %, between about 6 wt % and about 15 wt %, or between about 8 wt % and about 20 wt %). Other ranges are also possible.

In some embodiments, the second passivating agent may comprise a species with an (oxalato)borate group (e.g., LiBOB, lithium difluoro(oxalato)borate), and the total weight of the species with an (oxalato)borate group in the electrochemical cell may be less than or equal to about 20 wt %, less than or equal to about 18 wt %, less than or equal to about 15 wt %, less than or equal to about 12 wt %, less than or equal to about 10 wt %, less than or equal to about 8 wt %, less than or equal to about 6 wt %, less than or equal to about 5 wt %, less than or equal to about 4 wt %, less than or equal to about 3 wt %, less than or equal to about 2 wt %, or less than or equal to about 1 wt % versus the total weight of the electroactive material within the second electrode. In certain embodiments, the total weight of species with an (oxalato)borate group in the electrochemical cell is greater than about 0.2 wt %, greater than about 0.5 wt %, greater than about 1 wt %, greater than about 2 wt %, greater than about 3 wt %, greater than about 4 wt %, greater than about 6 wt %, greater than about 8 wt %, greater than about 10 wt %, or greater than about 15 wt % versus the total weight of the electroactive material within the second electrode. Combinations of the above-referenced ranges are also possible (e.g., between about 0.2 wt % and about 20 wt %, between about 0.5 wt % and about 20 wt %, between about 1 wt % and about 8 wt %, between about 4 wt % and about 10 wt %, between about 6 wt % and about 15 wt %, or between about 8 wt % and about 20 wt %). Other ranges are also possible.

In some embodiments, the second passivating agent may be or may comprise fluoroethylene carbonate, and the total weight of the fluoroethylene carbonate in the electrochemical cell may be less than or equal to about 20 wt %, less than or equal to about 18 wt %, less than or equal to about 15 wt %, less than or equal to about 12 wt %, less than or equal to about 10 wt %, less than or equal to about 8 wt %, less than or equal to about 6 wt %, less than or equal to about 5 wt %, less than or equal to about 4 wt %, less than or equal to about 3 wt %, less than or equal to about 2 wt %, or less than or equal to about 1 wt % versus the total weight of the electroactive material within the second electrode. In certain embodiments, the total weight of the fluoroethylene carbonate in the electrochemical cell is greater than about 0.2 wt %, greater than about 0.5 wt %, greater than about 1 wt %, greater than about 2 wt %, greater than about 3 wt %, greater than about 4 wt %, greater than about 6 wt %, greater than about 8 wt %, greater than about 10 wt %, greater than about 15 wt %, or greater than about 18 wt % versus the total weight of the electroactive material within the second electrode. Combinations of the above-referenced ranges are also possible (e.g., between about 0.2 wt % and about 20 wt %, between about 0.5 wt % and about 20 wt %, between about 1 wt % and about 8 wt %, between about 4 wt % and about 10 wt %, between about 6 wt % and about 15 wt %, between about 8 wt % and about 20 wt %). Other ranges are also possible.

In some embodiments, the wt % of the second passivating agent (e.g., a species with an (oxalato)borate group, LiBOB, lithium difluoro(oxalato)borate, fluoroethylene carbonate, difluoroethylene carbonate) is measured prior to first use or first discharge of the electrochemical cell using known amounts of the various components. In other embodiments, the wt % is measured at a point in time during the cycle life of the cell. In some such embodiments, the cycling of an electrochemical cell may be stopped and the wt % of the second passivating agent in the electrolyte may be determined using, for example, gas chromatography-mass spectrometry. Other methods such as NMR, inductively coupled plasma mass spectrometry (ICP-MS), and elemental analysis can also be used.

In some embodiments, the first passivating agent comprises a non-solvent. A non-solvent may include materials that do not solvate other materials in the electrochemical cell. The non-solvent may comprise an additive in accordance with certain embodiments.

In certain embodiments, the first passivating agent comprises a compound that does not dissolve in the electrolyte, i.e., a compound that is not soluble in the electrolyte or is soluble in the electrolyte at a level of less than 0.5 wt % (that is, the compound agent can make up less than 0.5 wt % of the solution in which it is included). In some embodiments, the first passivating agent comprises a compound that is configured to dissolve and/or capable of dissolving at least slightly in the electrolyte. According to some embodiments, the first passivating agent comprises a compound that may be sparingly soluble, or configured to dissolve and/or capable of dissolving in the electrolyte at a level of between 0.5 wt %-4 wt %. In certain embodiments, the first passivating agent comprises a compound that may be soluble in the electrolyte, or configured to dissolve and/or capable of dissolving at a level of at least 4 wt %.

In certain embodiments, the first passivating agent does not dissolve in the electrolyte, i.e., it is not soluble in the electrolyte or is soluble in the electrolyte at a level of less than 0.5 wt % (that is, the first passivating agent can make up at most 0.5 wt % of the resultant solution). In some embodiments, the first passivating agent is configured to dissolve and/or capable of dissolving at least slightly in the electrolyte. According to some embodiments, the first passivating agent may be sparingly soluble, or configured to dissolve and/or capable of dissolving in the electrolyte at a level of between 0.5 wt %-4 wt %. In certain embodiments, the first passivating agent may be soluble in the electrolyte, or configured to dissolve and/or capable of dissolving at a level of at least 4 wt %.

In some embodiments, the first passivating agent comprises a nitrogen-containing compound. The nitrogen-containing compound may be present in an amount described herein for a first passivating agent. "Nitrogen-containing compounds", in accordance with various exemplary embodiments of the invention, include compounds including an N—O (e.g., nitro) functional group and/or an amine functional group. An N—O functional group may be defined as a functional group comprising a nitrogen atom bonded to an oxygen atom. Accordingly, in some embodiments, the first passivating agent is a N—O containing compound. In accordance with various exemplary aspects of these embodiments, one or more nitrogen-containing compounds may include one or more inorganic nitrates, organic nitrates, inorganic nitrites, organic nitrites, nitro compounds, amines, and other compounds including monomers, oligomers and/or polymers selected from the group consisting of: polyethylene imine, polyphosphazene, polyvinylpyrolidone, polyacrylamide, polyaniline, polyelectrolytes (e.g., having a nitro aliphatic portion as functional group), and amine groups, such as polyacrylamide, polyallylamine and polydiallyldimethylammonium chloride, polyimides, polybenzimidazole, polyamides, and the like. In some embodiments, the first passivating agent is a nitrogen-containing compound that is a non-solvent. In some embodiments, the first passivating agent is a nitrogen-containing compound that does not contain a nitrile group.

Examples of inorganic nitrates that may be used include, but are not limited to: lithium nitrate, sodium nitrate, potassium nitrate, calcium nitrate, cesium nitrate, barium nitrate, and ammonium nitrate. Examples of organic nitrates that may be used include, but are not limited to, pyridine nitrate, guanidine nitrate, and dialkyl imidazolium nitrates. By way of specific examples, a nitrate for use as the nitrogen-containing compound may be selected from the group consisting of lithium nitrate, sodium nitrate, potassium nitrate, calcium nitrate, cesium nitrate, barium nitrate, ammonium nitrate, pyridine nitrate, propyl nitrate, isopropyl nitrate and dialkyl imidazolium nitrates. The nitrate may be lithium nitrate and/or pyridine nitrate. The inorganic nitrate (s), if present, may be present in an amount described herein for a first passivating agent. The organic nitrate(s), if present, may be present in an amount described herein for a first passivating agent.

Examples of inorganic nitrites that may be used include, but are not limited to: lithium nitrite, sodium nitrite, potassium nitrite, calcium nitrite, cesium nitrite, barium nitrite, and ammonium nitrite. Examples of organic nitrites that may be used include, but are not limited to, ethyl nitrite, propyl nitrite, isopropyl nitrite, butyl nitrite, pentyl nitrite, and octyl nitrite. By way of specific examples, a nitrite for use as the nitrogen-containing compound may be selected from the group consisting of lithium nitrite, sodium nitrite, potassium nitrite, calcium nitrite, cesium nitrite, barium nitrite, ammonium nitrite and ethyl nitrite. The nitrite may be lithium nitrite.

Examples of nitro compounds that may be used include, but are not limited to: nitromethane, nitropropane, nitrobutanes, nitrobenzene, dinitrobenzene, nitrotoluene, dinitrotoluene, nitropyridine, dinitropyridine.

Examples of other organic N—O compounds that may be used include, but are not limited to pyridine N-oxide, alkylpyridine N-oxides, and tetramethyl piperidine N-oxyl (TEMPO).

The nitrogen-containing material may be a soluble compound (e.g., a compound soluble in the electrolyte), such as certain inorganic nitrates, organic nitrates, inorganic nitrites, organic nitrites, nitro compounds, amines, and other compounds as set forth above. Or, the nitrogen-containing material may be a substantially insoluble compound in the electrolyte. As used herein, "substantially insoluble" means less than 1 wt % or less than 0.5 wt % solubility of the compound in the electrolyte; all percents set forth herein are weight or mass percent, unless otherwise noted.

Substantially insoluble compounds can be formed by, for example, attaching an insoluble cation, monomer, oligomer, or polymer, such as polystyrene or cellulose, to a nitrogen-containing compound to form polynitrostyrene or nitrocellulose. One such substantially insoluble compound is octyl nitrate. Additionally or alternatively, compounds, such as salts of K, Mg, Ca, Sr, Al, aromatic hydrocarbons, or ethers such as butyl ether may be added to the electrolyte to reduce the solubility of nitrogen-containing compounds, such as inorganic nitrates, organic nitrates, inorganic nitrites, organic nitrites, organic nitro compounds, and the like, such that otherwise soluble or mobile nitrogen-containing materials become substantially insoluble and/or substantially immobile in the electrolyte.

Another approach to reducing the mobility and/or solubility of nitrogen-containing materials, to form substantially insoluble nitrogen-containing compounds, includes attaching an N—O (e.g., nitro) and/or amine functional group to a long carbon chain, having, for example, about 8 to about 25 carbon atoms, to form micellar-type structures, with the active groups (e.g., nitrates) facing the electrolyte solution.

In some embodiments, the first passivating agent comprises a structure as in Formula (II):

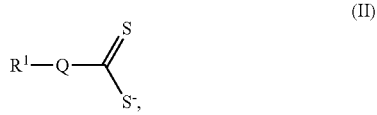

(II)

wherein Q is selected from the group consisting of Se, O, S, $PR^2$, $NR^2$, $CR^2_2$, and $SiR^2_2$, and each $R^1$ and $R^2$ can be the same or different, optionally connected. $R^1$ and $R^2$ may each independently comprise one or more of hydrogen; oxygen; sulfur; halogen; halide; nitrogen; phosphorus; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl. $R^1$ may be bonded to Q through a carbon-Q bond. For instance, $R^1$ may be $CH_3$, $CH_2OCH_3$, $CH_2SCH_3$, $CH_2CF_3$, $CH_2N(CH_3)_2$, and/or $CH_2P(CH_3)_2$. The structure shown in Formula (II) may be present in an amount described herein for a first passivating agent.

In certain embodiments, Q is selected from the group consisting of Se, O, S, $PR^2$, $CR^2_2$, and $SiR^2_2$, and each $R^1$ and $R^2$ can be the same or different, optionally connected. $R^1$ and $R^2$ may each independently comprise one or more of hydrogen; oxygen; sulfur; halogen; halide; nitrogen; phosphorus; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl. $R^1$ may be bonded to Q through a carbon-Q bond. In some embodiments, $R^1$ is an alkyl group, such as an alkyl group with fewer than five carbons. In some embodiments, $R^2$ is an alkyl group, such as an alkyl group with fewer than five carbons. In some embodiments, both $R^1$ and $R^2$ are alkyl groups, and/or both $R^1$ and $R^2$ are alkyl groups with fewer than five carbons. In some embodiments, $R^1$ may be $CH_3$, $CH_2OCH_3$, $CH_2SCH_3$, $CH_2CF_3$, $CH_2N(CH_3)_2$, and/or $CH_2P(CH_3)_2$.

In certain embodiments, Q is selected from the group consisting of Se, O, S, $NR^2$, $PR^2$, $CR^2_2$, and $SiR^2_2$. In some embodiments, Q is O or $NR^2$. In another embodiment, Q is $NR^2$. Q may be $NR^2$ and both $R^1$ and $R^2$ may be alkyl groups, such as alkyl groups with fewer than five carbons. In some embodiments, Q is O. Q may be O and $R^1$ may be an alkyl group, such as an alkyl group with fewer than five carbons. In a particular embodiment, Q is sulfur. In some embodiments, the first passivating agent is a xanthate salt comprising a structure as in Formula (II) such that Q is oxygen. The xanthate salt may be present in an amount described herein for a first passivating agent. In certain embodiments, the first passivating agent is a dithiocarbamate salt comprising a structure in Formula (II) such that Q is $NR^2$. The dithiocarbamate salt may be present in an amount described herein for a first passivating agent. In an exemplary embodiment, the first passivating agent comprises a structure as in Formula (II) wherein Q is oxygen and $R^1$ is $C_2H_5$. In another exemplary embodiment, the first passivating agent comprises a structure as in Formula (II) wherein Q is sulfur and $R^1$ is $C_2H_5$. In yet another exemplary embodiment, the first passivating agent comprises a structure as in Formula (II) wherein Q is $NR^2$, and $R^1$ and $R^2$ are each $C_2H_5$. In a third exemplary embodiment, the first passivating agent comprises a structure as in Formula (II) where Q is O and $R^1$ is a tert-butyl group.

In some embodiments, the first passivating agent comprises a tert-butyl xanthate anion or a triazole-dithiocarbamate anion.

In certain embodiments, the first passivating agent comprising a structure as in Formula (II) further comprises a cation. In certain embodiments, the cation is selected from the group consisting of $Li^+$, $Na^+$, $K^+$, $Cs^+$, $Rb^+$, $Ca^{+2}$, $Mg^{+2}$, substituted or unsubstituted ammonium, and organic cations such as guanidinium or imidazolium. In some cases, the first passivating agent may be polyanionic.

In some embodiments, the first passivating agent comprises one or more of lithium xanthate, potassium xanthate, lithium ethyl xanthate, potassium ethyl xanthate, lithium isobutyl xanthate, potassium isobutyl xanthate, lithium tert-butyl xanthate, potassium tert-butyl xanthate, lithium dithiocarbamate, potassium dithiocarbamate, lithium diethyldithiocarbamate, and potassium diethyldithiocarbamate.

In certain embodiments, $R^1$ may be a repeat unit of a polymer, Q may be oxygen, and the first passivating agent may be a polymer which comprises xanthate functional groups. Suitable polymers which comprise xanthate functional groups may comprise one or more monomers with a xanthate functional group. In some embodiments, polymers which comprise xanthate functional groups may be copolymers which comprise two or more monomers, at least one of which comprises a xanthate functional group.

According to certain embodiments, the first passivating agent may comprise a structure as in Formula (III):

(III)

wherein each $R^1$ and $R^2$ can be the same or different, optionally connected. $R^1$ and $R^2$ may each independently comprise one or more of hydrogen; oxygen; sulfur; halogen;

halide; nitrogen; phosphorus; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl. $R^1$ and/or $R^2$ may be bonded to the nitrogen atom through a carbon-nitrogen bond. For instance, $R^1$ and $R^2$ may each independently be $CH_3$, $CH_2OCH_3$, $CH_2SCH_3$, $CH_2CF_3$, $CH_2N(CH_3)_2$, and/or $CH_2P(CH_3)_2$. The structure shown in Formula (III) may be present in an amount described herein for a first passivating agent.

In certain embodiments, the first passivating agent comprising a structure as in Formula (III) further comprises a cation. In certain embodiments, the cation is selected from the group consisting of $Li^+$, $Na^+$, $K^+$, $Cs^+$, $Rb^+$, $Ca^{+2}$, $Mg^{+2}$, substituted or unsubstituted ammonium, and organic cations such as guanidinium or imidazolium. In some cases, the first passivating agent may be polyanionic.

According to some embodiments, the first passivating agent may comprise lithium carbamate and/or potassium carbamate.

In certain embodiments, at least one of $R^1$ and $R^2$ may be a repeat unit of a polymer and the first passivating agent may be a polycarbamate. Suitable polycarbamates may comprise one or more monomers having a carbamate functional group. In some embodiments, polycarbamates may be copolymers which comprise two or more monomers, at least one of which comprises a carbamate functional group.

As described herein, in some embodiments, the first passivating agent is derived from a first passivating agent precursor. In certain embodiments, the electrochemical cell comprises the first passivating agent precursor such that, for example, the first passivating agent precursor oxidizes into a first passivating agent as described herein after being incorporated into the electrochemical cell. For instance, in some embodiments, the first passivating agent may be formed from the first passivating agent precursor during charge/discharge of the electrochemical cell. For example, in some cases, the first passivating agent precursor may be added to the electrochemical cell (e.g., in the electrolyte, as part of a first or second electrode, as part of a layer in the cell) where at least a portion of the first passivating agent precursor forms a first passivating agent as described herein.

In some embodiments, the first passivating agent precursor comprises a structure as in Formula (IV):

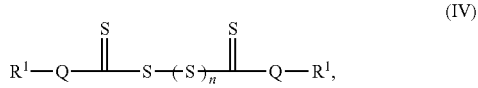
(IV)

wherein each Q is independently selected from the group consisting of Se, O, S, $PR^2$, $NR^2$, $CR^2{}_2$, and $SiR^2{}_2$, and each $R^1$ and $R^2$ can be the same or different, optionally connected. $R^1$ and/or $R^2$ may each independently comprise one or more of hydrogen; oxygen; sulfur; halogen; halide; nitrogen; phosphorus; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl. $R^1$ may be bonded to Q through a carbon-Q bond. For instance, $R^1$ may be $CH_3$, $CH_2OCH_3$, $CH_2SCH_3$, $CH_2CF_3$, $CH_2N(CH_3)_2$, and/or $CH_2P(CH_3)_2$. In certain embodiments, each occurrence of Q is independently selected from the group consisting of Se, O, S, $NR^2$, $PR^2$, $CR^2{}_2$, and $SiR^2{}_2$. The structure shown in Formula (IV) may be present in an amount described herein for a first passivating agent.

In some cases, each Q may be the same or different and selected from the group consisting of oxygen, sulfur, and $NR^2$. In a particular embodiment, each Q is the same and is sulfur. In another embodiment, each Q is the same and is $NR^2$. In some embodiments, each Q is the same and is oxygen.

In an exemplary embodiment the first passivating agent precursor comprises a structure as in Formula (IV) wherein each Q is the same and is oxygen and $R^1$ is $C_2H_5$. In another exemplary embodiment, the first passivating agent precursor comprises a structure as in Formula (IV) wherein each Q is the same and is sulfur and $R^1$ is $C_2H_5$. In yet another exemplary embodiment, the first passivating agent precursor comprises a structure as in Formula (IV) wherein each Q is the same and is $NR^2$, wherein $R^1$ and $R^2$ are each $C_2H_5$.

In some embodiments, n is 1 (such that the first passivating agent precursor comprises a disulfide bridge). In certain embodiments, n is 2-6 (such that the first passivating agent precursor comprises a polysulfide). In some cases, n is 1, 2, 3, 4, 5, 6, or combination thereof (e.g., 1-3, 2-4, 3-5, 4-6, 1-4, or 1-6).

According to certain embodiments, the first passivating agent may comprise a solvent. The solvent may be present in an amount described herein for a first passivating agent. As used herein, a solvent may be any species which results in the solvation of any other component of the electrochemical cell. In some embodiments, the first passivating agent may comprise an ether with an aliphatic, cyclic, and/or acyclic chemical structure. Examples of acyclic ethers that may be used include, but are not limited to, diethyl ether, dipropyl ether, dibutyl ether, dimethoxymethane, trimethoxymethane, 1,2-dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyl-tetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. In some embodiments, the first passivating agent may comprise dioxane and/or 1,4-dioxolane.

Other first passivating agents are also possible. For example, a first passivating agent may comprise a species comprising a vinyl group, such as vinylene carbonate. The species comprising a vinyl group may be present in an amount described herein for a first passivating agent. As another example, a first passivating agent may comprise a sultone. The species comprising a sultone may be present in an amount described herein for a first passivating agent. In some embodiments, a first passivating agent comprises a sultone comprising a vinyl group, such as prop-1-ene-1,3-sultone. Without wishing to be bound by any particular theory, it is believed that first passivating agents comprising a vinyl group may react to form oligomers and/or polymers disposed on the first electrode. The oligomers and/or polymers disposed on the first electrode may form a layer thereon (e.g., a passivating layer) that reduces the decomposition of one or more species on the first electrode, such as the decomposition of one or more species present in the electrolyte at the first electrode.

In some embodiments, a first passivating agent comprises a species comprising an (oxalato)phosphate group. For example, the first passivating agent may comprise lithium tris(oxalato)phosphate.

The first passivating agent may be present in an electrochemical cell in any suitable amount. The first passivating agent may be present, in some cases, in the electrochemical cell in an amount less than or equal to about 20 wt % versus the total weight of the electrolyte (including any dissolved or added components such as the first passivating agent and the second passivating agent). For example, in some embodiments, the total weight of the first passivating agent present in the electrochemical cell is less than or equal to about 20 wt %, less than or equal to about 18 wt %, less than or equal to about 15 wt %, less than or equal to about 12 wt %, less than or equal to about 10 wt %, less than or equal to about 8 wt %, less than or equal to about 6 wt %, less than or equal to about 5 wt %, less than or equal to about 4 wt %, less than or equal to about 3 wt %, less than or equal to about 2 wt %, or less than or equal to about 1 wt % versus the total weight of the electrolyte. In certain embodiments, the total weight of the first passivating agent present in the electrochemical cell is greater than about 0.1 wt %, greater than about 0.2 wt %, greater than about 0.5 wt %, greater than about 1 wt %, greater than about 2 wt %, greater than about 3 wt %, greater than about 4 wt %, greater than about 6 wt %, greater than about 8 wt %, greater than about 10 wt %, or greater than about 15 wt % versus the total weight of the electrolyte. Combinations of the above-referenced ranges are also possible (e.g., between about 0.1 wt % and about 20 wt %, between about 0.5 wt % and about 20 wt %, between 0.5 wt % and about 4 wt %, between about 1 wt % and about 8 wt %, between about 4 wt % and about 10 wt %, between about 6 wt % and about 15 wt %, or between about 8 wt % and about 20 wt %). Other ranges are also possible. It should be understood that in embodiments where more than one first passivating agent is present (e.g., an electrochemical cell comprising a nitrogen-containing compound and a solvent that is a first passivating agent), the total weight of the first passivating agent should be understood to refer to the sum of the weights of each first passivating agent present in the electrochemical cell.

The first passivating agent may be present, in some cases, in the electrochemical cell in an amount less than or equal to about 100 wt % versus the total weight of the electroactive material within the first electrode. For example, in some embodiments, the total weight of the first passivating agent present in the electrochemical cell is less than or equal to about 100 wt %, less than or equal to about 80 wt %, less than or equal to about 60 wt %, less than or equal to about 40 wt %, less than or equal to about 20 wt %, less than or equal to about 18 wt %, less than or equal to about 15 wt %, less than or equal to about 12 wt %, less than or equal to about 10 wt %, less than or equal to about 8 wt %, less than or equal to about 6 wt %, less than or equal to about 5 wt %, less than or equal to about 4 wt %, less than or equal to about 3 wt %, less than or equal to about 2 wt %, or less than or equal to about 1 wt % versus the total weight of the electroactive material within the first electrode. In certain embodiments, the total weight of the first passivating agent present in the electrochemical cell is greater than about 0.5 wt %, greater than about 1 wt %, greater than about 2 wt %, less than or equal to about 3 wt %, greater than about 4 wt %, greater than about 6 wt %, greater than about 8 wt %, greater than about 10 wt %, greater than about 15 wt %, greater than about 20 wt %, greater than about 40 wt %, greater than about 60 wt %, or greater than or equal to about 80 wt % versus the total weight of the electroactive material within the first electrode. Combinations of the above-referenced ranges are also possible (e.g., between about 0.5 wt % and about 20 wt %, between about 1 wt % and about 8 wt %, between about 4 wt % and about 10 wt %, between about 6 wt % and about 15 wt %, between about 8 wt % and about 20 wt %, or between about 20 wt % and 100 wt %). Other ranges are also possible.

In some embodiments, the wt % of first passivating agent is measured prior to first use or first discharge of the electrochemical cell using known amounts of the various components. In other embodiments, the wt % is measured at a point in time during the cycle life of the cell. In some such embodiments, the cycling of an electrochemical cell may be stopped and the wt % of the first passivating agent in the electrolyte may be determined using, for example, gas chromatography-mass spectrometry. Other methods such as NMR, inductively coupled plasma mass spectrometry (ICP-MS), and elemental analysis can also be used.

The ratio of the total weight of the first passivating agent to the total weight of the second passivating agent in the electrochemical cell may be any suitable value. In some embodiments, the ratio of the total weight of the first passivating agent to the total weight of the second passivating agent may be greater than or equal to 0.25, greater than or equal to 0.5, greater than or equal to 0.75, greater than or equal to 1, greater than or equal to 1.25, greater than or equal to 1.5, greater than or equal to 1.75, greater than or equal to 2, or greater than or equal to 2.5. In certain embodiments, the ratio of the total weight of the first passivating agent to the total weight of the second passivating agent may be less than or equal to 3, less than or equal to 2.5, less than or equal to 2, less than or equal to 1.75, less than or equal to 1.5, less than or equal to 1.25, less than or equal to 1, less than or equal to 0.75, or less than or equal to 0.5. Combinations of the above-referenced ranges are also possible (e.g., greater than or equal to 0.5 and less than or equal to 2). Other ranges are also possible.

In some embodiments, a suitable second passivating may reduce or prevent decomposition of the first passivating agent and/or a component of the electrolyte during electrochemical cell cycling. Decomposition of the first passivating agent and/or electrolyte component(s) can be measured by any suitable means, such as cyclic voltammetry and/or gas analysis. For example, cyclic voltammetry experiments may display peaks at voltages where electrochemical cell components decompose and gas analysis may show evolution of gases indicative of electrochemical cell component decomposition at these voltages. In some embodiments, electrochemical cells comprising a second passivating agent may, when subject to cyclic voltammetry, show a peak having a smaller magnitude or not show a decomposition peak which would be present in an otherwise identical cell which lack the second passivating agent. According to some embodiments, electrochemical cells comprising a second passivating agent may emit fewer gases during electrochemical cell cycling than otherwise identical cells which lack the second passivating agent. According to some embodiments, electrochemical cells comprising a second passivating agent may emit a smaller amount of gas during electrochemical cell cycling than otherwise identical cells which lack the second passivating agent.

As described above, an electrochemical cell may comprise a protective layer disposed on an electrode, such as a protective layer disposed on a first electrode and/or an anode. When present, the protective layer may protect the electrode on which it is disposed. For instance, the protective layer may shield the electrode from the electrolyte such that the electrode interacts with the electrolyte to a reduced degree (e.g., a substantially reduced degree) and/or such that it does not interact with the electrolyte at all. In some embodiments, the protective layer may shield the electrode from one or more electrolyte components (e.g., a species in the electrolyte that may decompose and/or undergo a deleterious reaction thereon) such that the electrode interacts with the electrolyte component(s) to a substantially reduced degree and/or such that it does not interact with the electrolyte component(s) at all.

When present, the protective layer may be porous. Without wishing to be bound by any particular theory, it is believed that protective layers with certain desirable pore morphologies may allow the electrode on which they are disposed to interact favorably with certain favorable electrolyte components. As an example, certain porous protective layers may allow the electrode on which they are disposed to interact with one or more passivating agents configured to passivate that electrode. Then, the protective layer may protect a passivated electrode. Such protective layers may, in certain cases, also reduce or eliminate interactions between the electrode and other unfavorable electrolyte components. In some aspects, the protective layer may be substantially porous (e.g., have a relatively high porosity). In certain aspects, the protective layer may have a porosity of at least about 25%, at least about 50%, at least about 75%, at least about 80%, at least about 90%, at least about 95%, at least about 97%, at least about 98%, at least about 99%, or at least about 99.5%. In some aspects, the protective layer may have a porosity of less than or equal to about 99.9%, less than or equal to about 99.5%, less than or equal to about 99%, less than or equal to about 98%, less than or equal to about 97%, less than or equal to about 95%, less than or equal to about 90%, less than or equal to about 80%, less than or equal to about 75%, or less than or equal to about 50%. Combinations of the above-referenced ranges are also possible (e.g., at least about 25% and less than or equal to about 99.9%, or at least about 25% and less than or equal to about 80%). Other ranges are also possible. Porosity can be determined by Brunauer-Emmett-Teller porosity.

In some embodiments, a protective layer may be non-porous, or may include pores that have a structure that does not allow interaction of the electrode on which it is disposed with one or more passivating agent(s) for that electrode. In such embodiments, the presence of passivating agents in the electrochemical cell may still be beneficial. Such passivating agents may be configured to passivate any portions of the surface of the electrode that are exposed to the electrolyte due to imperfections in the protective layer and/or due to damage of the protective layer during electrochemical cell operation. For instance, the passivating agent may passivate any portions of the electrode surface exposed to the electrolyte by pinholes in the protective layer, and/or to any portions of the electrode surface exposed to electrolyte by cracks that develop in the protective layer during electrochemical cell cycling.

In some embodiments, a protective layer (or the material used to form the protective layer, i.e., a protective layer material) may be conductive to lithium ions.

In some embodiments, the lithium ion conductivity of the protective layer (or the material used to form the protective layer, i.e., a protective layer material) is greater than or equal to $10^{-10}$ S/cm, greater than or equal to 10 S/cm, greater than or equal to $10^{-8}$ S/cm, greater than or equal to $10^{-7}$ S/cm, greater than or equal to $10^{-6}$ S/cm, greater than or equal to $10^{-5}$ S/cm, greater than or equal to $10^{-4}$ S/cm, greater than or equal to $10^{-3}$ S/cm, greater than or equal to $10^{-2}$ S/cm, or greater than or equal to $10^{-1}$ S/cm. The lithium ion conductivity of the protective layer (or the material used to form the protective layer, i.e., a protective layer material) may be less than or equal to 1 S/cm, less than or equal to $10^{-1}$ S/cm, less than or equal to $10^{-2}$ S/cm, less than or equal to $10^{-3}$ S/cm, less than or equal to $10^{-4}$ S/cm, less than or equal to $10^{-5}$ S/cm, less than or equal to $10^{-6}$ S/cm, less than or equal to $10^{-7}$ S/cm, less than or equal to $10^{-8}$ S/cm, or less than or equal to $10^{-9}$ S/cm. Combinations of the above-referenced ranges are also possible (e.g., greater than or equal to $10^{-10}$ S/cm and less than or equal to 1 S/cm, or greater than or equal to $10^{-5}$ S/cm and less than or equal to 1 S/cm). Other ranges are also possible. The average ion conductivity of the protective layer can be determined by employing a conductivity bridge (i.e., an impedance measuring circuit) operating at 1 kHz on a separator pressed between two copper cylinders at a pressure of up to 3 tons/cm². The average ion conductivity (i.e., the inverse of the average resistivity) can be measured at 500 kg/cm² increments. In some such embodiments, the pressure is increased until changes in average ion conductivity are no longer observed in the sample.

In some embodiments, the material used to form the protective layer (i.e., a protective layer material) is substantially non-ionically conductive (e.g., not substantially conductive to lithium ions).

In some embodiments, a protective layer is electrically insulating. The protective layer may allow a relatively large amount of lithium ion transport therethrough while allowing a relatively small amount of electron transport therethrough.

When present, the protective layer may comprise one or more glasses, ceramics, glassy-ceramics, and/or polymers. In some embodiments, an electrochemical cell comprises a protective layer having a chemical composition and/or one or more properties of as described in one or more of the following, each of which is incorporated by reference herein in its entirety: U.S. Patent Publication No. 2016/0344067, U.S. Pat. No. 9,825,328, US. Patent Publication No. 2017/0338475, and U.S. Provisional Application No. 62/510,430.

Suitable active electrode materials for use in the first electrode (e.g., as an anode active electrode species in an anode of an electrochemical cells described herein) include, but are not limited to, lithium metal such as lithium foil and lithium deposited onto a substrate, and lithium alloys (e.g., lithium-aluminum alloys and lithium-tin alloys). Lithium can be contained as one film or as several films, optionally separated by a protective material such as a ceramic material or an ion conductive material described herein. Suitable ceramic materials include silica-, alumina-, and/or lithium-containing glassy materials such as lithium phosphates, lithium aluminates, lithium silicates, lithium carbonates, lithium oxides, lithium phosphorous oxynitrides, lithium tantalum oxide, lithium aluminosulfides, lithium titanium oxides, lithium silcosulfides, lithium germanosulfides, lithium aluminosulfides, lithium borosulfides, lithium phosphosulfides, and combinations of two or more of the preceding. Suitable lithium alloys for use in the embodiments described herein can include alloys of lithium and aluminum, magnesium, silicium (silicon), indium, silver, and/or tin. While these materials may be preferred in some embodiments, other cell chemistries are also contemplated. In some embodiments, the first electrode may comprise one or more binder materials (e.g., polymers, etc.).

In some embodiments, the thickness of the first electrode may vary from, e.g., about 1 to about 200 microns. For instance, the first electrode may have a thickness of less than about 200 microns, less than about 100 microns, less than about 50 microns, less than about 25 microns, less than about 10 microns, or less than about 5 microns. In certain embodiments, the first electrode may have a thickness of greater than or equal to about 1 micron, greater than or equal to about 5 microns, greater than or equal to about 10 microns, greater than or equal to about 25 microns, greater than or equal to about 50 microns, greater than or equal to about 100 microns, or greater than or equal to about 150 microns. Combinations of the above-referenced ranges are also possible (e.g., between about 1 micron and about 200 microns, between about 1 micron and about 100 microns, between about 5 microns and about 50 microns, between about 5 microns and about 25 microns, or between about 10 microns and about 25 microns). Other ranges are also possible. The choice of the thickness may depend on cell design parameters such as the excess amount of lithium desired, cycle life, and the thickness of the second electrode.

In some embodiments, the electroactive material within a second electrode (e.g., a cathode active electrode species in a cathode of an electrochemical cell described herein) can comprise metal oxides. In some embodiments, an intercalation electrode (e.g., a lithium-intercalation cathode, also referred to herein as a lithium ion intercalation cathode) may be used (e.g., as a second electrode). Non-limiting examples of suitable materials that may intercalate ions of an electroactive material (e.g., alkaline metal ions) include oxides, titanium sulfide, and iron sulfide. In some embodiments, the second electrode may comprise an intercalation electrode that comprises a lithium transition metal oxide or a lithium transition metal phosphate. Additional examples include $Li_xCoO_2$ (also referred to herein as lithium cobalt oxide; e.g., $Li_{1.1}CoO_2$), $Li_xNiO_2$, $Li_xMnO_2$, $Li_xMn_2O_4$ (e.g., $Li_{1.06}Mn_2O_4$), $Li_xCoPO_4$, $Li_xMnPO_4$, $LiCo_xNi_{(1-x)}O_2$, and $LiCo_xNi_yMn_{(1-x-y)}O_2$ (also referred to herein as lithium nickel manganese cobalt oxide; e.g., $LiNi_{1/3}Mn_{1/3}Co_{1/3}O_2$, $LiNi_{3/5}Mn_{1/5}Co_{1/5}O_2$, $LiNi_{4/5}Mn_{1/10}Co_{1/10}O_2$, $LiNi_{1/2}Mn_{3/10}Co_{1/5}O_2$). X (e.g., for intercalation cathodes with a chemical composition $Li_xM_yO_z$ as described elsewhere herein, where M is a metal or combination of metals) may be greater than or equal to 0 and less than or equal to 2. X is typically greater than or equal to 1 and less than or equal to 2 when the electrochemical cell is fully discharged, and less than 1 when the electrochemical cell is fully charged. In some embodiments, a fully charged electrochemical cell may have a value of x that is greater than or equal to 1 and less than or equal to 1.05, greater than or equal to 1 and less than or equal to 1.1, or greater than or equal to 1 and less than or equal to 1.2. Further examples include $Li_xNiPO_4$, where $0<x\leq1$, $LiMn_xNi_yO_4$ where x+y=2 (e.g., $LiMn_{1.5}Ni_{0.5}O_4$), $LiNi_xCo_yAl_zO_2$ where x+y+z=1 (also referred to herein as lithium nickel cobalt aluminum oxide), $LiFePO_4$ (also referred to herein as lithium iron phosphate), and combinations thereof. In some embodiments, the electroactive material within the second electrode can comprise lithium transition metal phosphates (e.g., $LiFePO_4$), which can, in certain embodiments, be substituted with borates and/or silicates.

In certain embodiments, the electroactive material within a second electrode (e.g., a cathode active electrode species in a cathode of an electrochemical cell described herein) can comprise electroactive transition metal chalcogenides, electroactive conductive polymers, and/or electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a second electrode (e.g., as a cathode active electrode species in the cathode of the electrochemical cells described herein) can comprise an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. In certain embodiments, it may be desirable to use polypyrroles, polyanilines, and/or polyacetylenes as conductive polymers.

In some embodiments, an electrochemical cell described herein is designed to include a second electrode with an electroactive material (e.g., a cathode active electrode species in a cathode of an electrochemical cell described herein) having a moderate voltage with respect to lithium metal. The voltage of an electroactive material with respect to lithium metal may be measured by first cycling an electrochemical cell comprising the electroactive material and lithium metal at least four times (e.g., 5 times, 6 times, 8 times, 10 times) at a rate of C/5, then discharging the electrochemical cell at a rate of C/5 and measuring the voltage as the cell discharges. The average voltage measured over the discharge process is then determined, and this value is considered to be the voltage with respect to lithium metal. In certain embodiments, the electroactive material within the second electrode has a voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has a voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

In some embodiments, an electrochemical cell described herein is designed to include a second electrode with an electroactive material (e.g., a cathode active electrode species in a cathode of an electrochemical cell described herein) having a moderate open circuit voltage with respect to lithium metal. The open circuit voltage of an electroactive material with respect to lithium metal may be measured by determining the open circuit voltage of a battery comprising the electroactive material and lithium metal when the battery is charged to half its capacity. This may be accomplished by first determining the capacity of the battery by cycling the battery. The battery can then be charged to half of its measured capacity and allowed to rest for two minutes. After these steps, the open circuit voltage may be measured. In certain embodiments, the electroactive material within the second electrode has an open circuit voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has an open circuit voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

Characteristics of electroactive materials (e.g., for a second electrode) other than their voltages and open circuit voltages with respect to lithium may also be relevant in some embodiments. For example, in some embodiments, an electrochemical cell may include a second electrode comprising an electroactive material (e.g., a cathode active electrode species in a cathode of an electrochemical cell described herein) that exhibits one or more plateaus in the value of voltage with respect to lithium as a function of cycle life during charging and/or discharging, and the value of the plateau(s) may be one or more of the values described above in relation to the voltage of the material with respect to lithium metal. As used herein, an electroactive material exhibits a plateau (i.e., a plateau voltage) when it shows a constant or substantially constant voltage (e.g., varying by less than or equal to 10%, or less than or equal to 5%) with respect to lithium during at least some portion of a charging and/or discharging procedure. The voltage at which a plateau occurs for an electroactive material (i.e., a plateau voltage) may be determined by employing the same procedure used to determine the voltage of an electroactive material with respect to lithium metal, evaluating whether any regions consistent with plateaus are observed, and determining the average voltage in those region(s) if present. In certain embodiments, the electroactive material within the second electrode has a plateau voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has a plateau voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

As another example, the electrochemical cell may include a second electrode comprising an electroactive material that would be suitable for charging to less than 5 V, less than 4.5 V, less than 4 V, or less than 3.5 V under normal operating conditions (e.g., if one were to charge the second electrode to, e.g., 5 V, 4.5 V, 4 V, or 3.5 V or higher, respectively, it would typically be considered an abuse test, would not be recommended by the manufacturer, and/or would present safety concerns).

In some embodiments, one or more of the voltages measured during the charge and/or discharge process in a cell comprising a lithium metal electrode (e.g., maximum voltage, minimum voltage, median voltage, modal voltage) may have one or more of the values described above in relation to the average voltage. In certain embodiments, the electroactive material within the second electrode has a maximum voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has a maximum voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

In certain embodiments, the electroactive material within the second electrode has a minimum voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has a minimum voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

In certain embodiments, the electroactive material within the second electrode has a median voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has a median voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

In certain embodiments, the electroactive material within the second electrode has a modal voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has a modal voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

Table 1, below, shows the voltage with respect to lithium metal of several cathode materials.

TABLE 1

| Material | Voltage (V) |
|---|---|
| FeS | 1.2-1.5 |
| $FeS_2$ | 1.4-1.6 |
| $BiPb_2O_5$ | 1.5 |
| $Bi_2O_3$ | 1.5 |
| CuO | 1.5 |
| CuS | 1.5 |
| PbCuS | 1.5 |
| Electroactive conductive polymers | <2-3.7 |
| Transition metal sulfides and selenides | 1.2-2.1 |
| Sulfur | 2.1-2.2 |
| $Ag_2V_4O_{11}$ | 2.5 (first plateau); 1.5 (second plateau) |
| $I_2$ | 2.8 |
| $SO_2$ | 2.85 |
| $MnO_2$ | 3 |
| $(CF)_x$ | 3 |
| $Ag_2CrO_4$ | 3.1 (first plateau); 2.6 (second plateau) |
| $LiFePO_4$ | 3.3 |
| $V_2O_5$ | 3.3 (first plateau); 2.4 (second plateau) |
| $CuCl_2$ | 3.3 (first plateau); 2.9 (second plateau); 2.5 (third plateau) |
| $SOCl_2$ | 3.5 (3.7-3.8 in the presence of BrCl) |
| $SO_2Cl_2$ | 3.7 |
| $CoO_2$ | 4 |
| $LiNi_xMn_yCo_zO_2$ where $x + y + z = 1$ | 4.0 |
| $LiNiO_2$ | 4.0 |
| $LiMn_2O_4$ | 4.1 (first plateau); 3.9 (second plateau) |
| $Li_xMnPO_4$ | 4.1 |
| $LiCoO_2$ | 4.2 |
| $LiMn_{3/2}Ni_{1/2}O_4$ | 4.7-5.1 |
| $LiCoPO_4$ | 4.8 |
| $Li_xNiPO_4$ | 5.1 |

Without wishing to be bound by any theory, the use of electrodes with moderate voltages (e.g., as a second electrode, or cathode) may be beneficial because they may result in the battery having a higher theoretical energy density, compared to the use of relatively lower voltage electrodes. However, moderate voltage electrodes may also have enhanced reactivity towards one or more electrolyte components, which may cause chemical reactions that have negative effects on battery performance, such as lower cycle life. For example, in some embodiments, a moderate voltage electrode may react with certain species in the electrolyte (e.g., a first passivating agent), which may cause the generation of gaseous byproducts and/or a reduction in the cycle life of the cell. For instance, some first passivating agents may have minimal or no reactivity towards a cathode having a relatively lower voltage with respect to lithium metal, but may have reactivity (e.g., higher reactivity) towards a cathode having a moderate voltage with respect to lithium metal. In some such embodiments, the battery including a cathode having a relatively lower voltage with respect to lithium metal may have a lower theoretically energy density but longer cycle life compared to a battery including a cathode having a moderate voltage with respect to lithium metal, all other factors being equal. When a second passivating agent described herein is present in the battery, however, it may passivate the second electrode, thereby reducing the reactivity of the second electrode with the first passivating agent. Therefore, the presence of a second passivating agent in addition to a first passivating agent may have a beneficial effect on cell performance, e.g., when the electrochemical cell comprises a moderate voltage electrode (e.g., as a second electrode, or cathode). For instance, the battery including a cathode having a moderate voltage with respect to lithium metal may have both a higher theoretically energy density and a comparable cycle life compared to the battery including a cathode having a relatively lower voltage with respect to lithium metal, when first and second passivating agents are included in each of the batteries. As used herein, moderate voltage electrodes/cathodes are electrodes/cathodes with a voltage with respect to lithium metal of greater than or equal to 2.8 V and less than or equal to 4.5 V.

It should be appreciated, however, that other benefits may arise from the use of first and second passivating agents described herein, and that such combinations may be used with electrodes that do not have a moderate voltage with respect to lithium metal in some embodiments.

In some embodiments, active electrode materials for use as electroactive materials in second electrodes (e.g., cathodes) in electrochemical cells described herein include electroactive sulfur-containing materials (e.g., lithium-sulfur electrochemical cells). "Electroactive sulfur-containing materials," as used herein, relates to (i.e., refers to) electroactive materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In certain embodiments, the sulfur-containing material (e.g., in an oxidized form) comprises a polysulfide moiety, $S_m$, selected from the group consisting of covalent $S_m$ moieties, ionic $S_m^-$ moieties, and ionic $S_m^{2-}$ moieties, wherein m is an integer equal to or greater than 3. In some embodiments, m of the polysulfide moiety $S_m$ of the sulfur-containing polymer is an integer equal to or greater than 6 or an integer equal to or greater than 8. In some cases, the sulfur-containing material may be a sulfur-containing polymer. In some embodiments, the sulfur-containing polymer has a polymer backbone chain and the polysulfide moiety $S_m$ is covalently bonded by one or both of its terminal sulfur atoms as a side group to the polymer backbone chain. In certain embodiments, the sulfur-containing polymer has a polymer backbone chain and the polysulfide moiety $S_m$ is incorporated into the polymer backbone chain by covalent bonding of the terminal sulfur atoms of the polysulfide moiety.

In some embodiments, the electroactive sulfur-containing material comprises more than 50% by weight of sulfur. In certain embodiments, the electroactive sulfur-containing material comprises more than 75% by weight of sulfur (e.g., more than 90% by weight of sulfur).

As will be known by those skilled in the art, the nature of the electroactive sulfur-containing materials described herein may vary widely. In some embodiments, the electroactive sulfur-containing material comprises elemental sulfur.

In certain embodiments, the electroactive sulfur-containing material comprises a mixture of elemental sulfur and a sulfur-containing polymer.

In certain embodiments, an electrochemical cell as described herein, comprises one or more cathodes comprising sulfur as an electroactive electrode species (e.g., a second electrode). In some such embodiments, the cathode includes elemental sulfur as a electroactive electrode species. In some embodiments, the additive is chosen such that the additive is different from the electroactive species of the first electrode (e.g., the anode) and different from the electroactive species of the second electrode (e.g., of the cathode). For example, first passivating agents and/or second passivating agents may be chosen such that they are different from the electroactive species of the first electrode (e.g., the anode) and different from the electroactive species of the second electrode (e.g., of the cathode). In certain embodiments, the additive precursor is chosen such that the additive precursor is different from the electroactive species of the first electrode and different from the electroactive species of the second electrode. For example, first passivating agent precursors and/or second passivating agent precursors may be chosen such that they are different from the electroactive species of the first electrode (e.g., the anode) and different from the electroactive species of the second electrode (e.g., of the cathode).

It can be advantageous, according to certain embodiments, to apply an anisotropic force to the electrochemical cells described herein during charge and/or discharge. In certain embodiments, the electrochemical cells and/or the electrodes described herein can be configured to withstand an applied anisotropic force (e.g., a force applied to enhance the morphology of an electrode within the cell) while maintaining their structural integrity. In some embodiments, a passivating layer (e.g., a passivating layer disposed on a first electrode such as an anode, a passivating layer disposed on a second electrode such as a cathode) may be configured to withstand an applied anisotropic force while maintaining its structural integrity. The application of force to an electrochemical cell comprising one or more passivating agents may cause the formation of a passivating layer with beneficial properties (e.g., in comparison to the passivating layer that would form in the absence of force) and/or may enhance the ability of the passivating agent(s) to passivate the electrode(s). The application of force to a passivating layer disposed on an electrode may enhance the ability of the passivating layer to passivate the electrode on which it is disposed.

In certain embodiments, any of the electrodes described herein can be part of an electrochemical cell that is constructed and arranged such that, during at least one period of time during charge and/or discharge of the cell, an anisotropic force with a component normal to the active surface of an electrode within the electrochemical cell (e.g., an anode comprising lithium metal and/or a lithium alloy) is applied to the cell. In certain embodiments, any of the passivating layers described herein can be part of an electrochemical cell that is constructed and arranged such that, during at least one period of time during charge and/or discharge of the cell, an anisotropic force with a component normal to the active surface of an electrode within the electrochemical cell (e.g., an anode comprising lithium metal and/or a lithium alloy) is applied to the cell. In one set of embodiments, the applied anisotropic force can be selected to enhance the morphology of an electrode (e.g., an anode such as a lithium metal and/or a lithium alloy anode), and/or of a passivating layer (e.g., of a passivating layer disposed on an anode such as lithium metal and/or a lithium alloy anode).

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

Figure 4D:
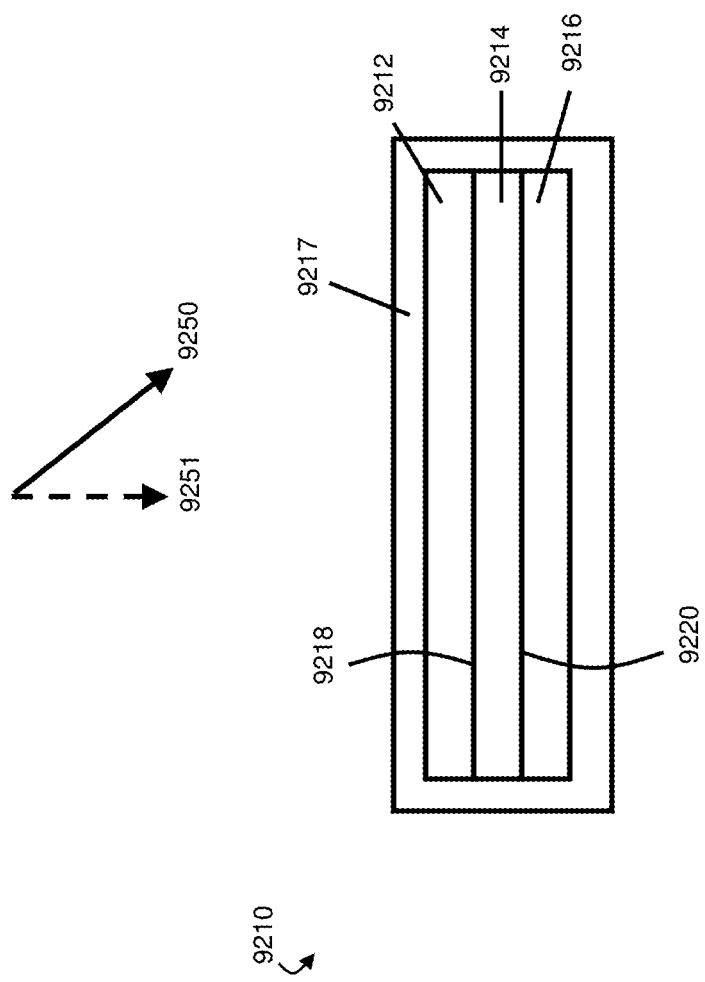
FIG. 4D is a schematic illustration of an electrochemical cell under an applied anisotropic force.

In certain such cases, the anisotropic force comprises a component normal to an active surface of an electrode within an electrochemical cell. As used herein, the term "active surface" is used to describe a surface of an electrode at which electrochemical reactions may take place. For example, referring to FIG. 4D, an electrochemical cell 9210 can comprise a second electrode 9212 can include an active surface 9218 and/or a first electrode 9216 can include an active surface 9220. Electrochemical cell 9210 further comprises an electrolyte 9214. In FIG. 4D, a component 9251 of an anisotropic force 9250 is normal to both the active surface of the second electrode and the active surface of the first electrode. In some embodiments, the anisotropic force comprises a component normal to a surface of a passivating layer in contact with an electrolyte.

A force with a "component normal" to a surface is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill can understand other examples of these terms, especially as applied within the description of this document. In the case of a curved surface (for example, a concave surface or a convex surface), the component of the anisotropic force that is normal to an active surface of an electrode may correspond to the component normal to a plane that is tangent to the curved surface at the point at which the anisotropic force is applied. The anisotropic force may be applied, in some cases, at one or more pre-determined locations, optionally distributed over the active surface of the anode and/or over a surface of a passivating layer. In some embodiments, the anisotropic force is applied uniformly over the active surface of the first electrode (e.g., of the anode) and/or uniformly over a surface of a passivating layer in contact with an electrolyte.

Any of the electrochemical cell properties and/or performance metrics described herein may be achieved, alone or in combination with each other, while an anisotropic force is applied to the electrochemical cell (e.g., during charge and/or discharge of the cell) during charge and/or discharge. In certain embodiments, the anisotropic force applied to the electrode, to the passivating layer, and/or to the electrochemical cell (e.g., during at least one period of time during charge and/or discharge of the cell) can include a component normal to an active surface of an electrode (e.g., an anode such as a lithium metal and/or lithium alloy anode within the electrochemical cell). In certain embodiments, the component of the anisotropic force that is normal to the active surface of the electrode defines a pressure of at least about 1 $kg/cm^2$, at least about 2 $kg/cm^2$, at least about 4 $kg/cm^2$, at least about 6 $kg/cm^2$, at least about 8 $kg/cm^2$, at least about 10 $kg/cm^2$, at least about 12 $kg/cm^2$, at least about 14 $kg/cm^2$, at least about 16 $kg/cm^2$, at least about 18 $kg/cm^2$, at least about 20 $kg/cm^2$, at least about 22 $kg/cm^2$, at least about 24 $kg/cm^2$, at least about 26 $kg/cm^2$, at least about 28 $kg/cm^2$, at least about 30 $kg/cm^2$, at least about 32 $kg/cm^2$, at least about 34 $kg/cm^2$, at least about 36 $kg/cm^2$, at least about 38 $kg/cm^2$, at least about 40 $kg/cm^2$, at least about 42 $kg/cm^2$, at least about 44 $kg/cm^2$, at least about 46 $kg/cm^2$, or at least about 48 $kg/cm^2$. In certain embodiments, the component of the anisotropic force normal to the active surface may, for example, define a pressure of less than about 50 $kg/cm^2$, less than about 48 $kg/cm^2$, less than about 46 $kg/cm^2$, less than about 44 $kg/cm^2$, less than about 42 $kg/cm^2$, less than about 40 $kg/cm^2$, less than about 38 $kg/cm^2$, less than about 36 $kg/cm^2$, less than about 34 $kg/cm^2$, less than about 32 $kg/cm^2$, less than about 30 $kg/cm^2$, less than about 28 $kg/cm^2$, less than about 26 $kg/cm^2$, less than about 24 $kg/cm^2$, less than about 22 $kg/cm^2$, less than about 20 $kg/cm^2$, less than about 18 $kg/cm^2$, less about 16 $kg/cm^2$, less than about 14 $kg/cm^2$, less than about 12 $kg/cm^2$, less than about 10 $kg/cm^2$, less than about 8 $kg/cm^2$, less than about 6 $kg/cm^2$, less than about 4 $kg/cm^2$, or less than about 2 $kg/cm^2$. Combinations of the above-referenced ranges are also possible (e.g., at least about 1 $kg/cm^2$ and less than about 50 $kg/cm^2$, at least about 1 $kg/cm^2$ and less than about 40 $kg/cm^2$, at least about 1 $kg/cm^2$ and less than about 30 $kg/cm^2$, at least about 1 $kg/cm^2$ and less than about 20 $kg/cm^2$, or at least about 10 $kg/cm^2$ and less than about 20 $kg/cm^2$). Other ranges are also possible.

In certain embodiments, the anisotropic force applied to the electrode, to the passivating layer, and/or to the electrochemical cell (e.g., during at least one period of time during charge and/or discharge of the cell) can include a component normal to a surface of a passivating layer in contact with an electrolyte (e.g., a passivating layer disposed on an anode such as a lithium metal and/or lithium alloy anode within the electrochemical cell). In certain embodiments, the component of the anisotropic force that is normal to the active surface of the passivating layer in contact with the electrolyte defines a pressure of at least about 1 $kg/cm^2$, at least about 2 $kg/cm^2$, at least about 4 $kg/cm^2$, at least about 6 $kg/cm^2$, at least about 8 $kg/cm^2$, at least about 10 $kg/cm^2$, at least about 12 $kg/cm^2$, at least about 14 $kg/cm^2$, at least about 16 $kg/cm^2$, or at least about 18 $kg/cm^2$. In certain embodiments, the component of the anisotropic force normal to the surface of the passivating layer in contact with the electrolyte may, for example, define a pressure of less than about 20 $kg/cm^2$, less than about 18 $kg/cm^2$, less about 16 $kg/cm^2$, less than about 14 $kg/cm^2$, less than about 12 $kg/cm^2$, less than about 10 $kg/cm^2$, less than about 8 $kg/cm^2$, less than about 6 $kg/cm^2$, less than about 4 $kg/cm^2$, or less than about 2 $kg/cm^2$. Combinations of the above-referenced ranges are also possible (e.g., at least about 1 $kg/cm^2$ and less than about 20 $kg/cm^2$, or at least about 10 $kg/cm^2$ and less than about 20 $kg/cm^2$). Other ranges are also possible.

The anisotropic forces applied during charge and/or discharge as described herein may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. Pat. No. 9,105,938, which is incorporated herein by reference in its entirety.

In some embodiments, the electrolyte includes a non-aqueous electrolyte. Suitable non-aqueous electrolytes may include organic electrolytes such as liquid electrolytes, gel polymer electrolytes, and solid polymer electrolytes. These electrolytes may optionally include one or more ionic electrolyte salts (e.g., to provide or enhance ionic conductivity) as described herein. Examples of useful non-aqueous liquid electrolyte solvents include, but are not limited to, non-aqueous organic solvents, such as, for example, N-methyl acetamide, acetonitrile, acetals, ketals, esters (e.g., esters of carbonic acid), carbonates (e.g., dimethyl carbonate, diethyl carbonate, ethyl methyl carbonate, propylene carbonate, ethylene carbonate, fluoroethylene carbonate, difluoroethylene carbonate), sulfones, sulfites, sulfolanes, sulfonamides (e.g., bis(trifluoromethane)sulfonimide lithium salt), aliphatic ethers, acyclic ethers, cyclic ethers, glymes, polyethers, phosphate esters (e.g., hexafluorophosphate), siloxanes, dioxolanes, N-alkypyrrolidones, nitrate containing compounds, substituted forms of the foregoing, and blends thereof. Examples of acyclic ethers that may be used include, but are not limited to, diethyl ether, dipropyl ether, dibutyl ether, dimethoxymethane, trimethoxymethane, 1,2-dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents.

In some cases, mixtures of the solvents described herein may also be used. For example, in some embodiments, mixtures of solvents are selected from the group consisting of 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. In certain embodiments, the mixture of solvents comprises dimethyl carbonate and ethylene carbonate. In some embodiments, the mixture of solvents comprises ethylene carbonate and ethyl methyl carbonate. The weight ratio of the two solvents in the mixtures may range, in some cases, from about 5 wt %:95 wt % to 95 wt %:5 wt %. For example, in some embodiments the electrolyte comprises a 50 wt %:50 wt % mixture of dimethyl carbonate:ethylene carbonate. In certain other embodiments, the electrolyte comprises a 30 wt %:70 wt % mixture of ethylene carbonate:ethyl methyl carbonate. An electrolyte may comprise a mixture of dimethyl carbonate:ethylene carbonate with a ratio of dimethyl carbonate:ethylene carbonate that is less than or equal to 50 wt:50 wt % and greater than or equal to 30 wt %:70 wt %.

In some embodiments, an electrolyte may comprise a mixture of fluoroethylene carbonate and dimethyl carbonate. A weight ratio of fluoroethylene carbonate to dimethyl carbonate may be about 20 wt %:80 wt % or about 25 wt %:75 wt %. A weight ratio of fluoroethylene carbonate to dimethyl carbonate may be greater than or equal to 20 wt %:80 wt % and less than or equal to about 25 wt %:75 wt %.

Non-limiting examples of suitable gel polymer electrolytes include polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, cross-linked and network structures of the foregoing, and blends of the foregoing.

Non-limiting examples of suitable solid polymer electrolytes include polyethers, polyethylene oxides, polypropylene oxides, polyimides, polyphosphazenes, polyacrylonitriles, polysiloxanes, derivatives of the foregoing, copolymers of the foregoing, cross-linked and network structures of the foregoing, and blends of the foregoing.

In some embodiments, the passivating agent (e.g., first passivating agent and/or second passivating agent) is at least partially soluble in the electrolyte. In certain embodiments, the passivating agent is substantially soluble in the electrolyte. In some embodiments, the passivating agent has a solubility in the electrolyte of at least about 1 wt %, at least about 2 wt %, at least about 5 wt %, at least about 10 wt %, or at least about 15 w %. In certain embodiments, the passivating agent has a solubility in the electrolyte of less than or equal to about 20 wt %, less than or equal to about 15 wt %, less than or equal to about 10 wt %, less than or equal to about 5 wt %, or less than or equal to about 2 wt %. Combinations of the above-referenced ranges are also possible (e.g., at least about 1 wt % and less than or equal to about 20 wt %). Other ranges are also possible. Solubility, as used herein, is measured at 25° C. and 1 atm.

In some embodiments, an electrolyte is in the form of a layer having a particular thickness. An electrolyte layer may have a thickness of, for example, at least 1 micron, at least 5 microns, at least 10 microns, at least 15 microns, at least 20 microns, at least 25 microns, at least 30 microns, at least 40 microns, at least 50 microns, at least 70 microns, at least 100 microns, at least 200 microns, at least 500 microns, or at least 1 mm. In some embodiments, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 50 microns. Other values are also possible. Combinations of the above-noted ranges are also possible.

In some embodiments, the electrolyte comprises at least one lithium salt. For example, in some cases, the at least one lithium salt is selected from the group consisting of LiSCN, LiBr, LiI, $LiSO_3CH_3$, $LiNO_3$, $LiPF_6$, $LiBF_4$, $LiB(Ph)_4$, $LiClO_4$, $LiAsF_6$, $Li_2SiF_6$, $LiSbF_6$, $LiAlCl_4$, lithium bis(oxalato)borate, $LiCF_3SO_3$, $LiN(SO_2F)_2$, $LiN(SO_2CF_3)_2$, $LiC(CnF_{2n+1}SO_2)_3$ wherein n is an integer in the range of from 1 to 20, and $(CnF_{2n+1}SO_2)_mXLi$ with n being an integer in the range of from 1 to 20, m being 1 when X is selected from oxygen or sulfur, m being 2 when X is selected from nitrogen or phosphorus, and m being 3 when X is selected from carbon or silicon.

When present, a lithium salt may be present in the electrolyte at a variety of suitable concentrations. In some embodiments, the lithium salt is present in the electrolyte at a concentration of greater than or equal to 0.01 M, greater than or equal to 0.02 M, greater than or equal to 0.05 M, greater than or equal to 0.1 M, greater than or equal to 0.2 M, greater than or equal to 0.5 M, greater than or equal to 1 M, greater than or equal to 2 M, or greater than or equal to 5 M. The lithium salt may be present in the electrolyte at a concentration of less than or equal to 10 M, less than or equal to 5 M, less than or equal to 2 M, less than or equal to 1 M, less than or equal to 0.5 M, less than or equal to 0.2 M, less than or equal to 0.1 M, less than or equal to 0.05 M, or less than or equal to 0.02 M. Combinations of the above-referenced ranges are also possible (e.g., greater than or equal to 0.01 M and less than or equal to 10 M, or greater than or equal to 0.01 M and less than or equal to 5 M). Other ranges are also possible.

In some embodiments, an electrolyte may comprise $LiPF_6$ in an advantageous amount. In some embodiments, the electrolyte comprises $LiPF_6$ at a concentration of greater than or equal to 0.01 M, greater than or equal to 0.02 M, greater than or equal to 0.05 M, greater than or equal to 0.1 M, greater than or equal to 0.2 M, greater than or equal to 0.5 M, greater than or equal to 1 M, or greater than or equal to 2 M. The electrolyte may comprise $LiPF_6$ at a concentration of less than or equal to 5 M, less than or equal to 2 M, less than or equal to 1 M, less than or equal to 0.5 M, less than or equal to 0.2 M, less than or equal to 0.1 M, less than or equal to 0.05 M, or less than or equal to 0.02 M. Combinations of the above-referenced ranges are also possible (e.g., greater than or equal to 0.01 M and less than or equal to 5 M). Other ranges are also possible.

In some embodiments, an electrolyte may comprise several species together that are particularly beneficial in combination. For instance, in some embodiments, the electrolyte comprises fluoroethylene carbonate, dimethyl carbonate, and $LiPF_6$. The weight ratio of fluoroethylene carbonate to dimethyl carbonate may be between 20 wt %:80 wt % and 25 wt %:75 wt % and the concentration of $LiPF_6$ in the electrolyte may be approximately 1 M (e.g., between 0.05 M and 2 M). The electrolyte may further comprise lithium bis(oxalato)borate (e.g., at a concentration between 0.1 wt % and 6 wt %, between 0.5 wt % and 6 wt %, or between 1 wt % and 6 wt % in the electrolyte), and/or lithium tris(oxalato) phosphate (e.g., at a concentration between 1 wt % and 6 wt % in the electrolyte).

In some embodiments, an electrochemical cell includes an electrolyte as described in the previous paragraph (e.g., comprising fluoroethylene carbonate, dimethyl carbonate, $LiPF_6$, and, optionally, lithium bis(oxalato)borate and/or lithium tris(oxalato)phosphate) and a protective layer. The protective layer may be porous, and/or may be under an anisotropic force. The porosity of the protective layer may be about 25% (or higher). The anisotropic force may have a magnitude of at least about 10 kg/cm$^2$ and less than about 20 kg/cm$^2$.

As described herein, in some embodiments, an electrochemical cell includes a separator. The separator generally comprises a polymeric material (e.g., polymeric material that does or does not swell upon exposure to electrolyte). In some embodiments, the separator is located between the electrolyte and an electrode (e.g., between the electrolyte and a first electrode, between the electrolyte and a second electrode, between the electrolyte and an anode, or between the electrolyte and a cathode).

The separator can be configured to inhibit (e.g., prevent) physical contact between a first electrode and a second electrode, which could result in short circuiting of the electrochemical cell. The separator can be configured to be substantially electronically non-conductive, which can inhibit the degree to which the separator causes short circuiting of the electrochemical cell. In certain embodiments, all or portions of the separator can be formed of a material with a bulk electronic resistivity of at least about $10^4$, at least about $10^5$, at least about $10^{10}$, at least about $10^{15}$, or at least about $10^{20}$ Ohm-meters. Bulk electronic resistivity may be measured at room temperature (e.g., 25 degrees Celsius).

In some embodiments, the separator can be ionically conductive, while in other embodiments, the separator is substantially ionically non-conductive. In some embodiments, the average ionic conductivity of the separator is at least about $10^{-7}$ S/cm, at least about $10^{-6}$ S/cm, at least about $10^{-5}$ S/cm, at least about $10^{-4}$ S/cm, at least about $10^{-2}$ S/cm, or at least about $10^{-1}$ S/cm. In certain embodiments, the average ionic conductivity of the separator may be less than or equal to about 1 S/cm, less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm, or less than or equal to about $10^{-8}$ S/cm. Combinations of the above-referenced ranges are also possible (e.g., an average ionic conductivity of at least about $10^{-8}$ S/cm and less than or equal to about $10^{-1}$ S/cm). Other values of ionic conductivity are also possible. Conductivity may be measured at room temperature (e.g., 25 degrees Celsius).

In some embodiments, the average ion conductivity of the separator can be determined by employing a conductivity bridge (i.e., an impedance measuring circuit) operating at 1 kHz on a separator pressed between two copper cylinders at a pressure of up to 3 tons/cm². The average ion conductivity (i.e., the inverse of the average resistivity) can be measured at 500 kg/cm² increments. In some such embodiments, the pressure is increased until changes in average ion conductivity are no longer observed in the sample.

In some embodiments, the separator can be a solid. The separator may be porous to allow an electrolyte solvent to pass through it. In some cases, the separator does not substantially include a solvent (like in a gel), except for solvent that may pass through or reside in the pores of the separator. In other embodiments, a separator may be in the form of a gel.

A separator can be made of a variety of materials. The separator may be polymeric in some instances, or formed of an inorganic material (e.g., glass fiber filter papers) in other instances. Examples of suitable separator materials include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

The mechanical and electronic properties (e.g., conductivity, resistivity) of these polymers are known. Accordingly, those of ordinary skill in the art can choose suitable materials based on their mechanical and/or electronic properties (e.g., ionic and/or electronic conductivity/resistivity), and/or can modify such polymers to be ionically conducting (e.g., conductive towards single ions) based on knowledge in the art, in combination with the description herein. For example, the polymer materials listed above and herein may further comprise salts, for example, lithium salts (e.g., LiSCN, LiBr, LiI, LiSO₃CH₃, LiNO₃, LiPF₆, LiBF₄, LiB(Ph)₄, LiClO₄, LiAsF₆, Li₂SiF₆, LiSbF₆, LiAlCl₄, lithium bis(oxalato)borate, LiCF₃SO₃, LiN(SO₂F)₂, LiC(CnF$_{2n+1}$SO₂)₃ wherein n is an integer in the range of from 1 to 20, and (CnF$_{2n+1}$SO₂)$_m$XLi with n being an integer in the range of from 1 to 20, m being 1 when X is selected from oxygen or sulfur, m being 2 when X is selected from nitrogen or phosphorus, and m being 3 when X is selected from carbon or silicon), and/or others described herein, to enhance ionic conductivity, if desired.

The separator may be porous. In some embodiments, the separator pore size may be, for example, less than 5 microns. In certain embodiments, the separator pore size may be between 50 nm and 5 microns, between 50 nm and 500 nm, between 100 nm and 300 nm, between 300 nm and 1 micron, between 500 nm and 5 microns. In some embodiments, the pore size may be less than or equal to 5 microns, less than or equal to 1 micron, less than or equal to 500 nm, less than or equal to 300 nm, less than or equal to 100 nm, or less than or equal to 50 nm. In some embodiments, the pore size may be greater than 50 nm, greater than 100 nm, greater than 300 nm, greater than 500 nm, or greater than 1 micron. Other values are also possible. Combinations of the above-noted ranges are also possible (e.g., a pore size of less than 300 nm and greater than 100 nm). In certain embodiments, the separator may be substantially non-porous.

In some embodiments, an electrochemical cell described herein comprises at least one current collector. Materials for the current collector may be selected, in some cases, from metals (e.g., copper, nickel, aluminum, passivated metals, and other appropriate metals), metallized polymers, electrically conductive polymers, polymers comprising conductive particles dispersed therein, and other appropriate materials. In certain embodiments, the current collector is deposited onto the electrode layer using physical vapor deposition, chemical vapor deposition, electrochemical deposition, sputtering, doctor blading, flash evaporation, or any other appropriate deposition technique for the selected material. In some cases, the current collector may be formed separately and bonded to the electrode structure. It should be appreciated, however, that in some embodiments a current collector separate from the electroactive layer is not needed or present.

Certain embodiments described herein relate to the formation of electrode slurries, such as electrode slurries which maintain fluid-like properties over the time period between formation of the slurry and application of the slurry to a current collector. These slurries may be easier to process (e.g., easier to mix, easier to apply, easier to apply uniformly) than slurries that do not maintain fluid-like properties (e.g., slurries that have at least a portion that has gelled and/or solidified). The slurry may comprise a particulate electroactive material and a solvent. In some embodiments, the slurry may further comprise a binder and/or one or more additives. The particulate electroactive material within the slurry may have one or more features that tend to promote gelation (e.g., it may have a small average particle size, it may comprise certain amounts of nickel), but still be a component of a slurry with fluid-like properties. In some embodiments, one or more reactive groups present on the surface of the particulate electroactive material (e.g., —OH groups, —COOH groups) may be passivated prior to slurry formation (e.g., by exposure to a second passivating agent as described herein, by exposure to a silane compound).

As used herein, slurries are typically, but not always, materials which comprise at least one liquid component and at least one solid component. The solid component may be at least partially suspended in the liquid and/or at least partially dissolved within the liquid.

Figure 5A:
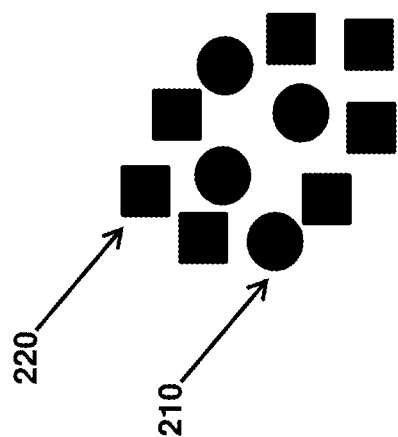
FIG. 5A is a schematic illustration of a method of treating a particulate electroactive material with a passivating agent.

FIGS. 5A-5C show one non-limiting embodiment of a method for forming a slurry comprising fluid-like properties. In FIG. 5A, an electroactive material 210 is exposed to a passivating agent 220 (e.g., a silane compound). The passivating agent may react with one or more groups on the surface of the electroactive material (e.g., —OH groups, —COOH groups) in a manner that causes them to be modified such that they have a reduced tendency to gel or solidify (e.g., by removing or modifying one or more surface groups, by forming a silane coating on the surface of the electroactive material).

FIG. 5B shows the addition of a passivated electroactive material 212 to a fluid comprising a binder 230 and a solvent 240. At the conclusion of this step, fluid-like slurry 2000 is formed, as shown illustratively in FIG. 5C. Although not shown in FIG. 5B or 5C, in some embodiments, a slurry may further comprise one or more additives (e.g., electronically conductive materials).

As described above, in some embodiments a slurry may have fluid-like properties. That is, the loss modulus of the slurry may be greater than the storage modulus of the slurry for at least one frequency (or within a range of frequencies) when the slurry is subject to an oscillating shear strain. In some embodiments, the loss modulus of the slurry may be greater than the storage modulus of the slurry for at least one frequency (or within a range of frequencies) when the slurry is subject to an oscillating shear strain at a frequency of greater than or equal to $0.001$ s$^{-1}$, greater than or equal to $0.01$ s$^{-1}$, greater than or equal to $0.1$ s$^{-1}$, greater than or equal to $1$ s$^{-1}$, greater than or equal to $10$ s$^{-1}$, or greater than or equal to $100$ s$^{-1}$. In some embodiments, the loss modulus of the slurry may be greater than the storage modulus of the slurry for at least one frequency (or within a range of frequencies) when the slurry is subject to an oscillating shear strain at a frequency of less than or equal to $1000$ s$^{-1}$, less than or equal to $100$ s$^{-1}$, less than or equal to $10$ s$^{-1}$, less than or equal to $1$ s$^{-1}$, less than or equal to $0.1$ s$^{-1}$, or less than or equal to $0.01$ s$^{-1}$. Combinations of the above-referenced ranges are also possible (e.g., greater than or equal to $0.01$ s$^{-1}$ and less than or equal to $100$ s$^{-1}$, or greater than or equal to $0.1$ s$^{-1}$ and less than or equal to $10$ s$^{-1}$). Other ranges are also possible. The loss modulus and storage modulus of a slurry may be determined by subjecting the slurry to oscillatory shear rheology at 25° C. using a concentric cylinder rheometer with a cone angle of 1°. The slurry may be subject to strain in the linear viscoelastic regime at increasing angular frequencies from 0.1 to 1000 rad/s.

In some embodiments, the loss modulus of the slurry may be greater than the storage modulus of the slurry for each frequency when the slurry is subject to an oscillating shear strain at a frequency of greater than or equal to $0.001$ s$^{-1}$, greater than or equal to $0.01$ s$^{-1}$, greater than or equal to $0.1$ s$^{-1}$, greater than or equal to $1$ s$^{-1}$, greater than or equal to $10$ s$^{-1}$, or greater than or equal to $100$ s$^{-1}$. In some embodiments, the loss modulus of the slurry may be greater than the storage modulus of the slurry for each frequency (or within a range of frequencies) when the slurry is subject to an oscillating shear strain at a frequency of less than or equal to $1000$ s$^{-1}$, less than or equal to $100$ s$^{-1}$, less than or equal to $10$ s$^{-1}$, less than or equal to $1$ s$^{-1}$, less than or equal to $0.1$ s$^{-1}$, or less than or equal to $0.01$ s$^{-1}$. Combinations of the above-referenced ranges are also possible (e.g., greater than or equal to $0.01$ s$^{-1}$ and less than or equal to $100$ s$^{-1}$, or greater than or equal to $0.1$ s$^{-1}$ and less than or equal to $10$ s$^{-1}$). Other ranges are also possible.

In some embodiments, a slurry may have a loss modulus that is substantially higher than the storage modulus. For instance, when subject to an oscillating shear strain (e.g., at a frequency of between $0.01$ s$^{-1}$ and $100$ s$^{-1}$, at a frequency of between $0.1$ s$^{-1}$ and $100$ s$^{-1}$), the ratio of the loss modulus of the slurry to the storage modulus of the slurry for at least one frequency (or a range of frequencies) may be greater than or equal to 2, greater than or equal to 5, greater than or equal to 10, greater than or equal to 20, greater than or equal to 50, greater than or equal to 100, greater than or equal to 200, greater than or equal to 500, greater than or equal to 1000, greater than or equal to 2000, or greater than or equal to 5000. In some embodiments, when subject to an oscillating shear strain (e.g., at a frequency of between $0.01$ s$^{-1}$ and $100$ s$^{-1}$, at a frequency of between $0.1$ s$^{-1}$ and $100$ s$^{-1}$), the ratio of the loss modulus of the slurry to the storage modulus of the slurry for at least one frequency (or a range of frequencies) may be less than or equal to 10,000, less than or equal to 5000, less than or equal to 2000, less than or equal to 1000, less than or equal to 500, less than or equal to 200, less than or equal to 100, less than or equal to 50, less than or equal to 20, less than or equal to 10, or less than or equal to 5. Combinations of the above-referenced ranges are also possible (e.g., greater than or equal to 2 and less than or equal to 10,000). Other ranges are also possible. In some embodiments, the above-referenced ranges of ratios are possible when the slurry is subjected to other ranges of oscillating frequencies.

In some embodiments, a slurry may have a loss modulus that is substantially higher than the storage modulus. For instance, when subject to an oscillating shear strain (e.g., at a frequency of between $0.01\ s^{-1}$ and $100\ s^{-1}$, at a frequency of between $0.1\ s^{-1}$ and $100\ s^{-1}$), the ratio of the loss modulus of the slurry to the storage modulus of the slurry for each frequency may be greater than or equal to 2, greater than or equal to 5, greater than or equal to 10, greater than or equal to 20, greater than or equal to 50, greater than or equal to 100, greater than or equal to 200, greater than or equal to 500, greater than or equal to 1000, greater than or equal to 2000, or greater than or equal to 5000. In some embodiments, when subject to an oscillating shear strain (e.g., at a frequency of between $0.01\ s^{-1}$ and $100\ s^{-1}$, at a frequency of between $0.1\ s^{-1}$ and $100\ s^{-1}$), the ratio of the loss modulus of the slurry to the storage modulus of the slurry for each frequency may be less than or equal to 10,000, less than or equal to 5000, less than or equal to 2000, less than or equal to 1000, less than or equal to 500, less than or equal to 200, less than or equal to 100, less than or equal to 50, less than or equal to 20, less than or equal to 10, or less than or equal to 5. Combinations of the above-referenced ranges are also possible (e.g., greater than or equal to 2 and less than or equal to 10,000). Other ranges are also possible. In some embodiments, the above-referenced ranges of ratios are possible when the slurry is subjected to other ranges of oscillating frequencies.

In some embodiments, a slurry may have a loss modulus that is greater than its storage modulus (e.g., in one or more ranges of ratios described above) over a period of time (e.g., a period of time after combining all of the components of the slurry). For example, the loss modulus of the slurry may be greater than the storage modulus of the slurry (e.g., when the slurry is subject to an oscillating shear strain at a frequency of between $0.01\ s^{-1}$ and $100\ s^{-1}$, when the slurry is subject to an oscillating shear strain at a frequency of between $0.1\ s^{-1}$ and $10\ s^{-1}$) for at least one frequency (or a range of frequencies) for a period of time of at least 1 hour, at least 2 hours, at least 6 hours, at least 12 hours, for at least 1 day, or for at least 1 week. In some embodiments, the loss modulus of the slurry may be greater than the storage modulus of the slurry (e.g., when the slurry is subject to an oscillating shear strain at a frequency of between $0.01\ s^{-1}$ and $100\ s^{-1}$, when the slurry is subject to an oscillating shear strain at a frequency of between $0.1\ s^{-1}$ and $10\ s^{-1}$) for at least one frequency for a period of time of at most 1 month, at most 1 week, at most 1 day, at most 12 hours, at most 6 hours, or at most 2 hours. Combinations of the above-referenced ranges are also possible (e.g., at least 1 hour and at most 1 month). Other ranges are also possible. In some embodiments, the slurry may have a loss modulus that is greater than its storage modulus over the above-referenced time periods when the slurry is subjected to other ranges of oscillating frequencies.

In some embodiments, the loss modulus of the slurry may be greater than the storage modulus of the slurry (e.g., when the slurry is subject to an oscillating shear strain at a frequency of between $0.01\ s^{-1}$ and $100\ s^{-1}$, when the slurry is subject to an oscillating shear strain at a frequency of between $0.1\ s^{-1}$ and $100\ s^{-1}$) for each frequency for a period of time of at least 1 hour, at least 2 hours, at least 6 hours, at least 12 hours, for at least 1 day, or at least 1 week. In some embodiments, the loss modulus of the slurry may be greater than the storage modulus of the slurry (e.g., when the slurry is subject to an oscillating shear strain at a frequency of between $0.01\ s^{-1}$ and $100\ s^{-1}$, when the slurry is subject to an oscillating shear strain at a frequency of between $0.1\ s^{-1}$ and $100\ s^{-1}$) for each frequency for a period of time of at most 1 month, at most 1 week, at most 1 day, at most 12 hours, at most 6 hours, or at most 2 hours. Combinations of the above-referenced ranges are also possible (e.g., at least 1 hour and at most 1 month). Other ranges are also possible. In some embodiments, the slurry may have a loss modulus that is greater than its storage modulus over the above-referenced time periods when the slurry is subjected to other ranges of oscillating frequencies.

In some embodiments, a slurry may have a relatively low viscosity. For instance, the viscosity of the slurry may be less than or equal to $10^8$ MPa*seconds, less than or equal to $5*10^7$ MPa*seconds, less than or equal to $10^7$ MPa*seconds, less than or equal to $5*10^6$ MPa*seconds, less than or equal to $10^6$ MPa*seconds, less than or equal to $5*10^5$ MPa*seconds, less than or equal to $10^5$ MPa*seconds, or less than or equal to $5*10^4$ MPa*seconds. In some embodiments, the viscosity of the slurry may be greater than or equal to $10^4$ MPa*seconds, greater than or equal to $5*10^4$ MPa*seconds, greater than or equal to $10^5$ MPa*seconds, greater than or equal to $5*10^5$ MPa*seconds, greater than or equal to $10^6$ MPa*seconds, greater than or equal to $5*10^6$ MPa*seconds, greater than or equal to $10^7$ MPa*seconds, or greater than or equal to $5*10^7$ MPa*seconds. Combinations of the above-referenced ranges are also possible (e.g., greater than or equal to $10^4$ MPa*s and less than or equal to $10^8$ MPa*s). Other ranges are also possible. The viscosity can be determined by using a Ford viscosity cup.

In some embodiments, a slurry may maintain a relatively constant viscosity over a period of time (e.g., the period of time between slurry formation and application to a current collector). In some embodiments, the viscosity of the slurry may increase by less than or equal to 1000%, less than or equal to 500%, less than or equal to 200%, less than or equal to 100%, less than or equal to 50%, or less than or equal to 25% over a period of time of greater than or equal to 1 hour, greater than or equal to 2 hours, greater than or equal to 4 hours, greater than or equal to 8 hours, greater than or equal to 12 hours, greater than or equal to 1 day, or greater than or equal to 1 week and less than or equal to 1 month. In some embodiments, the viscosity of the slurry may increase by greater than or equal to 10%, greater than or equal to 25%, greater than or equal to 50%, greater than or equal to 100%, greater than or equal to 200%, or greater than or equal to 500% over a period of time of greater than or equal to 1 hour, greater than or equal to 2 hours, greater than or equal to 4 hours, greater than or equal to 8 hours, greater than or equal to 12 hours, greater than or equal to 1 day, or greater than or equal to 1 week and less than or equal to 1 month. Combinations of the above-referenced ranges are also possible (e.g., greater than or equal to 10% and less than or equal to 1000% over a period of time of greater than or equal to 1 hour and less than or equal to 1 month). Other ranges are also possible.

In some embodiments, a slurry as described herein may comprise a particulate electroactive material. The particulate electroactive material may comprise one or more of the materials described herein as being suitable for use in the first electrode or the second electrode. In some embodiments, the particulate electroactive material may be a lithium ion intercalation material, such as a lithium ion intercalation cathode material. Non-limiting examples of such materials include lithium transition metal oxides and lithium transition metal phosphate. Additional examples include $Li_xCoO_2$, $Li_xNiO_2$, $Li_xMnO_2$, $Li_xMn_2O_4$, $Li_xCoPO_4$, $Li_xMnPO_4$, $LiCo_xNi_{(1-x)}O_2$, $LiCo_xNi_yMn_{(1-x-y)}O_2$ (e.g., $LiNi_{1/3}Mn_{1/3}Co_{1/3}O_2$, $LiNi_{3/5}Mn_{1/5}Co_{1/5}O_2$, $LiNi_{4/5}Mn_{1/10}Co_{1/10}O_2$, $LiNi_{1/2}Mn_{3/10}Co_{1/5}O_2$), $Li_xNiPO_4$ where $0<x\leq1$, $LiMn_xNi_yO_4$ where x+y=2 (e.g., $LiMn_{1.5}Ni_{0.5}O_4$), $LiNi_xCo_yAl_zO_2$ where x+y+z=1, $LiFePO_4$, and combinations thereof. In some embodiments, the electroactive material within the second electrode can comprise lithium transition metal phosphates (e.g., $LiFePO_4$), which can, in certain embodiments, be substituted with borates and/or silicates.

In some embodiments, a particulate electroactive material as described herein may comprise nickel. The nickel content of the particulate electroactive material may be, for example, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt %, greater than or equal to 60 wt %, greater than or equal to 65 wt %, greater than or equal to 70 wt %, or greater than or equal to 75 wt %. In some embodiments, the nickel content of the particulate electroactive material may be less than or equal to 80 wt %, less than or equal to 75 wt %, less than or equal to 70 wt %, less than or equal to 65 wt %, less than or equal to 60 wt %, less than or equal to 55 wt %, less than or equal to 50 wt %, less than or equal to 45 wt %, or less than or equal to 40 wt %. Combinations of the above-referenced ranges are also possible (e.g., greater than or equal to 33 wt % and less than or equal to 80 wt %). Other ranges are also possible. Without wishing to be bound by theory, particulate electroactive materials with higher nickel content may have a higher specific discharge capacity, but may have enhanced reactivity with an electrolyte present in an electrochemical cell.

In some embodiments, a particulate electroactive material of a slurry may have a relatively small mean particle diameter. For example, the mean particle diameter of the particulate electroactive material may be less than or equal to 20 microns, less than or equal to 15 microns, less than or equal to 13 microns, less than or equal to 10 microns, less than or equal to 8 microns, less than or equal to 4 microns, less than or equal to 2 microns, less than or equal to 1 micron, less than or equal to 500 nm, or less than or equal to 200 nm. In some embodiments, the mean particle diameter of the particulate electroactive material may be greater than or equal to 100 nm, greater than or equal to 200 nm, greater than or equal to 500 nm, greater than or equal to 1 micron, greater than or equal to 2 microns, greater than or equal to 4 microns, greater than or equal to 8 microns, greater than or equal to 10 microns, greater than or equal to 13 microns, or greater than or equal to 15 microns. Combinations of the above-referenced ranges are also possible (e.g., greater than or equal to 100 nm and less than or equal to 20 microns, greater than or equal to 100 nm and less than or equal to 8 microns, or greater than or equal to 13 microns and less than or equal to 15 microns). Other ranges are also possible. The average particle diameter of the particulate electroactive material may be determined by SEM.

Without wishing to be bound by theory, it is believed that particulate electroactive materials that comprise moderate or high amounts of nickel and/or have a relatively low mean particle diameter may have an enhanced tendency to form gelled slurries in comparison to particulate electroactive materials that do not have either of these properties. Thus, methods for forming slurries comprising particulate electroactive materials with either or both of these properties that have fluid-like properties may have particular utility.

A particulate electroactive material may make up any suitable weight percent of a slurry. In some embodiments, the particulate electroactive material makes up greater than or equal to 2 wt % of the slurry, greater than or equal to 5 wt % of the slurry, greater than or equal to 10 wt % of the slurry, greater than or equal to 15 wt % of the slurry, greater than or equal to 20 wt % of the slurry, greater than or equal to 25 wt % of the slurry, greater than or equal to 30 wt % of the slurry, greater than or equal to 35 wt % of the slurry, greater than or equal to 40 wt % of the slurry, greater than or equal to 45 wt % of the slurry, greater than or equal to 50 wt % of the slurry, or greater than or equal to 55 wt % of the slurry. In some embodiments, the particulate electroactive material makes up less than or equal to 60 wt % of the slurry, less than or equal to 55 wt % of the slurry, less than or equal to 50 wt % of the slurry, less than or equal to 45 wt % of the slurry, less than or equal to 40 wt % of the slurry, less than or equal to 35 wt % of the slurry, less than or equal to 30 wt % of the slurry, less than or equal to 25 wt % of the slurry, less than or equal to 20 wt % of the slurry, less than or equal to 15 wt % of the slurry, less than or equal to 10 wt % of the slurry, or less than or equal to 5 wt % of the slurry. Combinations of the above-referenced ranges are also possible (e.g., greater than or equal to 2 wt % and less than or equal to 60 wt % of the slurry, or greater than or equal to 2 wt % and less than or equal to 30 wt % of the slurry). Other ranges are also possible.

As described above, in some embodiments a particulate electroactive material present in a slurry may have a surface that has been passivated and/or a surface that comprises relatively few groups (e.g., functional groups) that promote gelation of the slurry. The surface of the particulate electroactive material may be treated in any suitable manner. For instance, the particulate electroactive material may be passivated by exposure to a second passivating agent as described above. In some embodiments, the surface of the particulate electroactive material may be treated (e.g., prior to incorporation into a slurry, or after being incorporated into a slurry) by exposure to a silane compound, or the surface of the particulate electroactive material may be coated by a silane compound. In some embodiments the silane compound (or silicon-containing compound) may be capable of reacting (e.g., may be configured to react) with residual —OH and/or —COOH groups present at the particulate electroactive material surface. For instance, the silane compound (or silicon-containing compound) may have reactive groups that are reactive with residual —OH and/or —COOH groups present at the particulate electroactive material surface. According to some embodiments, the silane compound (or silicon-containing compound) may comprise one or more functional groups suitable for reacting with —OH and —COOH groups, such as leaving groups. In some embodiments, the leaving groups may comprise alkoxy groups and/or halogen groups. Non-limiting examples of suitable alkoxy groups include linear alkoxy groups such as methoxy, ethoxy, propoxy, and butoxy groups as well as branched alkoxy groups such as tertbutoxy groups. Non-limiting examples of suitable halogen groups include fluorine, chlorine, bromine, iodine, and astatine groups. In some embodiments, leaving groups may be capable of reacting with other leaving groups in addition to being capable of reacting with —OH and —COOH groups.

In some embodiments, treatment with a silane compound may result in a decrease in the number of —OH groups at the surface of the particulate electroactive material. The silane compound may react with the particulate electroactive material such that, after exposure to the silane, the particulate electroactive material contains at most 95%, at most 90%, at most 85%, at most 80%, at most 70%, at most 60%, at most 50%, at most 40%, at most 30%, at most 20%, or at most 10% of the —OH groups that it contained prior to silane exposure. In some embodiments, the silane compound may react with the particulate electroactive material such that, after exposure to the silane, the particulate electroactive material contains at least 5%, at least 10%, at least 20%, at least 40%, at least 60%, or at least 80% of the —OH groups that it contained prior to silane exposure. Combinations of the above-referenced ranges are also possible (e.g., at least 5% and at most 95%). Other ranges are also possible.

In some embodiments, treatment with a silane compound may result in a decrease in the number of —COOH groups at the surface of the particulate electroactive material. The silane compound may react with the particulate electroactive material such that, after exposure to the silane, the particulate electroactive material contains at most 95%, at most 90%, at most 85%, at most 80%, at most 70%, at most 60%, at most 50%, at most 40%, at most 30%, at most 20%, or at most 10% of the —COOH groups that it contained prior to silane exposure. In some embodiments, the silane compound may react with the particulate electroactive material such that, after exposure to the silane, the particulate electroactive material contains at least 5%, at least 10%, at least 20%, at least 40%, at least 60%, or at least 80% of the —COOH groups that it contained prior to silane exposure. Combinations of the above-referenced ranges are also possible (e.g., at least 5% and at most 95%). Other ranges are also possible.

The silane compound (or silicon-containing compound) may comprise any suitable number of leaving groups. In some embodiments, the silane compound may have one leaving group (i.e., the silane molecule may comprise exactly one group that is a leaving group and the other functional groups on the silane molecule may be groups that are not leaving groups). According to certain embodiments, such silane compounds which bond to the surface of the particulate electroactive material may be incapable of undergoing any further bonding to other species present in the slurry. In some embodiments, silane compounds having a single leaving group may react with the surface of the particulate electroactive material to form a monolayer. The monolayer may cover at least a portion of the surface of the particulate electroactive material. In some embodiments, the monolayer is substantially continuous. In some embodiments, the monolayer is substantially discontinuous as described herein. According to certain embodiments, the monolayer, or any other suitable layer including the silane or silicon-containing compound, may be formed (e.g., on a surface of the particulate electroactive material) prior to cell assembly.

In some embodiments, the silane compound (or silicon-containing compound) may have two leaving groups or three leaving groups (i.e., the silane molecule may comprise two or three groups that are leaving groups and the other functional group(s) on the silane molecule may be groups that are not leaving groups). In some such embodiments, the silane compound (or silicon-containing compound) may be configured to bond and/or may be capable of bonding to the surface of the particulate electroactive material by a reaction of a single leaving group; the other one or two leaving groups may then be available for binding to species, e.g., to other silane molecules. In some embodiments, silane compounds comprising two or three leaving groups may react with each other (and possibly with the particulate electroactive material surface) to form a multilayer at the surface. According to certain embodiments, the multilayer may be formed (e.g., on a surface of the particulate electroactive material) prior to slurry formation. In some embodiments, the silane compound may have more than one leaving group but may only have one type of leaving group (i.e., each leaving group may have the same chemical structure). For example, one type of leaving group may be a halogen group or an alkoxy group as described above. In certain embodiments, the silane compound may comprise at least two types of leaving groups, at least three types of leaving groups, or at least four types of leaving groups.

In certain embodiments, the silane compound (or silicon-containing compound) may have at least one surface-reactive group, or a functional group that is not a leaving group but is a group which is capable of reacting with or interacting with residual —OH and/or —COOH groups present at the surface of the particulate electroactive material such that the surface of the particulate electroactive material is passivated. According to some embodiments, such a surface-reactive group may form covalent and/or van der Waals bonds with —OH and/or —COOH groups. Non-limiting examples of surface-reactive groups which are not leaving groups include amino groups, linear and branched alkylamino groups, linear and branched arylamino groups such as aminopropyl groups, siloxy groups, mercapto groups, acids, linear and branched aryloxy groups, hydroxyl groups, phosphate groups, and sulfate groups. In some embodiments, monolayers and/or multilayers may be formed by silane compounds comprising at least one surface-reactive group. In certain embodiments, monolayers and/or multilayers may be formed by silane compounds comprising at least one surface-reactive group and containing no leaving groups.

In some embodiments, the silane compound (or silicon-containing compound) may have at least one functional group which is not a leaving group and not a surface-reactive group. Non-limiting examples of such groups include linear and branched alkyl groups and linear and branched aryl groups.

Non-limiting examples of suitable silane compounds include chlorotrimethylsilane, tetraethylorthosilicate, aminopropyltriethoxy silane, trichlorooctadecyl silane, hexamethyldisilazane, (3-mercaptopropyl)trimethoxy silane, and dimethyloctadecyl((3-(trimethoxysilyl)propyl)ammonium chloride.

As described above, certain slurries as described herein may comprise a solvent (e.g., an organic solvent). In some embodiments, the slurry comprises N-methyl-2-pyrrolidone and/or N-ethyl-2-pyrrolidone.

A slurry may comprise any suitable amount of solvent. In some embodiments, the solvent may make up greater than or equal to 40 wt % of the slurry, greater than or equal to 45 wt % of the slurry, greater than or equal to 50 wt % of the slurry, greater than or equal to 55 wt % of the slurry, greater than or equal to 60 wt % of the slurry, greater than or equal to 65 wt % of the slurry, greater than or equal to 70 wt % of the slurry, greater than or equal to 75 wt % of the slurry, greater than or equal to 80 wt % of the slurry, greater than or equal to 85 wt % of the slurry, greater than or equal to 90 wt % of the slurry, or greater than or equal to 95 wt % of the slurry. In some embodiments, the solvent may make up less than or equal to 98 wt % of the slurry, less than or equal to 95 wt % of the slurry, less than or equal to 90 wt % of the slurry, less than or equal to 85 wt % of the slurry, less than or equal to 80 wt % of the slurry, less than or equal to 75 wt % of the slurry, less than or equal to 70 wt % of the slurry, less than or equal to 65 wt % of the slurry, less than or equal to 60 wt % of the slurry, less than or equal to 55 wt % of the slurry, less than or equal to 50 wt % of the slurry, or less than or equal to 45 wt % of the slurry. Combinations of the above-referenced ranges are also possible (e.g., greater than or equal to 40 wt % of the slurry and less than or equal to 98 wt % of the slurry, or greater than or equal to 70 wt % of the slurry and less than or equal to 98 wt % of the slurry). Other ranges are also possible.

In some embodiments, a slurry may comprise a binder. The binder may be any material that is capable of holding the particulate electroactive material together in the final electrode such that it forms a unified structure. In some embodiments, the binder comprises a polymer, such as one or more of poly(vinylidene fluoride), a poly(vinylidene fluoride copolymer) such as a copolymer with hexafluorophosphate, a poly(styrene)-poly(butadiene) copolymer, a poly(styrene)-poly(butadiene) rubber, carboxymethyl cellulose, and poly(acrylic acid). In some embodiments, the binder makes up less than or equal to 20 wt %, less than or equal to 10 wt %, less than or equal to 5 wt %, or less than or equal to 2 wt % of the slurry. In some embodiments, the binder makes up greater than or equal to 1 wt %, greater than or equal to 2 wt %, greater than or equal to 5 wt %, or greater than or equal to 10 wt % of the slurry. Combinations of the above ranges are also possible (e.g., greater than or equal to 1 wt % and less than or equal to 10 wt %). Other ranges are also possible.

In some embodiments, a slurry may further comprise an additive (i.e., a component that is not a particulate electroactive material, a solvent, or a binder). Non-limiting examples of additives include conductive materials, such as carbonaceous materials like carbon nanotubes, carbon black and/or graphite.

When present, additives may make up any suitable portion of a slurry. In some embodiments, additives make up less than or equal to 20 wt %, less than or equal to 10 wt %, less than or equal to 5 wt %, or less than or equal to 2 wt % of the slurry. In some embodiments, additives make up greater than or equal to 1 wt %, greater than or equal to 2 wt %, greater than or equal to 5 wt %, or greater than or equal to 10 wt % of the slurry. Combinations of the above ranges are also possible (e.g., greater than or equal to 1 wt % and less than or equal to 10 wt %). Other ranges are also possible.

For convenience, certain terms employed in the specification, examples, and appended claims are listed here. Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito: 1999.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. The alkyl groups may be optionally substituted, as described more fully below. Examples of alkyl groups include, but are not limited to, methyl, ethyl, propyl, isopropyl, butyl, isobutyl, tert-butyl, 2-ethylhexyl, cyclopropyl, cyclobutyl, cyclopentyl, cyclohexyl, and the like. "Heteroalkyl" groups are alkyl groups wherein at least one atom is a heteroatom (e.g., oxygen, sulfur, nitrogen, phosphorus, etc.), with the remainder of the atoms being carbon atoms. Examples of heteroalkyl groups include, but are not limited to, alkoxy, poly(ethylene glycol)-, alkyl-substituted amino, tetrahydrofuranyl, piperidinyl, morpholinyl, etc.

The terms "alkenyl" and "alkynyl" refer to unsaturated aliphatic groups analogous to the alkyl groups described above, but containing at least one double or triple bond respectively. The "heteroalkenyl" and "heteroalkynyl" refer to alkenyl and alkynyl groups as described herein in which one or more atoms is a heteroatom (e.g., oxygen, nitrogen, sulfur, and the like).

The term "aryl" refers to an aromatic carbocyclic group having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl), all optionally substituted. "Heteroaryl" groups are aryl groups wherein at least one ring atom in the aromatic ring is a heteroatom, with the remainder of the ring atoms being carbon atoms. Examples of heteroaryl groups include furanyl, thienyl, pyridyl, pyrrolyl, N lower alkyl pyrrolyl, pyridyl N oxide, pyrimidyl, pyrazinyl, imidazolyl, indolyl and the like, all optionally substituted.

The terms "amine" and "amino" refer to both unsubstituted and substituted amines, e.g., a moiety that can be represented by the general formula: N(R')(R'')(R''') wherein R', R'', and R''' each independently represent a group permitted by the rules of valence.

The terms "acyl," "carboxyl group," or "carbonyl group" are recognized in the art and can include such moieties as can be represented by the general formula:

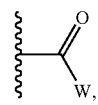

wherein W is H, OH, O-alkyl, O-alkenyl, or a salt thereof. Where W is O-alkyl, the formula represents an "ester." Where W is OH, the formula represents a "carboxylic acid." In general, where the oxygen atom of the above formula is replaced by sulfur, the formula represents a "thiolcarbonyl" group. Where W is a S-alkyl, the formula represents a "thiolester." Where W is SH, the formula represents a "thiolcarboxylic acid." On the other hand, where W is alkyl, the above formula represents a "ketone" group. Where W is hydrogen, the above formula represents an "aldehyde" group.

As used herein, the term "heteroaromatic" or "heteroaryl" means a monocyclic or polycyclic heteroaromatic ring (or radical thereof) comprising carbon atom ring members and one or more heteroatom ring members (such as, for example, oxygen, sulfur or nitrogen). Typically, the heteroaromatic ring has from 5 to about 14 ring members in which at least 1 ring member is a heteroatom selected from oxygen, sulfur, and nitrogen. In another embodiment, the heteroaromatic ring is a 5 or 6 membered ring and may contain from 1 to about 4 heteroatoms. In another embodiment, the heteroaromatic ring system has a 7 to 14 ring members and may contain from 1 to about 7 heteroatoms. Representative heteroaryls include pyridyl, furyl, thienyl, pyrrolyl, oxazolyl, imidazolyl, indolizinyl, thiazolyl, isoxazolyl, pyrazolyl, isothiazolyl, pyridazinyl, pyrimidinyl, pyrazinyl, triazinyl, triazolyl, pyridinyl, thiadiazolyl, pyrazinyl, quinolyl, isoquinolyl, indazolyl, benzoxazolyl, benzofuryl, benzothiazolyl, indolizinyl, imidazopyridinyl, isothiazolyl, tetrazolyl, benzimidazolyl, benzoxazolyl, benzothiazolyl, benzothiadiazolyl, benzoxadiazolyl, carbazolyl, indolyl, tetrahydroindolyl, azaindolyl, imidazopyridyl, qunizaolinyl, purinyl, pyrrolo[2,3]pyrimidyl, pyrazolo[3,4]pyrimidyl, benzo(b)thienyl, and the like. These heteroaryl groups may be optionally substituted with one or more substituents.

The term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" must still comprise the phenyl moiety and cannot be modified by substitution, in this definition, to become, e.g., a heteroaryl group such as pyridine. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

Examples of substituents include, but are not limited to, alkyl, aryl, aralkyl, cyclic alkyl, heterocycloalkyl, hydroxy, alkoxy, aryloxy, perhaloalkoxy, aralkoxy, heteroaryl, heteroaryloxy, heteroarylalkyl, heteroaralkyl, azido, amino, halogen, alkylthio, oxo, acyl, acylalkyl, carboxy esters, carboxyl, carboxamido, nitro, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, alkoxyalkyl, perhaloalkyl, arylalkyloxyalkyl, and the like.

EXAMPLES

Examples 1-3 and Comparative Examples 1-7

In Examples 1-3 and Comparative Examples 1-7, unless otherwise stated, the electrochemical cells were prepared by the following methods: the first electrode (anode) was vacuum deposited Li (thickness 15 or 25 µm) positioned on a 200 nm-thick Cu current collector disposed on a polyethylene terephthalate (PET) substrate. The porous separator was a 25 µm-thick polyolefin film (Celgard 2325), and the second electrode (cathode) was nickel manganese cobalt (BASF NCM622) coated on a 20 µm-thick aluminum substrate current collector with an active cathode material (ACM) loading of approximately 19.3 mg/cm$^2$ on each side of the current collector. The above components were assembled in a stacked layered structure of anode/separator/cathode/separator/anode. The total active cathode surface area was 100 cm$^2$. After sealing the cell components in a foil pouch, appropriate amount of electrolyte was added (typically, 0.55 mL was used for 25 µm lithium cells and 0.6 mL was used for 15 µm lithium cells). The cell package was then vacuum sealed. These cells were allowed to soak in the electrolyte for 24 hours unrestrained.

Comparative Example 1

The above cell was prepared with an electrolyte containing 1 M lithium hexafluorophosphate (LiPF$_6$) in a 50 wt %:50 wt % mixture of dimethyl carbonate (DMC) and ethylene carbonate (EC) (BASF LP30).

Comparative Example 2

The electrochemical cell was identical to the cell of Comparative Example 1 except that electrolyte was 1 M LiPF$_6$ in a 30 wt %:70 wt % mixture of EC and ethyl methyl carbonate (EMC) (BASF LP57).

Comparative Example 3

The electrochemical cell was identical to the cell of Comparative Example 1, except that the electrolyte further contained 4 wt % LiNO$_3$ in the form of a suspension.

Comparative Example 4

The electrochemical cell was identical to the cell of Comparative Example 2, except that the electrolyte further contained 4 wt % LiNO$_3$ in the form of a suspension.

Comparative Example 5

The electrochemical cell was identical to the cell of Comparative Example 1, except that the electrolyte further contained 4 wt % of LiBOB.

Comparative Example 6

The electrochemical cell was identical to the cell of Comparative Example 2, except that the electrolyte further contained 4 wt % LiBOB.

Comparative Example 7

The electrochemical cell was identical to the cell of Comparative Example 2, except that the electrolyte further contained 1 wt % LiBOB.

Example 1

The electrochemical cell was identical to the cell of Comparative Example 3 except that the electrolyte further contained LiBOB at a concentration of 4 wt %.

Example 2

The electrochemical cell was identical to the cell of Comparative Example 4 except that the electrolyte further contained LiBOB at a concentration of 4 wt %.

After the cells were soaked in the electrolyte, 10 kg/cm² pressure was applied to the cells and the cells were cycled under this pressure. Charge and discharge cycling was performed under the following condition: C/3 (100 mA) charge to 4.35 V, followed by taper at 4.35 V to 3 mA; C (100 mA) discharge to 3.2 V. As shown in Table 2, batteries comprising both $LiNO_3$ and LiBOB in the electrolyte (as in Examples 1 and 2) showed significant improvement in cycle life over batteries comprising only one of $LiNO_3$ and LiBOB alone, or neither of $LiNO_3$ and LiBOB (as in the Comparative Examples).

TABLE 2

| Example | Base Electrolyte | Passivating Agents | No. of Cycles to 80% Capacity |
| --- | --- | --- | --- |
| Comparative Example 1 | LP30 | None | 27 |
| Comparative Example 2 | LP57 | None | 3 |
| Comparative Example 3 | LP30 | 4 wt % $LiNO_3$ suspension | 19 |
| Comparative Example 4 | LP57 | 4 wt % $LiNO_3$ suspension | 22 |
| Comparative Example 5 | LP30 | 4 wt % LiBOB solution | 73 |
| Comparative Example 6 | LP57 | 4 wt % LiBOB solution | 26 |
| Comparative Example 7 | LP57 | 1 wt % LiBOB solution | 9 |
| Example 1 | LP30 | 4 wt % LiBOB + 4 wt % $LiNO_3$ suspension | 96 |
| Example 2 | LP57 | 4 wt % LiBOB + 4 wt % $LiNO_3$ suspension | 111 |

Further analyses were conducted on selected electrochemical cells as described above. In one experiment, cells were soaked in the electrolyte for one day and then 10 kg/cm² pressure was applied to the cells. Then, the cells underwent 5 cycles at C/8 charge and C/5 discharge, then float charged to 4.35 V for 72 hours at 6$^{th}$ cycle. Table 3 shows the $CO_2$ emission, $N_2$ emission, and $N_2O$ emission from such analyses.

TABLE 3

| Example | Base Electrolyte | Passivating Agents | $CO_2$ emission (µL) | $N_2$ emission (µL) | $N_2O$ emission (µL) |
| --- | --- | --- | --- | --- | --- |
| Comparative Example 1 | LP30 | None | 508 | 196 | 0 |
| Comparative Example 3 | LP30 | 4 wt % $LiNO_3$ suspension | 469 | 287 | 41 |
| Comparative Example 5 | LP30 | 4 wt % LiBOB solution | 649 | 79 | 0 |
| Example 1 | LP30 | 4 wt % LiBOB + 4 wt % $LiNO_3$ suspension | 699 | 167 | 11 |

Gas analyses were also conducted on the electrochemical cells of Comparative Example 1, Comparative Example 3, Comparative Example 5, and Example 1 after the cells had undergone charging and discharging. In these examples, cells were soaked in the electrolyte for one day and then 10 kg/cm² pressure was applied to the cells. Then, the cells then underwent five cycles of C/8 charge and C/5 discharge. After this step, the cells were untouched for nine days and then charged to C/3 charge and C discharge for an additional 20 cycles. Table 4 shows the amounts of $CO_2$, $N_2$, and $N_2O$ gas emission of these cells. It should be noted that cells comprising LP30 with a 4 wt % $LiNO_3$ suspension reached the low capacity cut off at the 13$^{th}$ cycle.

TABLE 4

| Example | Base Electrolyte | Passivating Agents | $CO_2$ emission (µL) | $N_2$ emission (µL) | $N_2O$ emission (µL) |
| --- | --- | --- | --- | --- | --- |
| Comparative Example 1 | LP30 | None | 0 | 155 | 0 |
| Comparative Example 3 | LP30 | 4 wt % $LiNO_3$ suspension | 57 | 429 | 50 |
| Comparative Example 5 | LP30 | 4 wt % LiBOB suspension | 579 | 155 | 0 |
| Example 1 | LP30 | 4 wt % LiBOB + 4 wt % $LiNO_3$ suspension | 589 | 228 | 24 |

These results showed that LiBOB, the second passivating agent, suppressed the decomposition of $LiNO_3$, the first passivating agent, as indicated by the reduced amounts of $N_2O$ and $N_2$, the main decomposition products from $LiNO_3$.

It should also be noted that increased amounts of $CO_2$ in the presence of LiBOB suggests that LiBOB may oxidize to form a film on the cathode. One possible process for LiBOB oxidation is 1-electron oxidation, which may cause the release of $CO_2$ and the generation of borate radicals. The borate radicals may then subsequently couple, propagate and cross-link to form a passivating film on the surface of the cathode. For samples where the formation of $CO_2$ was accompanied by the presence of LiBOB, it is therefore possible that the $CO_2$ formation was due to LiBOB oxidation instead of solvent degradation.

Example 3

Figure 6:
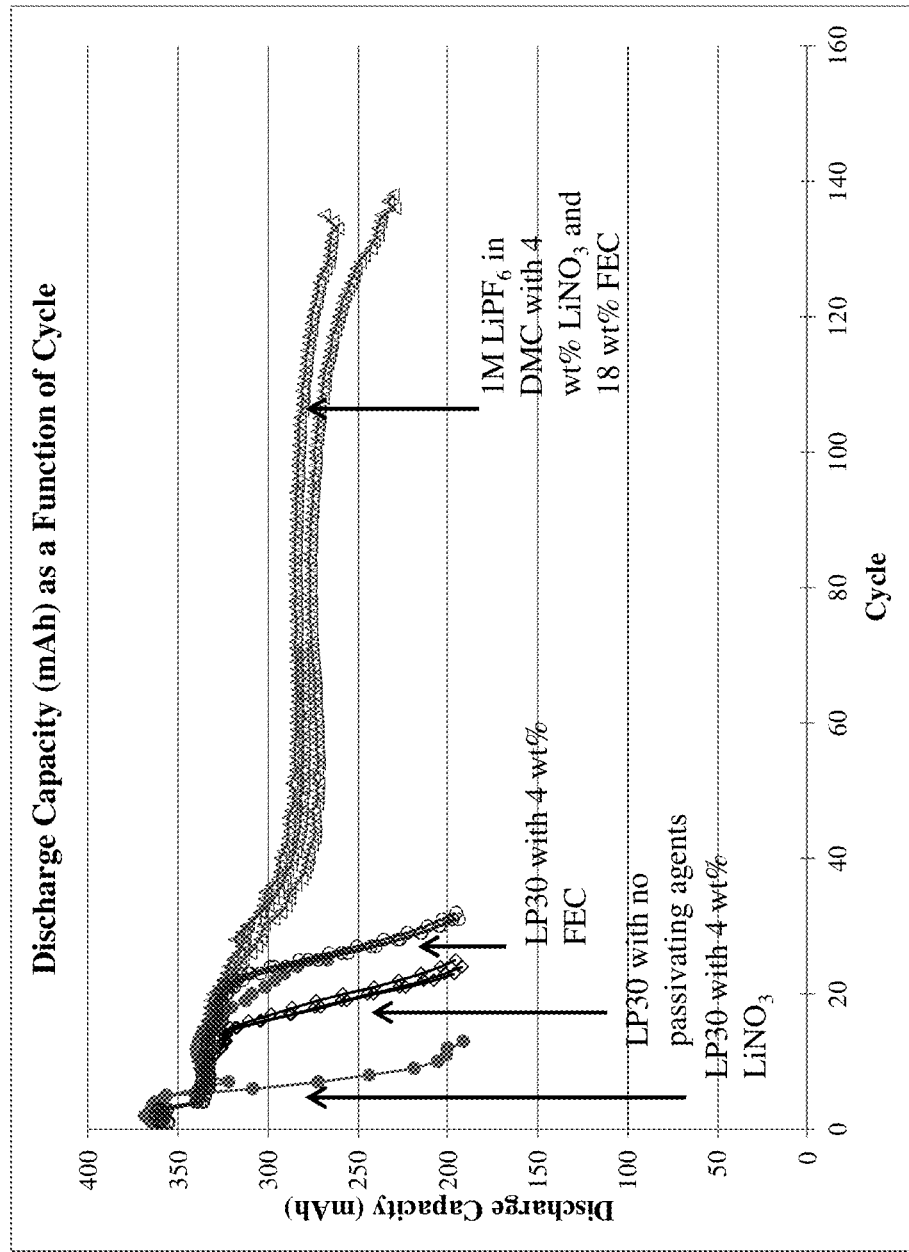
FIG. 6 is a chart showing the discharge capacities of electrochemical cells in accordance with various embodiments of the invention.

Two electrochemical cells were constructed which were identical to the cell of Comparative Example 1 except that the electrolyte further comprised either 4 wt % $LiNO_3$ or 4 wt % fluoroethylene carbonate (FEC). One electrochemical cell was constructed which was identical to the cell of Comparative Example 1 except that it was prepared with an electrolyte containing 1 M $LiPF_6$ in DMC and comprised 4 wt % $LiNO_3$ and 18 wt % FEC. The cells were soaked in the electrolytes for one day, and then 10 kg/cm² pressure was applied to the cells. Then, the cells underwent C/8 charge, C/5 discharge for the first three cycles, and C/3 charge, C discharge for subsequent cycles. These three cells and the cell of Comparative Example 1 were cycled. FIG. 6 shows the cycling performance of these cells, indicating that cells comprising both $LiNO_3$ and FEC exhibit significantly enhanced discharge capacity retention compared to cells containing only one or the other.

Examples 4-7 and Comparative Example 8

Example 4

Approximately 37 g of a nickel manganese cobalt cathode (NCM523, received from BASF) in powder form was dried overnight in vacuum oven at 125° C. 17 g of this dried powder was then stirred in 100 mL of 0.5 M tetraethylorthosilicate (TEOS) in dimethyl carbonate (DMC) and held at 35° C. overnight. After this step, the solution was allowed to settle for a few hours and the supernatant was decanted. The remaining powder was rinsed with DMC and was dried overnight in vacuum oven at 125° C. Then, the powder was used to form a cathode slurry. The slurry exhibited fluid-like properties and did not form a gel after 6 hours.

Example 5

Approximately 17 g of dried NCM523 powder was processed as described in Example 4, except 0.5 M mercaptopropyltrimethoxysilane (MPTS) was added instead of instead of TEOS. Then, the powder was used to form a cathode slurry. The slurry exhibited fluid-like properties and did not form a gel.

Example 6

Three NCM 622 cathodes with dimensions of 45 cm×43.45 cm and containing an active material density of 2.5 g/cm³ were dried overnight in a vacuum oven held at 120° C. These cathodes were submersed in 50 mL of a 0.1 M solution of (3-mercaptopropyl)triethoxysilane (MPTS) (95%, Sigma Aldrich) in anhydrous dimethyl carbonate (DMC) (>99%, Sigma Aldrich) overnight at 40° C. Then, the cathodes were rinsed well with DMC and dried overnight in a vacuum oven held at 120° C.

Example 7

Three NCM 622 cathodes with dimensions of 45 cm×43.45 cm and containing an active material density of 2.5 g/cm³ were dried overnight in a vacuum oven held at 120° C. These cathodes were submersed in 50 mL of a 0.1 M solution of Trichlorododecylsilane (TCODS) (95%, Sigma Aldrich) in anhydrous dimethyl carbonate (DMC) (>99%, Sigma Aldrich) overnight at 40° C. Then, the cathodes were rinsed well with DMC and dried overnight in a vacuum oven held at 120° C.

Comparative Example 8

Three NCM 622 cathodes with dimensions of 45 cm×43.45 cm and containing an active material density of 2.5 g/cm³ were dried overnight in a vacuum oven held at 120° C. These cathodes were submersed in anhydrous dimethyl carbonate (DMC) (>99%, Sigma Aldrich) overnight at 40° C. Then, the cathodes were rinsed well with DMC and dried overnight in a vacuum oven held at 120° C.

Figure 7:
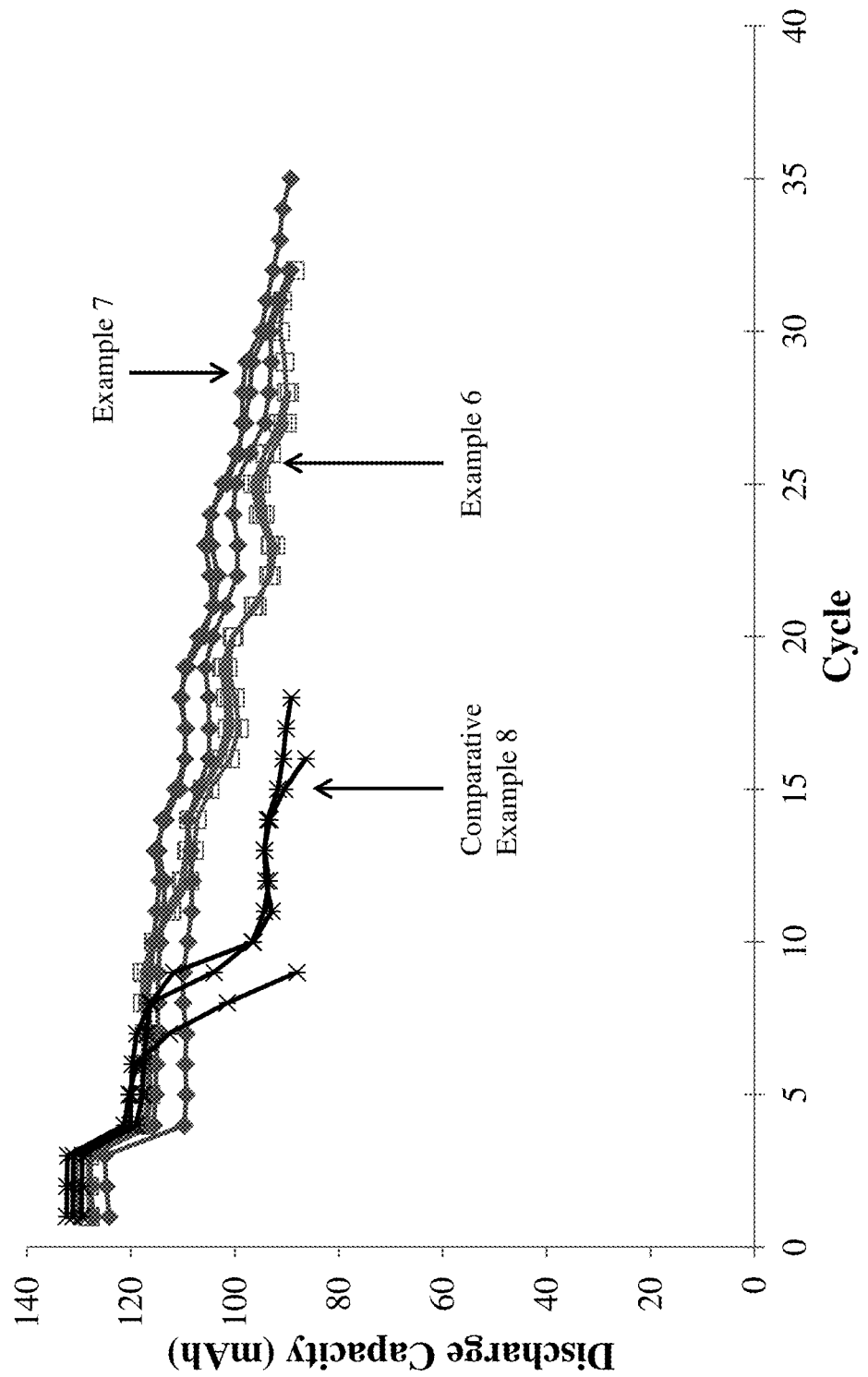
FIG. 7 is a chart showing the discharge capacities of electrochemical cells in accordance with various embodiments of the invention.

Cathode-centered cells were prepared with the cathodes of Examples 6-7 and Comparative Example 8. The cells included a vacuum deposited lithium anode and a Celgard 2325 separator. The electrolyte included 4 wt % $LiNO_3$ in a 1 M $LiPF_6$ in 50 wt % ethyl carbonate and 50 wt % dimethyl carbonate solution. The cells underwent three initial cycles in which they were charged at a rate of C/8 and discharged at a rate of C/3 to 4.35 V. They then underwent subsequent cycles in which they were charged at a rate of C/3 and discharged at a rate of C. FIG. 7 shows the capacity and cycle life of the different cells. Examples 6 and 7 exhibited longer cycle lives than the cells of Comparative Example 8.

Examples 8-13

In Examples 8-13, unless otherwise stated, the electrochemical cells were prepared by the following methods: the first electrode (anode) was vacuum deposited Li (thickness 14 μm) positioned on a 200 nm-thick Cu current collector disposed on a PET substrate. The porous separator was a 9 μm-thick polyolefin film (Entek EP), and the second electrode (cathode) was nickel manganese cobalt (BASF NCM721) coated on a 20 μm-thick aluminum substrate current collector with an active cathode material (ACM) loading of approximately 20.1 mg/cm² on each side of the current collector. The above components were assembled in a stacked layered structure of anode/separator/cathode/separator/anode. The total active cathode surface area was 100 cm². After sealing the cell components in a foil pouch, 0.5 mL of electrolyte was added. The cell package was then vacuum sealed. These cells were allowed to soak in the electrolyte for 24 hours unrestrained.

Example 8

The above cell was prepared with an electrolyte containing 1 M $LiPF_6$ in a 20 wt %:80 wt % mixture of FEC and DMC (Li-ion 14).

Example 9

The electrochemical cell was identical to the cell of Example 8, except that the electrolyte further contained 1 wt % LiBOB.

Example 10

The electrochemical cell was identical to the cell of Example 8, except that the electrolyte further contained 1 wt % vinylene carbonate (VC).

Example 11

The electrochemical cell was identical to the cell of Example 8, except that the electrolyte further contained 1 wt % prop-1-ene-1,3-sultone (PES).

Example 12

The electrochemical cell was identical to the cell of Example 8, except that the electrolyte further contained 1 wt % LiBOB and 1 wt % VC.

Example 13

The electrochemical cell was identical to the cell of Example 8, except that the electrolyte further contained 1 wt % LiBOB and 1 wt % PES.

After the cells were soaked in the electrolyte, 10 kg/cm$^2$ pressure was applied to the cells and the cells were cycled under this pressure. Charge and discharge cycling was performed under the following condition: three cycles of 30 mA charge to 4.4 V, followed by taper at 4.4 V to 10 mA and then 120 mA discharge to 3.2 V; further cycles of 75 mA charge to 4.4 V, followed by taper at 4.4 V to 10 mA and then 300 mA discharge to 3.2 V. As shown in Table 5, the battery comprising VC, LiBOB, and FEC in the electrolyte (Example 12) showed significant improvement in cycle life over batteries comprising FEC and only one of VC or LiBOB, or comprising FEC and neither of VC and LiBOB (Examples 8-10). As also shown in Table 5, the battery comprising PES, LiBOB, and FEC in the electrolyte (Example 13) showed significant improvement in cycle life over batteries comprising FEC and only one of PES and LiBOB, or comprising FEC and neither of PES and LiBOB (Examples 8, 9, and 11). However, the batteries lacking one or more of VC, PES, LiBOB, and FEC also showed appreciable cycle life.

TABLE 5

| Example | Base Electrolyte | Passivating Agents | No. of Cycles to 80% Capacity |
|---|---|---|---|
| Example 8 | Li-ion 14 | 17.52 wt % FEC | 146 |
| Example 9 | Li-ion 14 | 17.52 wt % FEC + 1 wt % LiBOB | 170 |
| Example 10 | Li-ion 14 | 17.52 wt % FEC + 1 wt % VC | 185 |
| Example 11 | Li-ion 14 | 17.52 wt % FEC + 1 wt % PES | 162 |
| Example 12 | Li-ion 14 | 17.52 wt % FEC + 1 wt % LiBOB + 1 wt % VC | 231 |
| Example 13 | Li-ion 14 | 17.52 wt % FEC + 1 wt % LiBOB + 1 wt % PES | 218 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
   a first electrode comprising lithium, the first electrode comprising a first surface;
   a second electrode, the second electrode comprising a second surface;
   an electrolyte;
   a first passivating agent, wherein the first passivating agent comprises one or more of lithium xanthate, potassium xanthate, lithium ethyl xanthate, potassium ethyl xanthate, lithium isobutyl xanthate, potassium isobutyl xanthate, lithium tert-butyl xanthate, and potassium tert-butyl xanthate; and
   a second passivating agent, wherein the second passivating agent comprises an (oxalato)borate group, and wherein the second passivating agent is present in the electrolyte at greater than or equal to 0.2 wt %.

2. An electrochemical cell, comprising:
   a first electrode comprising lithium, the first electrode comprising a first surface;
   a second electrode, the second electrode comprising a second surface;
   an electrolyte;
   a first passivating agent, wherein the first passivating agent comprises one or more of lithium xanthate, potassium xanthate, lithium ethyl xanthate, potassium ethyl xanthate, lithium isobutyl xanthate, potassium isobutyl xanthate, lithium tert-butyl xanthate, and potassium tert-butyl xanthate; and
   a second passivating agent, wherein the second passivating agent comprises one or more of lithium difluoro (oxalato)borate, a species that is capable of undergoing polymerization to form a layer on the cathode during cell cycling, and a species absent a vinyl group but is capable of developing a vinyl group upon electrochemical cell cycling.

3. An electrochemical cell, comprising:
   a first electrode comprising lithium, the first electrode comprising a first surface;
   a second electrode, the second electrode comprising a second surface;
   an electrolyte;
   a first passivating agent, wherein the first passivating agent comprises potassium tert-butyl xanthate; and
   a second passivating agent, wherein the second passivating agent comprises one or more of a species comprising an (oxalato)borate group, a species that is capable of undergoing polymerization to form a layer on the cathode during cell cycling, a species which comprises a vinyl group, and a species absent a vinyl group but is capable of developing a vinyl group upon electrochemical cell cycling.

4. An electrochemical cell as in claim 1, comprising an (oxalato)borate salt.

5. An electrochemical cell as in claim 1, wherein the (oxalato)borate salt comprises lithium bis(oxalato)borate.

6. An electrochemical cell as in claim 1, wherein the second passivating agent comprises fluoroethylene carbonate.

7. An electrochemical cell as in claim 1, wherein the first passivating agent is an additive that is soluble or miscible with the electrolyte.

8. An electrochemical cell as in claim 1, wherein the first passivating agent comprises a lithium salt.

9. An electrochemical cell as in claim 1, wherein the first passivating agent is derived from a first passivating agent precursor.

10. An electrochemical cell as in claim 1, wherein the second electrode has a voltage with respect to lithium of greater than or equal to 2.8 V and less than or equal to 4.5 V.

11. An electrochemical cell as in claim 1, wherein the second electrode is a lithium-intercalation electrode.

12. An electrochemical cell as in claim 1, wherein the electrolyte comprises a solvent.

13. An electrochemical cell as in claim 12, wherein the solvent comprises a carbonate group.

14. An electrochemical cell as in claim 12, wherein the solvent comprises a mixture of dimethyl carbonate and ethylene carbonate.

15. An electrochemical cell as in claim 1, wherein the electrolyte comprises a lithium salt.

16. An electrochemical cell as in claim 1, wherein the first passivating agent, in the absence of the second passivating agent, reduces cycle life of an electrochemical cell, compared to a control electrochemical cell that does not include the first or the second passivating agents, all other factors being equal, and wherein the presence of the first and second passivating agents increases cycle life of an electrochemical cell compared to the control electrochemical cell, all other factors being equal.

17. An electrochemical cell as in claim 1, wherein the second passivating is configured and arranged to reduce or prevent decomposition of the first passivating agent during cycling of the electrochemical cell and/or to reduce or prevent decomposition of an electrolyte component promoted by the first passivating agent during cycling of the electrochemical cell, compared to decomposition in a similar electrochemical cell that does not include the second passivating agent, all other factors being equal.

18. An electrochemical cell as in claim 1, wherein the first passivating agent is configured and arranged to passivate the first surface.

19. An electrochemical cell as in claim 1, wherein the second passivating agent comprises fluoroethylene carbonate, wherein the second electrode is a lithium-intercalation electrode, and wherein the electrolyte comprises a solvent comprising a carbonate group.

20. An electrochemical cell as in claim 2, wherein the second passivating agent comprises fluoroethylene carbonate, wherein the second electrode is a lithium-intercalation electrode, and wherein the electrolyte comprises a solvent comprising a carbonate group.

21. An electrochemical cell as in claim 3, wherein the second passivating agent comprises fluoroethylene carbonate, wherein the second electrode is a lithium-intercalation electrode, and wherein the electrolyte comprises a solvent comprising a carbonate group.

22. An electrochemical cell as in claim 1, wherein the second passivating agent comprises an (oxalato)borate salt comprising lithium bis(oxalato)borate and the electrolyte comprises a solvent comprising a mixture of dimethyl carbonate and ethylene carbonate.

23. An electrochemical cell as in claim 3, wherein the second passivating agent comprises an (oxalato)borate salt comprising lithium bis(oxalato)borate and the electrolyte comprises a solvent comprising a mixture of dimethyl carbonate and ethylene carbonate.

* * * * *